US010252755B2

(12) United States Patent
Butler et al.

(10) Patent No.: US 10,252,755 B2
(45) Date of Patent: Apr. 9, 2019

(54) AERODYNAMIC SYSTEM AND ADJUSTABLE FAIRINGS

(71) Applicant: FlowBelow Aero, Inc., Austin, TX (US)

(72) Inventors: Joshua Butler, Austin, TX (US); Kyle Walker, Austin, TX (US); Redza Shah, Austin, TX (US); Timothy Uys, Leander, TX (US)

(73) Assignee: FLOWBELOW AERO, INC., Austin, TX (US)

( * ) Notice: Subject to any disclaimer, the term of this patent is extended or adjusted under 35 U.S.C. 154(b) by 37 days.

(21) Appl. No.: 15/491,477

(22) Filed: Apr. 19, 2017

(65) Prior Publication Data

US 2017/0217507 A1 Aug. 3, 2017

Related U.S. Application Data

(63) Continuation of application No. 14/666,019, filed on Mar. 23, 2015, now Pat. No. 9,663,157, which is a continuation of application No. 14/070,294, filed on Nov. 1, 2013, now Pat. No. 9,027,983.

(60) Provisional application No. 61/746,386, filed on Dec. 27, 2012, provisional application No. 61/721,314, filed on Nov. 1, 2012.

(51) Int. Cl.
B62D 35/00 (2006.01)
B62D 25/18 (2006.01)
B62D 25/16 (2006.01)
B62D 27/02 (2006.01)

(52) U.S. Cl.
CPC ......... *B62D 35/008* (2013.01); *B62D 25/166* (2013.01); *B62D 25/188* (2013.01); *B62D 27/02* (2013.01); *B62D 35/001* (2013.01)

(58) Field of Classification Search
CPC .. B62D 35/001; B62D 25/166; B62D 25/188; B62D 27/02; B62D 25/008
See application file for complete search history.

(56) References Cited

U.S. PATENT DOCUMENTS 2,538,839 A 1/1951 Limberg
2,605,119 A 7/1952 Earnest
(Continued)

FOREIGN PATENT DOCUMENTS

EP 0309611 A1 4/1989
EP 0310130 A1 4/1989
(Continued)

OTHER PUBLICATIONS

Office Action for U.S. Appl. No. 15/082,996, dated Apr. 3, 2018, 25 pgs.
(Continued)

*Primary Examiner* — Lori L Lyjak
(74) *Attorney, Agent, or Firm* — Sprinkle IP Law Group

(57) ABSTRACT

Embodiments provide an aerodynamic fairing system that may comprise a base configured to mount to a vehicle, an arm coupled to the base at a proximate end and extending laterally, an a fairing mounted to the arm having an inboard and an outboard surface. The fairing outboard surface may provide an aerodynamic outer surface to direct flow to an angle to the rear. The arm may a fixed or adjustable length arm. The arm may provide a mounting area for a mud flap such that aerodynamic system may act as a mud flap hanger. Embodiments also provide an adjustable mud flap hanger.

20 Claims, 39 Drawing Sheets

(56) References Cited

U.S. PATENT DOCUMENTS

| | | |
|---|---|---|
| 2,869,929 A | 1/1959 | Hurd |
| 3,006,658 A | 10/1961 | Wenham et al. |
| 3,078,124 A | 2/1963 | Mulder |
| 3,092,420 A | 6/1963 | Baldwin et al. |
| 3,317,247 A | 5/1967 | Lamme |
| 3,367,722 A | 2/1968 | Miyanaga |
| 3,585,824 A | 6/1971 | Schenk et al. |
| 3,874,697 A | 4/1975 | Thompson |
| 3,918,764 A | 11/1975 | Lamme |
| 3,954,281 A | 5/1976 | Juergens |
| 4,138,129 A | 2/1979 | Morris |
| 4,169,608 A | 10/1979 | Logan |
| 4,180,230 A | 12/1979 | Sogoian |
| 4,235,476 A | 11/1980 | Arvidsson |
| 4,334,694 A | 6/1982 | Iwanicki |
| 4,627,631 A | 12/1986 | Sherman |
| 4,706,980 A | 11/1987 | Hawes |
| 4,730,952 A | 3/1988 | Wiley |
| 4,735,428 A | 4/1988 | Antekeier |
| 4,761,040 A | 8/1988 | Johnson |
| 4,784,430 A | 11/1988 | Biermacher |
| 4,836,568 A | 6/1989 | Preslik |
| 4,889,394 A | 12/1989 | Ruspa |
| 4,921,276 A | 5/1990 | Morin |
| 4,925,235 A | 5/1990 | Fingerle |
| D312,609 S | 12/1990 | Preslik |
| D312,810 S | 12/1990 | Preslik |
| 4,974,909 A | 12/1990 | Patti et al. |
| 4,984,851 A | 1/1991 | Hayano |
| 5,074,573 A | 12/1991 | Dick |
| 5,190,354 A | 3/1993 | Levy et al. |
| 5,192,108 A | 3/1993 | Richardson |
| 5,238,268 A | 8/1993 | Logan |
| 5,257,822 A | 11/1993 | Metcalf |
| 5,263,770 A | 11/1993 | Goudey |
| 5,269,547 A | 12/1993 | Antekeier |
| 5,286,049 A | 2/1994 | Khan |
| D345,332 S | 3/1994 | Roman |
| 5,294,189 A | 3/1994 | Price et al. |
| 5,324,099 A | 6/1994 | Fitzhugh |
| 5,340,154 A | 8/1994 | Scott |
| 5,366,278 A | 11/1994 | Brumfield |
| 5,375,882 A | 12/1994 | Koch, III |
| D361,974 S | 9/1995 | Hornik |
| 5,490,342 A | 2/1996 | Rutterman et al. |
| 5,623,777 A | 4/1997 | Hsiao et al. |
| D381,949 S | 8/1997 | Barrett |
| 5,659,989 A | 8/1997 | Hsiao et al. |
| D395,268 S | 6/1998 | Tucker |
| 5,791,741 A | 8/1998 | Sheu |
| 5,833,254 A | 11/1998 | Bucho |
| 5,836,399 A | 11/1998 | Maiwald et al. |
| 5,850,727 A | 12/1998 | Fox |
| 5,871,335 A | 2/1999 | Bartlett |
| 5,884,981 A | 3/1999 | Ichikawa |
| 5,938,222 A | 8/1999 | Huang |
| 5,947,520 A | 9/1999 | McHorse |
| 6,045,195 A | 4/2000 | Okamoto |
| 6,070,893 A | 6/2000 | Thorndyke |
| 6,070,908 A | 6/2000 | Skrzypchak |
| 6,120,104 A | 9/2000 | Okamoto et al. |
| 6,152,469 A | 11/2000 | Gadowski |
| 6,219,987 B1 | 4/2001 | Trent |
| 6,367,841 B1 | 4/2002 | Matthew |
| 6,412,799 B1 | 7/2002 | Schrempf |
| 6,416,112 B1 | 7/2002 | Trivits |
| 6,431,605 B1 | 8/2002 | Miller |
| 6,435,462 B2 | 8/2002 | Hawes |
| 6,443,492 B1 | 9/2002 | Barr et al. |
| 6,648,373 B2 | 11/2003 | Hawes |
| 6,666,498 B1 | 12/2003 | Whitten |
| 6,786,512 B2 | 9/2004 | Morin |
| 6,857,709 B1 | 2/2005 | McLean et al. |
| 6,886,862 B2 | 5/2005 | Matthew |
| 6,979,050 B2 | 12/2005 | Browne et al. |
| 7,011,428 B1 | 3/2006 | Hand |
| 7,081,081 B2 | 7/2006 | Schutz et al. |
| 7,083,179 B2 | 8/2006 | Chapman |
| 7,131,705 B1 | 11/2006 | Delvecchino et al. |
| 7,249,804 B2 | 7/2007 | Zank et al. |
| 7,484,736 B2 | 2/2009 | Allemann et al. |
| 7,520,534 B2 | 4/2009 | Longchamp |
| 7,547,076 B2 | 6/2009 | Necaise |
| D607,200 S | 1/2010 | Prater |
| 7,669,678 B2 | 3/2010 | Benedict et al. |
| 7,775,374 B1 | 8/2010 | Barker et al. |
| 7,775,604 B2 | 8/2010 | Chen |
| 7,806,464 B2 | 10/2010 | Cardolle |
| 7,909,343 B2 | 3/2011 | Archer et al. |
| 7,931,302 B2 | 4/2011 | Vaughn |
| 8,011,848 B2 | 9/2011 | Sockman et al. |
| 8,118,329 B2 | 2/2012 | Braga |
| 8,251,436 B2 | 8/2012 | Henderson et al. |
| 8,342,595 B2 | 1/2013 | Henderon et al. |
| 8,382,210 B1 | 2/2013 | Fleck |
| 8,814,253 B1 | 8/2014 | Butler et al. |
| 9,027,983 B2 | 5/2015 | Butler et al. |
| 9,308,949 B1 | 4/2016 | Mihelic et al. |
| 9,321,302 B2 | 4/2016 | Fleck |
| 9,327,550 B2 | 5/2016 | Butler et al. |
| 9,663,157 B2 | 5/2017 | Butler et al. |
| 9,821,598 B2 | 11/2017 | Fleck |
| 2004/0164539 A1 | 8/2004 | Bernard |
| 2009/0273176 A1 | 11/2009 | Ulgen |
| 2010/0066123 A1 | 3/2010 | Ortega |
| 2010/0066155 A1 | 3/2010 | Seradarian et al. |
| 2010/0117396 A1 | 5/2010 | Dayton |
| 2011/0057410 A1 | 3/2011 | Eklund |
| 2011/0089748 A1 | 4/2011 | Grill et al. |
| 2011/0101767 A1 | 5/2011 | Fleck |
| 2011/0272964 A1 | 11/2011 | Henderson et al. |
| 2012/0013146 A1 | 1/2012 | Wolf et al. |
| 2013/0015698 A1 | 1/2013 | Butler et al. |
| 2013/0049320 A1 | 2/2013 | Smith |
| 2014/0117712 A1 | 5/2014 | Butler et al. |
| 2015/0232137 A1 | 8/2015 | Butler et al. |
| 2016/0207352 A1 | 7/2016 | Butler et al. |
| 2018/0072354 A1 | 3/2018 | Cosme et al. |
| 2018/0297645 A1 | 10/2018 | Butler et al. |
| 2018/0370580 A1 | 12/2018 | Butler et al. |

FOREIGN PATENT DOCUMENTS

| | | |
|---|---|---|
| GB | 2348400 | 10/2000 |
| GB | 2524173 | 9/2016 |
| WO | WO97/48590 | 12/1997 |
| WO | WO 2004/062953 | 7/2004 |
| WO | WO 2008/100338 | 8/2008 |
| WO | WO 2013/174410 | 11/2013 |
| WO | WO 2016/134847 | 9/2016 |
| WO | WO 2018/136529 | 7/2018 |

OTHER PUBLICATIONS

Office Action issued for Canadian Patent Application No. 2,877,482, dated May 14, 2018, 4 pages.

Bresnan, John, "Exterior Accessories," May 11, 2012, 23 pages., Drink Water Trailer Sales, Pembroke, MA, [retrieved from <<http://www.drinkwaterts.com>>], printed Jul. 25, 2012, 23 pages.

"Truck Accessories," Council Hitch Truck Accessories, Council Bluffs, IA, [retrieved from <<http://councilhitch.com>>], printed Jul. 24, 2012, 1 page.

AMP Research Power StepTM, AMP Research, Tustin, CA, at www.amp-research.com, printed Jul. 24, 2012, 6 pages.

TrailBack Aluminium Running Boards, BuyAutoTruckAccessories. com, Clifton, NJ, [retrieved from <<www.buyautotruckaccessories. com>>], printed Jul. 24, 2012, 2 pages.

Discount Auto Parts Dee Zee Running Boards Car Truck SUV, Dee Zee, Inc., Des Moines, IA, [retrieved from <<www.running-board. nedona.org>>], printed Jul. 24, 2012, 6 pages.

(56) References Cited

OTHER PUBLICATIONS

Lund Trailrunner Extruded Aluminum Running Boards, JC Whitney, LaSalle, IL, [retrieved from <<www.jcwhitney.com>>], printed on Jul. 25, 2012, 3 pages.
Endeavor Running Boards, 4WheelOnline.com, Tampa, FL, [retrieved from <<http://4wheelonline.com>>], printed Jul. 28, 2012, 2 pages.
International Search Report and Written Opinion issued for PCT Application No. PCT/US2012/046010, dated Oct. 1, 2012, 10 pages.
Office Action issued for U.S. Appl. No. 13/452,249, dated Apr. 19, 2013, 11 pages.
"Truck Accessories," Council Hitch Truck Accessories, Council Bluffs, IA, [retrieved from <<http://councilhitch.com>>], printed May 15, 2013, 5 pages.
Office Action issued for U.S. Appl. No. 13/452,249, dated Sep. 9, 2013, 9 pages.
International Preliminary Report on Patentability (Ch. I) issued for PCT Application No. PCT/US2012/046010, dated Jan. 23, 2014, 9 pages.
Notice of Allowance issued for U.S. Appl. No. 13/452,249, dated Apr. 10, 2014, 2 pages.
International Search Report and Written Opinion issued for International Patent Application No. PCT/US/68119, dated Jun. 5, 2014, 10 pages.
Isuzu Splash Shield/Mud Flap #1577, Product Information Page (online), Busbee's Trucks & Parts, 2009-2012 [retrieved on Feb. 25, 2014 from <<http://www.busbeetruckparts.com/truck-part-categories/splash-shields/isuzu-npr-splash-shieldmud-flap-1989-used>>], 1 page.
Office Action issued for U.S. Appl. No. 14/070,294, dated Sep. 27, 2014, 8 pages.
Notice of Allowance for U.S. Appl. No. 14/070,294, dated Dec. 23, 2014, 2 pages.
Extended European Search Report isued for Patent Application No. EP 12811575, dated Mar. 4, 2015, 8 pages.
Office Action issued for U.S. Appl. No. 13/545,100, dated Apr. 10, 2015, 15 pages.
International Preliminary Report on Patentability (Ch. I) issued for PCT Application No. PCT/US2013/068119, dated May 14, 2015, 7 pages.
Office Action issued for U.S. Appl. No. 13/545,100, dated Sep. 21, 2015, 8 pages.
Notice of Allowance issued for U.S. Appl. No. 13/545,100, dated Jan. 28, 2016, 5 pages.
Office Action issued for U.S. Appl. No. 14/666,019, dated Jul. 8, 2016, 7 pages.
Extended European Search Report issued for Patent Application No. EP 13851505.1, dated Oct. 14, 2016, 8 pages.
Examination Report issued for Australian Patent Application No. 2013337652, dated Jan. 13, 2017, 4 pages.
Notice of Allowance issued for U.S. Appl. No. 14/666,019, filed Jan. 18, 2017, 4 pages.
Office Action for U.S. Appl. No. 15/553,893, dated Jul. 19, 2018, 7 pgs.
Office Action for U.S. Appl. No. 16/018,413, dated Sep. 18, 2018, 6 pgs.
Office Action for U.S. Appl. No. 15/082,996, dated Nov. 2, 2018, 6 pgs.

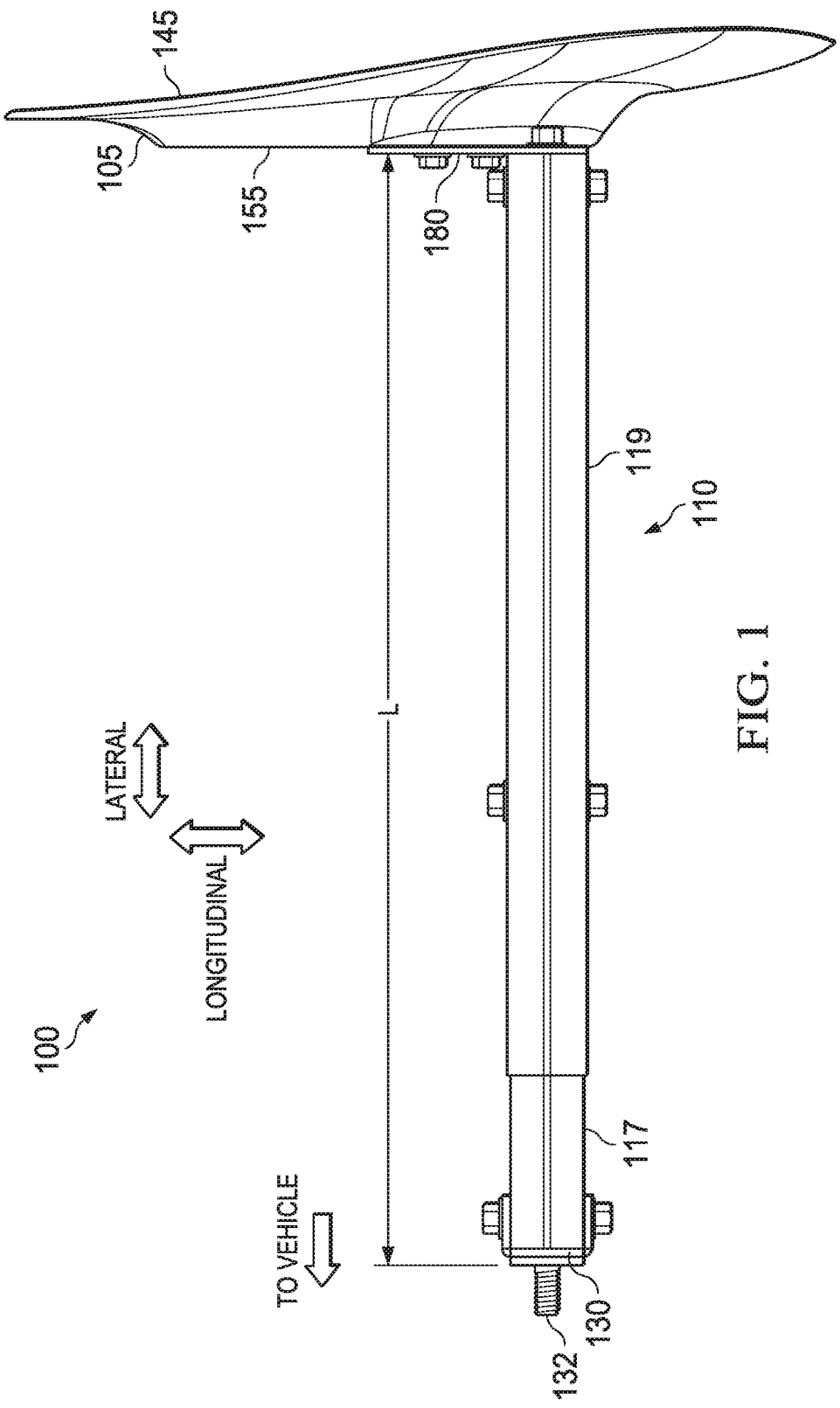

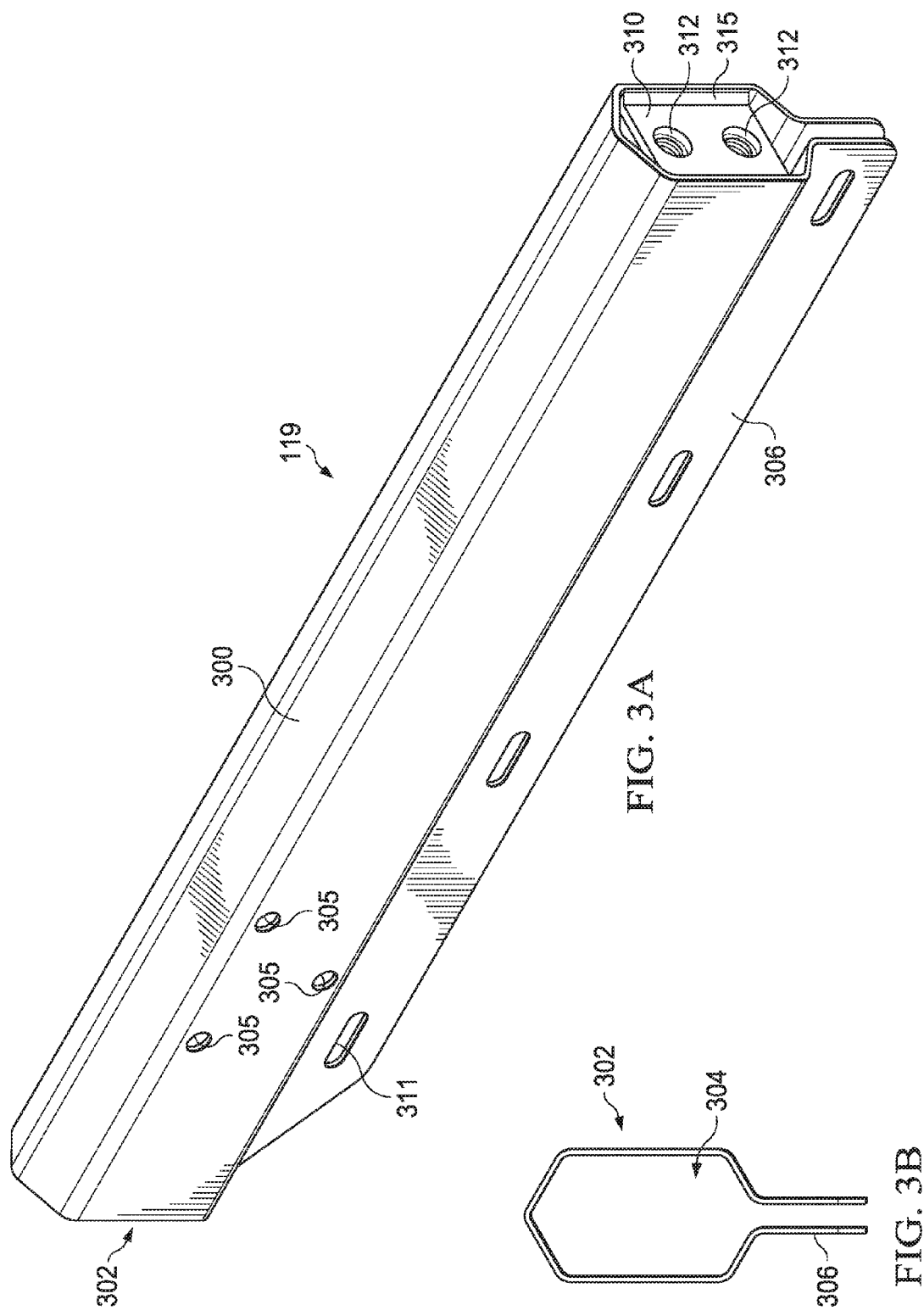

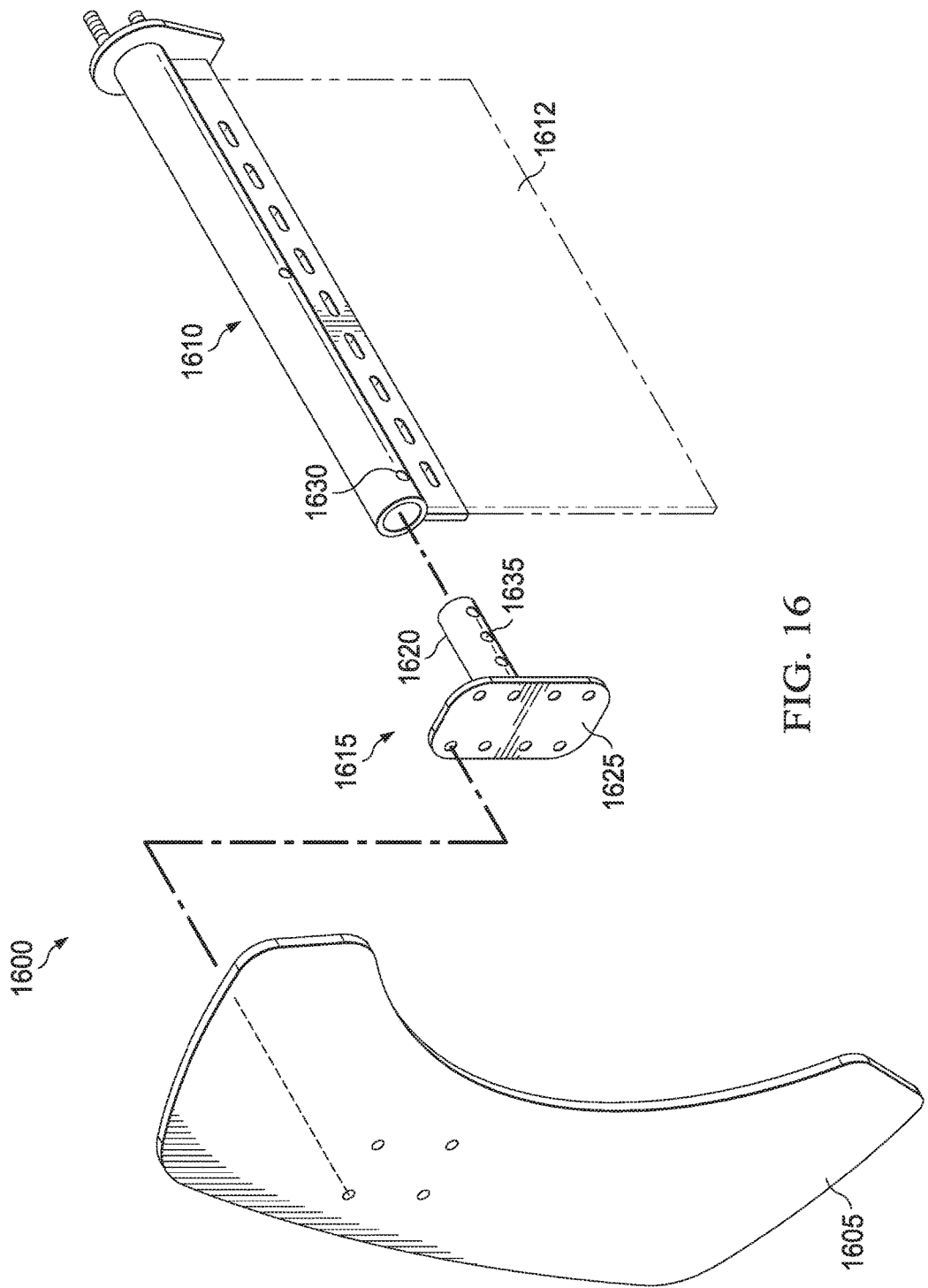

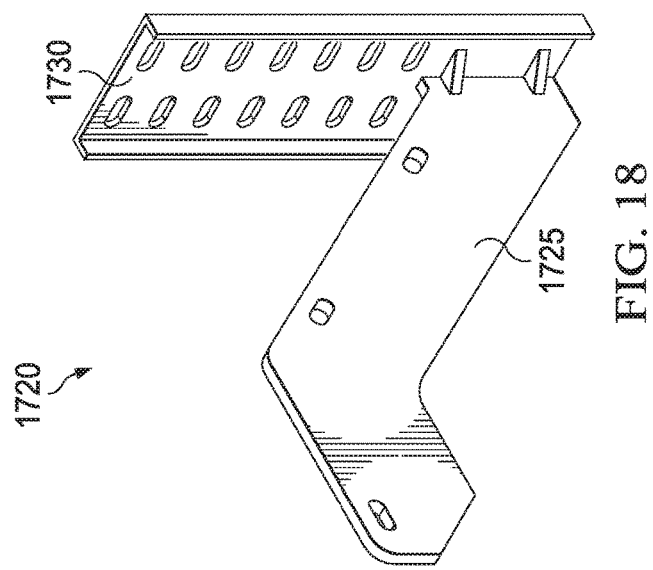
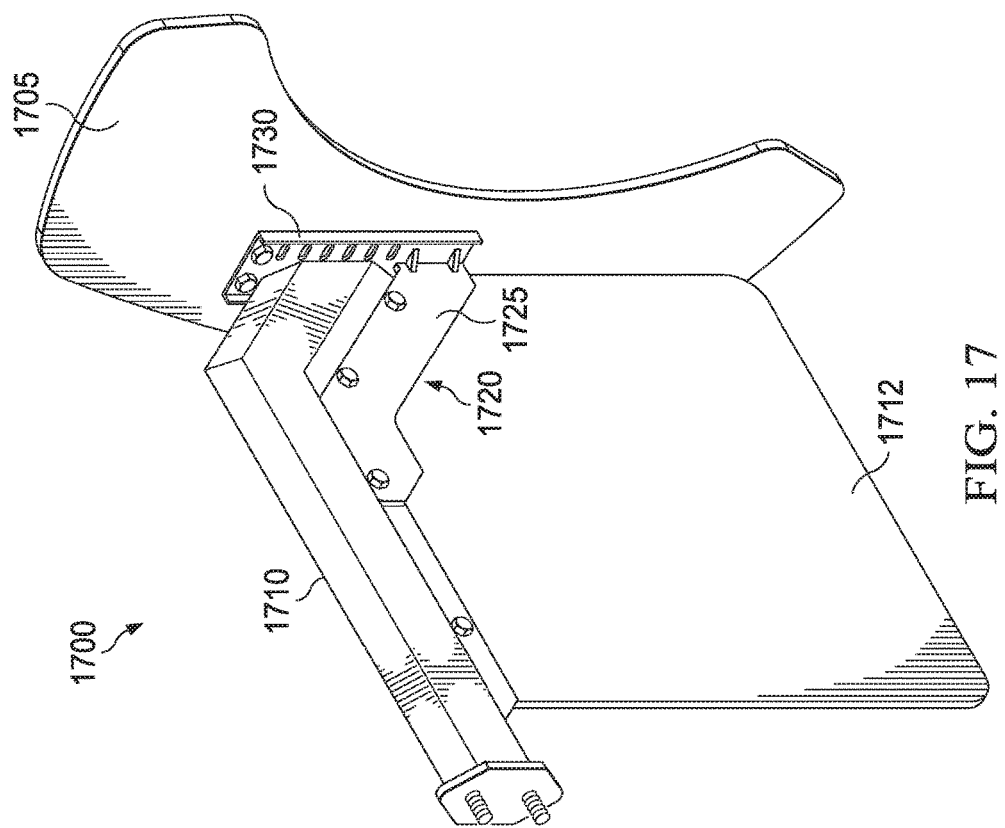

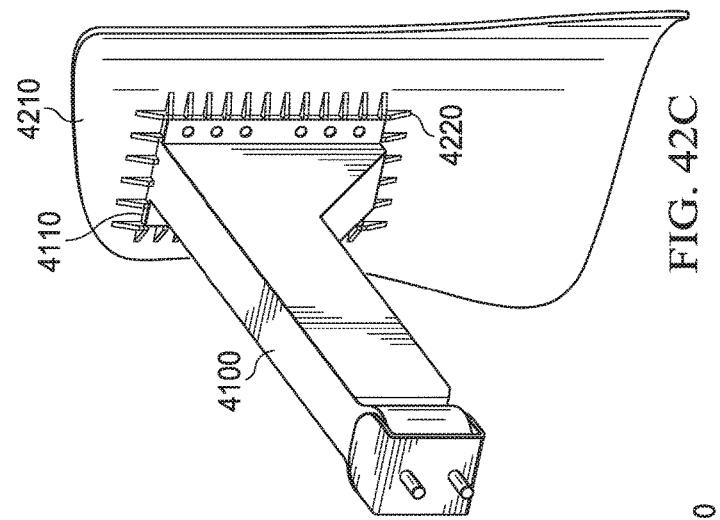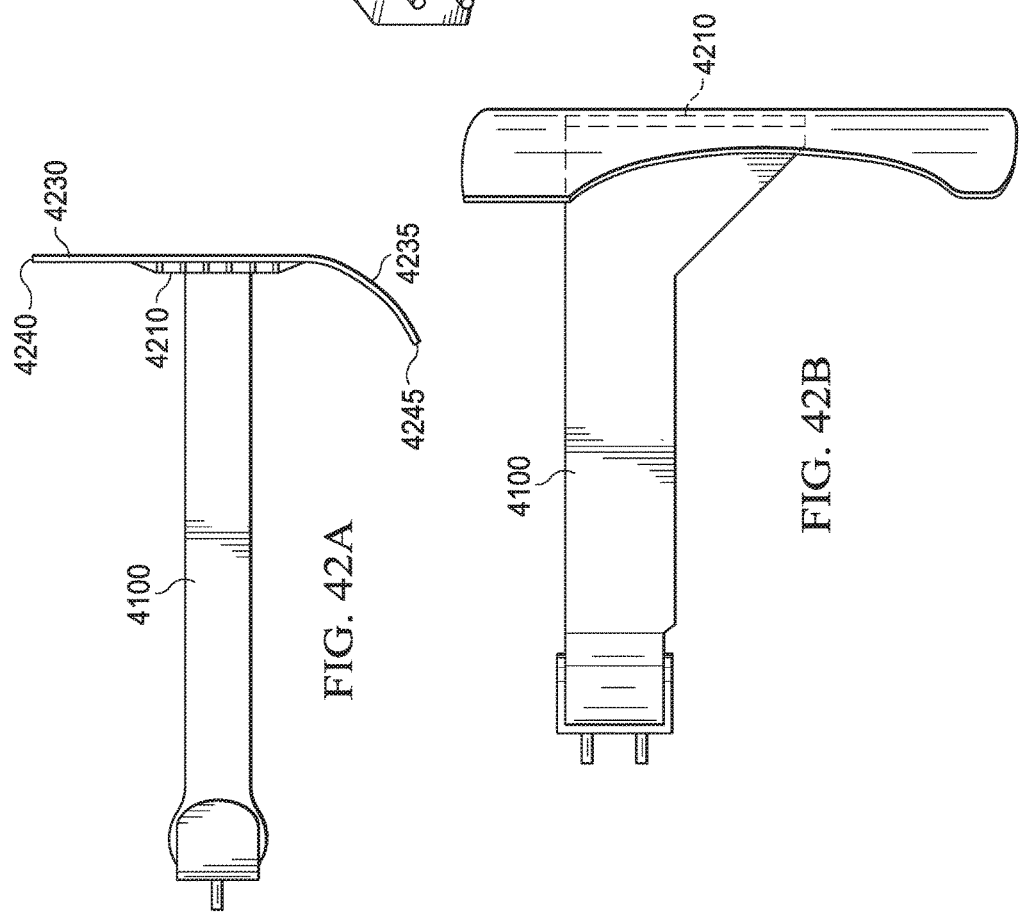

| CONFIGURATION NUMBER | TRACTOR | | | TRAILER | |
|---|---|---|---|---|---|
| | WHEEL COVERS | MIDDLE FENDER | MUD FLAP FAIRING | WHEEL COVERS | FUEL SAVINGS | AVERAGE WIND SPEED |
| 1 | X | | | | 0.21% | 0.43 MPH |
| 2 | | X | X | | 0.38% | 6.9 MPH |
| 3 | X | X | X | | 2.23% | 2.79 MPH |
| 4 | X | | X | X | 1.30% | 0.94 MPH |

AERODYNAMIC SYSTEM AND ADJUSTABLE FAIRINGS

RELATED APPLICATIONS

This patent application is a continuation of U.S. patent application Ser. No. 14/666,019, filed Mar. 23, 2015, entitled "AERODYNAMIC SYSTEM AND ADJUSTABLE FAIRINGS," issued as U.S. Pat. No. 9,663,157, which is a continuation of, and claims a benefit of priority under 35 U.S.C. 120 of the filing date of U.S. patent application Ser. No. 14/070,294, filed Nov. 1, 2013, entitled "AERODYNAMIC SYSTEM AND ADJUSTABLE FAIRINGS", issued as U.S. Pat. No. 9,027,983, which claims priority under 35 U.S.C. 119(e) to U.S. Provisional Patent Application No. 61/721,314, filed Nov. 1, 2012, entitled "ADJUSTABLE MUD FLAP HANGER WITH DURABLE AERODYNAMIC FAIRING ATTACHMENT," and U.S. Provisional Patent Application No. 61/746,386, filed Dec. 27, 2012, entitled "AERODYNAMIC SYSTEM AND ADJUSTABLE FAIRINGS," by Joshua Butler, Kyle Walker, Redza Shah and Timothy Uys, all of which are fully incorporated by reference herein in their entireties

TECHNICAL FIELD

This disclosure relates to aerodynamic systems for vehicles. More particularly, this disclosure relates to aerodynamic fairings for vehicles. Even more particularly, embodiments relate to aerodynamic fairings and support arms for large vehicles such as tractor trailers.

BACKGROUND

Large vehicles such as semis may easily travel several thousand miles each month, including on highways and other routes which allow for higher speeds. Poor aerodynamics cause a decrease in fuel economy and an increase in operating cost. Therefore, there is a need to increase the aerodynamics of such vehicles.

SUMMARY OF THE DISCLOSURE

Embodiments described herein provide systems and methods for improving the aerodynamics of vehicles, including large vehicles that are commonly seen pulling cargo trailers on highways, and which are generally referred to as "semis," "18-wheelers," "tractor trailers," and the like. Embodiments may also be beneficial on other vehicles as well.

One embodiment includes a fairing assembly adapted to couple to a vehicle, the assembly comprising an arm comprising one or more mud flap mounts to mount a mud flap and a fairing coupled to the arm, the fairing positioned to be to an outboard side of the mud flap, the fairing having an inboard surface and an outboard surface, the fairing outboard surface comprising an aerodynamic outer surface to direct flow in a rearward angle, including, but not limited to rearward and downward, rearward and upward, rearward and outward, rearward and inward and combinations thereof.

The fairing assembly may further comprise an adapter coupled to the fairing and to the arm at a distal end of the arm. The adapter can be configured such that the fairing is mountable in a plurality of mounting positions. According to one embodiment, the fairing may mount in a plurality of vertical, horizontal or rotational positions. According to one embodiment, the adapter comprises an adapter plate that defines a set of adapter mounting holes and a set of fairing mounting holes. The set of adapter mounting holes can align with a set of end holes at the end of the mud flap hanger arm in one or more positions and the fairing mounting holes can align with a set of fairing holes defined in the fairing. One embodiment may comprise a second plate coupled to the mud flap hanger arm, where the set of adapter mounting holes align with a set of holes in the second plate in one or more positions.

Furthermore, one embodiment of the arm can comprise a first anchor member, a second anchor member and a spring coupled to the first anchor member and the second anchor member. The spring can bias the arm to a base such that the arm is deflectable relative to the base. In another example, the spring biases an adapter plate to the arm such that the fairing is deflectable relative to the arm. In another embodiment, one or more springs may couple to the base and adapter plate to bias both the base and adapter plate.

The arm may comprise an adjustable length sleeve further comprising a main body defining an inner portion receiving channel and a first set of positioning holes. The adjustable sleeve may also comprise an inner portion at least partially received in the inner portion receiving channel. The inner portion may define a second set of positioning holes. The arm may further comprise an anchor member extending across and out of the inner portion. The main body can define a slot to accommodate the anchor member.

Another embodiment provides a fairing assembly adapted to position a fairing behind a wheel of a vehicle having a set of wheels, the fairing assembly comprising, a base configured to mount to the frame rail of the vehicle, an arm coupled to the base at a proximate end and extending laterally, an adapter at a distal end of the arm and a fairing configured to be located behind a wheel. By way of example, the fairing can be located between the wheels of a tandem set of wheels, behind a rear wheel of a tandem set of wheels or located behind another wheel. The fairing can be coupled to the adapter in a mounting position selected from one or more mounting positions.

The fairing can comprise a leading edge and a trailing edge. At least one of the fairing leading or trailing edges can have a shape substantially corresponding to a wheel shape. The fairing may also have an inboard surface and an outboard surface. The fairing outboard surface comprising an aerodynamic outer surface to direct flow in a rearward angle.

According to one embodiment, the base comprises a first anchor member and the arm comprises a second anchor member. A spring is coupled to the first anchor member and the second anchor member. The spring couples the arm to the base through tension such that the arm is deflectable relative to the base. In one embodiment, the fairing may also be spring attached such that the fairing is deflectable relative to the arm.

The fairing may have an aerodynamic outboard surface to direct flow in a desired manner. According to one embodiment, the outer surface may direct flow in a rearward angle such as straight back, back and out or back and in.

Another embodiment can comprise a mud flap hanger arm that includes a sleeve comprising a main body defining an inner portion receiving channel and having a mud flap mounting member defining a set of spaced mud flap mounts. The sleeve can further include an inner portion at least partially received in the inner portion receiving channel. The inner portion can be translatable in the inner portion receiving channel to a plurality of positions. A locking mechanism can be configured to lock the relative position of the main body and inner portion. A base can be coupled to the sleeve.

Another embodiment can include an aerodynamic system for a vehicle. The system can comprise a first fairing assembly having a first arm coupled to the vehicle and a fairing coupled to an outboard end of the first arm, the fairing having an outer surface to direct airflow leaving a wheel in a first rearward angle. The system can further comprise one or more additional aerodynamic components acting in cooperation with the fairing assembly to reduce drag of the vehicle about the wheel, including for example, aerodynamic wheel covers, quarter fender panels, middle fairings. According to one embodiment, the first fairing assembly comprises a mud flap fairing assembly and the one or more additional aerodynamic components comprise a middle fender assembly. The middle fairing assembly may further comprise a second arm coupled to the vehicle between a forward set of wheels and the rear set of wheels of the tandem set of wheels and a middle fairing mounted to the second arm, the middle fairing having an outboard surface to direct airflow in a second rearward angle.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein:

FIG. 1 depicts one embodiment of a mud flap hanger fairing assembly;

FIGS. 3A-3B depict views of one embodiment of an outer sleeve of a fairing support arm;

FIG. 16 depicts a view of another embodiment of a mud flap hanger fairing assembly;

FIG. 17 depicts a view of another embodiment of a mud flap hanger fairing assembly;

FIG. 18 depicts a view of another embodiment of a mounting bracket;

FIGS. 42A-42C depict views of another embodiment of a fairing support assembly;

DETAILED DESCRIPTION

Figure 2A:
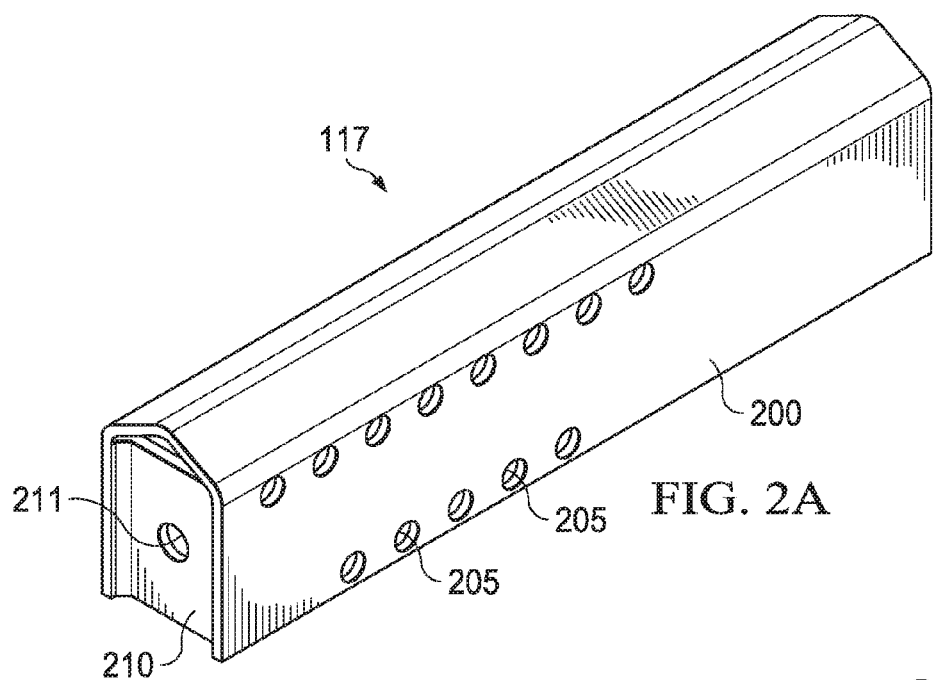
FIGS. 2A-2C depict views of one embodiment of an inner portion of a fairing support arm.

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like. Furthermore, any dimensions, materials or other such characteristics are provided by way of example and not limitation.

Embodiments described herein provide systems and methods for improving the aerodynamics of vehicles, including large vehicles that are commonly seen pulling cargo trailers on highways, and which are generally referred to as "semis", 18-wheelers," "tractor trailers" and the like and may be beneficial on other vehicles as well. Embodiments may be particularly suited for reducing drag, reducing or otherwise controlling the generation or distribution of spray/splash or improving the stability of large vehicles in an airstream.

One embodiment comprises a support arm that couples to a vehicle on a proximate end and supports a fairing on a distal end. Embodiments of an arm may use a spring or other attachment to allow deflection of a fairing assembly. Deflection of the fairing assembly may allow a person to access components behind the assembly, and may also absorb energy from tire blowouts, impacts or other debris. According to one embodiment, the arm may use a two-sided spring attachment to also allow deflection of a fairing in relation to the arm. In another embodiment, the arm may be fixed at the vehicle end, but the fairing adapter may be spring mounted to allow the fairing to deflect relative the arm. Multiple hangers having spring attachments having one-sided (vehicle side or fairing side) or two-sided spring attachments may be used to mount multiple fairings or to support a single larger fairing. In some cases, some fairings may be coupled to arms having spring attachments while others are coupled arms that are fixed or a single fairing may be coupled to one or more arms having spring attachments and to one or more fixed arms. Multiple fairings may also be coupled to the same arm (e.g., inboard and outboard of a mud flap or elsewhere).

According to one embodiment, a fairing support arm may have an adjustable length. Embodiments of an adjustable length hanger may allow the hanger length to be set in any desired range, depending on vehicle. By way of example, but not limitation, for some semi-trucks, the range of an arm's extension preferably includes lengths between 25 inches and 33 inches within the range of extension. However, the range of extension of arms may be selected as needed or desired and may, in some cases, not include lengths between 25 inches and 33 inches (e.g., an arm may have a range of extension that terminates at less than 25 inches, an arm may have a range of extension that begins at greater than 34 inches, etc.). Adjustable and fixed length arms as well as spring attached and fixed arms may have a variety of form factors. In some embodiments the arms may be straight. In others, the arms may be angled at the end (e.g., "shorty" hangers).

A support arm may mount to a vehicle frame in a manner that allows the position of the arm to be selectable. According to one embodiment, an assembly base may include a connection system that accommodates various hole patterns in a frame rail or other portion of a vehicle so that the base may be used with different hole configurations. In another embodiment, the base may include an adapter that allows the base to be mounted in one or more positions or rotational orientations.

In one embodiment, the arm may be a mud flap hanger arm. A fairing may mount to the mud flap hanger and be positioned outboard of the mud flap. In other embodiments, a fairing may be integral with a mud flap. Embodiments may also include a middle fairing hanger arm and middle fairing. The middle fairing hanger may have an adjustable length to accommodate various tire sizes and configurations, and may be deflectable as well. In some embodiments, the hanger is deflectable only in a generally vertical plane to prevent contact with a tire.

The fairing may be mounted to the end of the arm using an adapter that is coupled to or integral with the arm. According to one embodiment, the adapter may allow the horizontal, vertical or rotational position of the fairing to be selected. According to one embodiment, the adapter may include an adapter plate and a second plate. The second plate may be an end plate of an arm, a plate, a fixed or other plate coupled to a standard mud flap hanger or other hanger. The adapter plate may be coupled to the second plate in a number of selectable positions to adjust the mounting position of the fairing.

According to one embodiment, the adapter may have an extension that can be secured to a mud flap hanger using at least one of the existing holes in the hanger that are normally used to attach a mud flap to the hanger with fasteners such as a nut and bolt. By using a longer fastener, for example, this mounting method does not prevent the mud flap from mounting to the hanger using the same holes.

The fairing is preferably manufactured of durable material, such as polyurethane, which can absorb frequent impacts and deflections of the material (e.g., the corner of the mud flap hangers are commonly hit when backing up, and mud flaps are frequently in contact with curbs). Preferred materials for manufacturing a fairing include plastics, metals, and composites. A deflectable, resilient, and wearable material such as TPO or polyurethane may be desired, especially for regions of the part that may contact a trailer, ground, or wheels. Some materials or manufacturing processes that may provide a part with a lower density, such as low density polyurethane, blow-molding, or rotational molding, for example, may be desired such that the part is less likely to cause additional damage if it is damaged or dislodged from the vehicle, for example.

In some embodiments, a fairing may be provided with mechanisms for controlling splash and spray while also reducing aerodynamic drag (for example, perforations, fluid atomizing features, fluid flow directing features such as ribs, fluid trapping or re-directing features, etc.). A fairing may be formed as a single body or it may be assembled, such as with a structural center portion for support with deflectable material attached to the outer edges of the center portion.

According to one embodiment the fairing may have a variety of shapes. For example leading edge of the fairing may be straight or curved and the outer surface of the fairing may flat, angled or curved outward, angled or curved inward or some combination thereof to promote desired aerodynamic flow. The fairing may have symmetric design to fit either side of the vehicle in a desired position, including positions that are angled inward or outward.

One aspect of an aerodynamic system can include fairing assemblies that can be advantageous for improving the aerodynamic efficiency of large vehicles by helping to direct air flow around the wheels. Embodiments may utilize a fairing to direct airflow around selected components, including wheels, brake assemblies, and other components as needed. Fairings may be used in combination and with other aerodynamic products. For example, one or more of a rear mud flap fairing, a middle fairing, aerodynamic wheel covers and an aerodynamic quarter fender panel may be used together to increase aerodynamic efficiency.

Another embodiment can include an adjustable length mud flap hanger arm with or without a fairing.

FIG. 1 depicts view of one embodiment of a mud flap fairing assembly 100 comprising an arm 110 that attaches to a vehicle at a proximate end ("proximate" used to refer to being closer the vehicle) and supports a fairing 105 at a distal end ("distal" used to refer to being further away from the vehicle). Arm 110 may also provide mud flap mounting members having spaced slots to allow mounting of a mud flap suspended below arm 110. The fairing may mount to arm 110 using an adapter such as mounting adapter plate 180, various embodiments of which are discussed below. The adapter can allow the fairing to mount in various mounting positions to adjust the horizontal, vertical or rotation of the fairing.

Arm 110 couples to vehicle at a base 130 that couples to the frame of the vehicle (or other support structure) and connects to the vehicle (or other support structure) using one or more connection members 132 (bolts, rivets, screws or other connection member), welding or other coupling mechanism. Arm 110 may be rotatable relative to base 130 about one or more axes of rotation to enable arm 110 to deflect relative to the vehicle frame. Arm 110 may be straight along its entire length or arm 110 may be curved or angled. In some embodiments, arm 110 is curved or angled such that fairing 105 is supported more closely to its midline or center of mass of fairing 105.

Arm 110 may also be adjustable to extend some lateral length L as needed to position fairing 105 relative to the wheels of the vehicle. To this end, arm 110 may be telescoping, having multiple portions that can slide into each other to allow adjustability, such as inner portion 117 translatable within an outer sleeve 119. While only two portions are illustrated, arm 110 may include additional telescoping portions and include other arrangements. By way of example, but not limitation, the relative positions of sleeve 119 and inner portion 117 may be reversed such that the sleeve mounts to the vehicle and the fairing 105 mounts to the inner portion. A locking mechanism such as a bolt or other mechanism may be used to lock the positions of the telescoping portions to achieve a desired length of arm 110. Other mechanisms may be used to adjust the length of the arm in addition to or in lieu of telescoping including, but not limited to, spacers at the end proximate to the vehicle which offset the arm from the vehicle or spacers at the distal end of the arm that further offset the fairing from arm and hence the vehicle.

Fairing 105 has an inboard side 155 and an outboard surface 145. In general, fairing 105 may have a generally thin lateral profile and a much larger longitudinal profile, providing a surface area to promote streaming. Outboard surface 145 may form an aerodynamic outer surface that provides attached flow for longitudinal air flow (air flow streaming back as the vehicle moves forward) and can direct flow in a longitudinal angle such as parallel to the longitudinal axis of the vehicle, primarily back and inwards or back and outwards. Preferably, the fairing has a sufficient projected surface area (in view from the side of the vehicle) to promote attached flow. By way of example, but not limitation, the projected surface area may be 10 in2 to 10 ft2, though smaller and larger projected surface areas may be used if needed or desired.

Figure 2C:
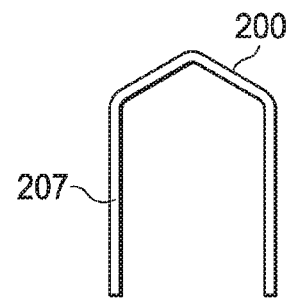
Figure 2B:
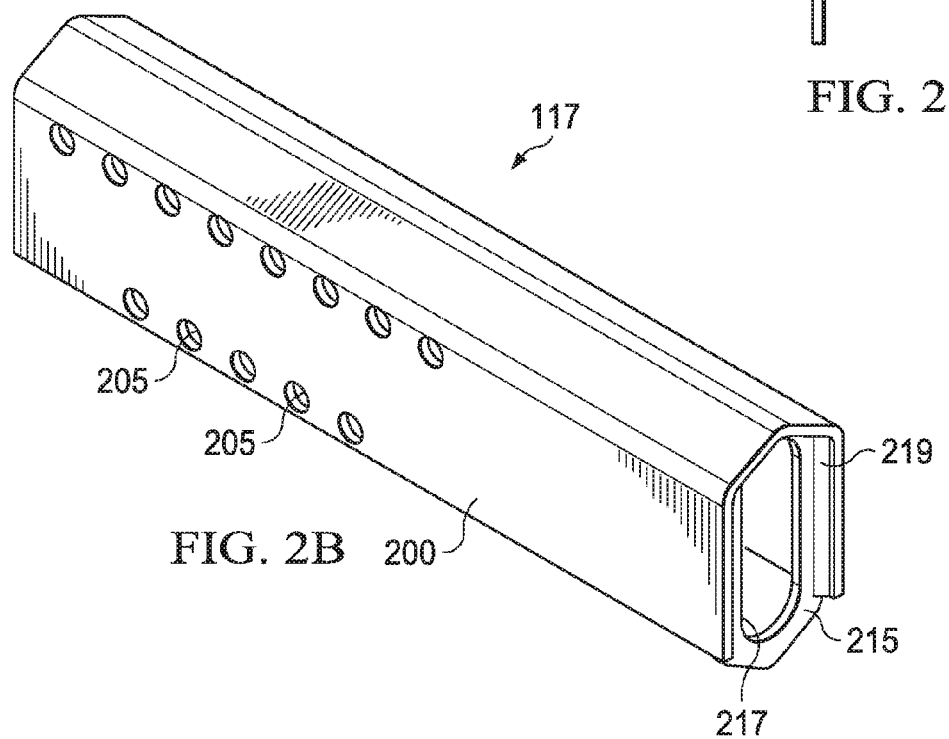

Inner portion 117 and outer sleeve 119 may have a variety of form factors. FIGS. 2A-2C, for example, are views of one embodiment an inner portion 117. As depicted in FIGS. 2A-2C, inner portion 117 may comprise an inner portion main body 200 formed of a material, such as steel or other material. Main body may form an inner channel 207 running all or a portion of the distance from the proximate end of inner portion 117 to the distal end of inner portion 117. Channel 207 can accommodate a spring or other components as discussed below. According to one embodiment, channel 207 may be open on one side (e.g., the bottom or other side) to allow access to components in channel 207. In other embodiments, channel 207 is not fully open on any of the top, bottom, front or back.

Main body 200 may have a pattern of length selection holes 205 defined therein that correspond to length selection holes in the outer sleeve. Holes 205 may be offset from the centerline of inner portion 117 or be otherwise arranged. In general, the pattern of holes may, in conjunction with holes on the outer sleeve, allow the inner and outer portions to be locked in a relative position using a bolt or other crossmember.

According to one embodiment, main body 200 may be formed by folding a sheet of metal along multiple lines. In some embodiments, steel or other material may be used. In other embodiments, main body 200 may be formed from multiple pieces and types of materials coupled together.

Inner portion 117 may further include a distal end plate 210 having opening 211 at the proximate end of channel 207. End plate 210 may be coupled to main body 200 by welding or other coupling mechanism and partially cover the distal portion of channel 207. Opening 211 passes through end plate 210 and may accommodate a component, such as an eye bolt, a partial U-bolt or other component.

Inner portion 117 may also include a proximate end plate 215 welded or otherwise joined main body 200 that at least partially covers the proximate end of channel 207. End plate 215 may include an opening 217 there through to allow a component to pass through end plate 215 into channel 207. In some embodiments, end plates 210 and 215 may be formed from the same material main body 200 or of different materials. End plates 210 and 215 may provide additional rigidity to inner portion 117. End plates 210 and 215 may be flush with or inset slightly from the ends of main body 200 and include edge flanges that promote welding or other joining at 219.

FIGS. 3A-3B depict views of one embodiment of a sleeve 119. In some embodiments, sleeve 119 may comprise a main body 300 formed from a single sheet of material, such as steel or other material, that is bent, curved or angled into a desired configuration. In other embodiments, main body 300 may be formed multiple pieces and materials. Sleeve main body 300 may include an inner portion receiving portion 302 that defines a channel 304 into which an inner portion may be inserted (e.g., inner portion 117 of FIGS. 2A-2C or other inner portion). Channel 304 may have a profile that generally matches the outer profile of the inner portion. A pattern of length selection holes 305 may be defined through the front and back faces of main body 300 that are spaced so that the holes match corresponding holes in the inner portion (e.g., pattern of holes 205 illustrated in FIG. 2A). A through bolt passing the length selection holes or other securing mechanism can be used to secure the relative positions of sleeve 119 and the inner portion received in receiving channel 304.

Sleeve 119 may further include a mud flap mounting members 306 that comprises portions of material extending downward from main body 300 and that define a set of horizontally spaced slots 311. According to one embodiment, mud flap mounting members 306 comprise flanges that run all or a portion of the length of main body 300. The mud flap mounting area runs a sufficient lateral distance to allow a standard mud flap to be securely mounted. A benefit of an adjustable length hanger may be that mud flaps may not require trimming if one desires the flap not to stick out past the wheels, for example. Trimming of mud flaps is commonly done to improve aerodynamic efficiency but the process requires substantial time and effort.

Furthermore, FIG. 3A depicts end plate 310 having end holes 312. End plate 310 may be welded or otherwise joined to main body 300 to provide a fixed plate. According to one embodiment, end plate is inset from the ends of main body 300 and includes flanges to promote welding or joining (e.g., at 315). In one embodiment, end holes 312 are not threaded, but end plate 310 may comprise threaded nuts coupled to the proximate side of end plate 310, such as by welding or other mechanism, to create a threaded hole. Holes 312 provide for outward attachment of a fairing adapter, a fairing or other components. As one example, an adjustable adapter plate 180 (see FIG. 1) may be configured to mount to fixed end plate 310 in multiple positions. Adapter plate 180 can be configured to allow mud flap mounting members 306 to deflect elastically to secure a mud flap even when adapter plate 180 is installed.

Returning briefly to FIG. 1, arm 110 may deflect by one or more of rotation and translation relative to the trailer frame, such as in response to a tire blowing out, impact of the hanger assembly with an object, a mechanic pushing arm 110 to gain access to a component, etc. According to one embodiment, arm 110 may deflect because arm 110 is not rigidly attached to base 130, but is held against base 130 by spring tension.

Figure 4A:
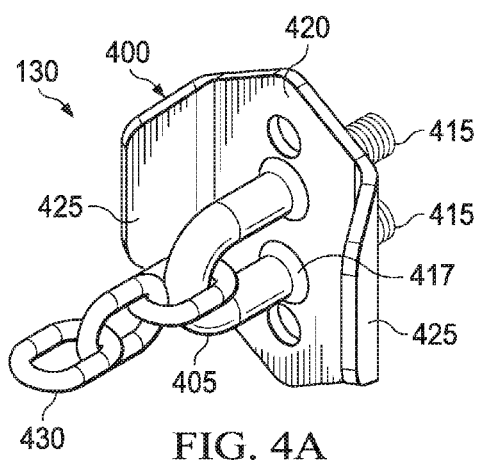
FIGS. 4A-4C depict views of one embodiment of a base.
Figure 4B:
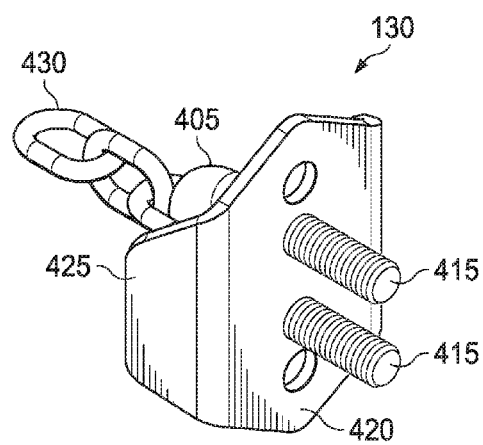
Figure 4C:
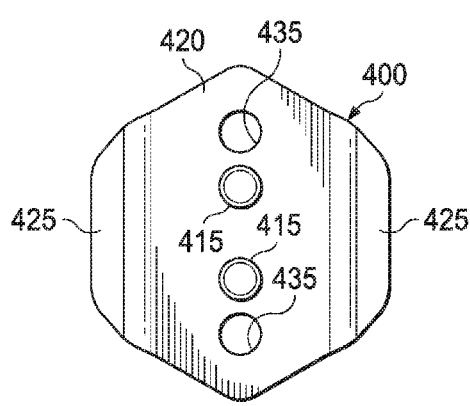

FIGS. 4A-4C depict views of one embodiment of base 130. Base 130 can comprise a base plate 400, an anchor member 405 and connection members 415. Base plate 400 can include a first portion 420 configured to mount to the vehicle. For example, first portion 420 may be flat to rest against the frame of a vehicle. Second portions 425 may be angled front and rear flanges angled outwards a selected angle away from the vehicle to limit deflection as discussed below. By way of example, but not limitation, base plate 400 may be formed of single sheet of material, such as steel or other material, bent along selected lines. In other embodiments, base plate 400 may be formed of one or more pieces made of the same or different materials.

According to one embodiment, anchor member 405 is coupled to base plate 400, e.g., by welding or otherwise (represented at weld 417). Anchor member is any member that can provide a suitable attachment point for a tension member, such as a spring. The tension member may be coupled to anchor member 405 directly or through a linkage, such as chain 430.

Connection members 415 can be used to bolt or otherwise connect base 130 to the vehicle. In the embodiment illustrated, anchor member 405 and connection members 415 comprise portions of a U-bolt. In other embodiments, anchor member 405 and connection members 415 may comprise portions of an eye bolt or other anchor. In yet another embodiment, anchor member 405 and connection member 415 may be separate components (e.g., anchor member may be loop welded or otherwise attached to base plate 400 and connection member 415 may be threaded posts). As another example, one connection member may be the threaded post of a partial U-bolt or eye bolt and the other anchor member a threaded stud. A base may be connected to the vehicle using other types of connection members (e.g., screws, rivets, etc.) or connection mechanisms (e.g., welding or other joining technique).

Base plate 400 provides openings for connection members 415. Connection members 415 may be advanced through the openings in mud flap hanger base plate 400 for coupling base 130 to a vehicle frame. In some embodiments, the spacing between the openings may be based on frame hole spacing, typically 1 and ⅛ inches or other spacing. Members 415 may be threaded into, welded to or otherwise coupled to base plate 400. Base plate 400 may further include openings 435 to accommodate other connection members, such as bolts or other connection members that may be used to connect base plate 400 to the vehicle.

Figure 5A:
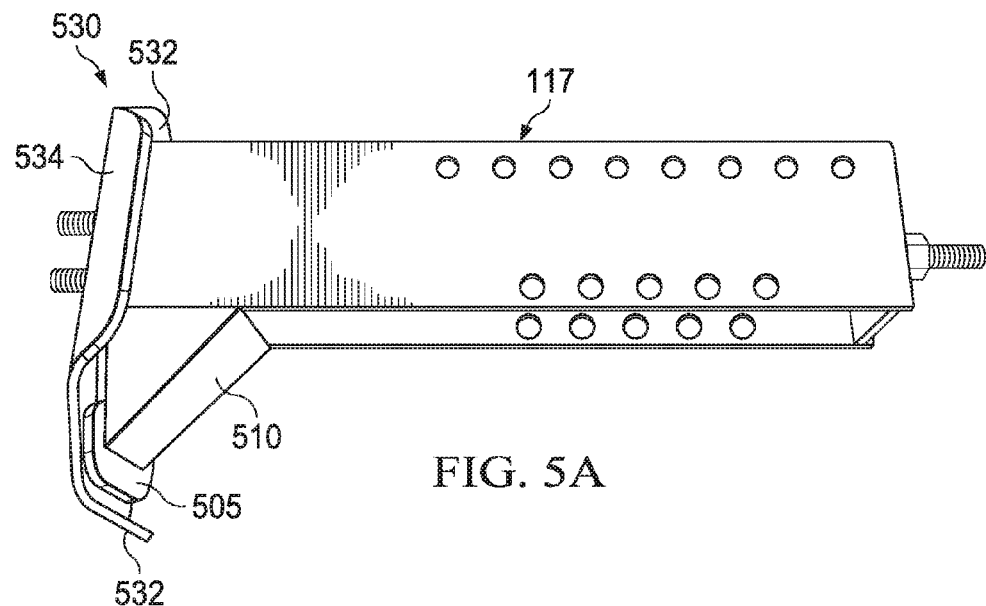
FIGS. 5A-5B depict views of another embodiment of an inner portion of a fairing support sleeve.
Figure 5B:
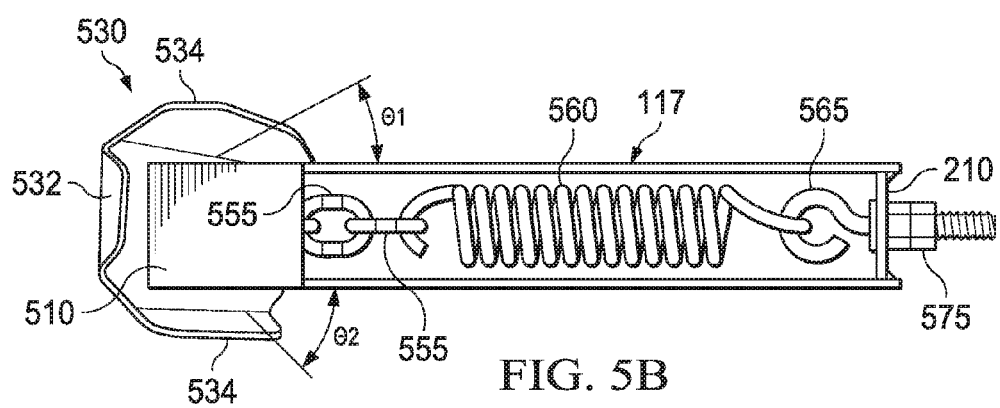

FIGS. 5A-5B depict an embodiment of an inner portion 117 mounted to a base 530. Base 530 may be similar to that discussed above except that base plate includes front and back angled flanges 534 and top and bottom angle flanges 532. Furthermore, additional support is provided to inner portion 117. A support may include an end plate 505 and a buttress 510 coupled to the bottom of inner portion 117 and the outboard face of end plate 505. Buttress 510 can provide additional distribution of force between inner portion 117 and base 530 to provide additional vertical support to inner portion 117. Inner portion 117 may be welded or otherwise joined to end plate 505 and buttress 510.

At a proximate end, an anchor member may pass through an opening of an endplate (e.g., anchor member 405 of FIG. 4A can pass through opening 217 as illustrated in FIG. 2B). At the distal end, a second anchor member 565 may extend inward from end plate 210. Second anchor member 565 may be a U-bolt, eye bolt, a U of material or other component that can serve as an anchor point. According to one embodiment, for example, anchor member 565 is an eye bolt threaded through a hole (e.g., hole 211 of FIG. 2A), with the eye of the bolt on the proximate side of distal plate 210 and nuts 575 on the distal side.

A first end of spring 560 (or other tension member) is hooked or otherwise attached to chain 555, which is attached to the anchor member of base 530 (e.g., similar to as illustrated in FIG. 4A for base 130) and a second end of spring 560 is hooked or otherwise attached to second anchor member 565 to hold inner portion 117 against base 530 based on the tension force. Because spring 560 can stretch, inner portion 117 can deflect vertically and horizontally when sufficient force is applied. Consequently, the arm may deflect.

As the force is removed, the spring force may act as a return mechanism such that inner portion 117 is returned to a preferred (or neutral) position. The deflection inner portion 117 relative to base 130 may be controlled. For example, the size and angle of front and back flanges 534 may control forward and backward deflection to a selected angle and upper and lower flanges 532 may control vertical deflection to a selected angle. It can be noted that each flange may angle the same amount or different amounts and the angle of deflection may be limited to the same angle in each direction or different angles in each direction or the same angle in some directions and different angles in other directions.

As depicted in FIG. 5B, in some embodiments, second anchor member 565 may be an eye bolt passing through end plate 210 of inner portion 117 (e.g., through an opening such as opening 211 depicted in FIG. 2A). The eye bolt may be advanced or withdrawn to adjust how much tension is applied to spring 560, thereby dictating how much force is needed to deflect an arm (e.g., arm 110 of FIG. 1) relative to the vehicle frame. Fasteners, such as nuts 575, may be used to secure the anchor member in a desired position. One advantage of the embodiment of FIG. 5B is that the spring can be tensioned from external to the inner portion 117 by rotating the nuts 575 to advance the threaded anchor member 565. This allows the spring to be easily tensioned after installation of inner portion 117 to control the amount of force required to deflect the arm. Additionally, the spring can be easily loosened to make the arm more deflectable (e.g., during maintenance).

Figure 6:
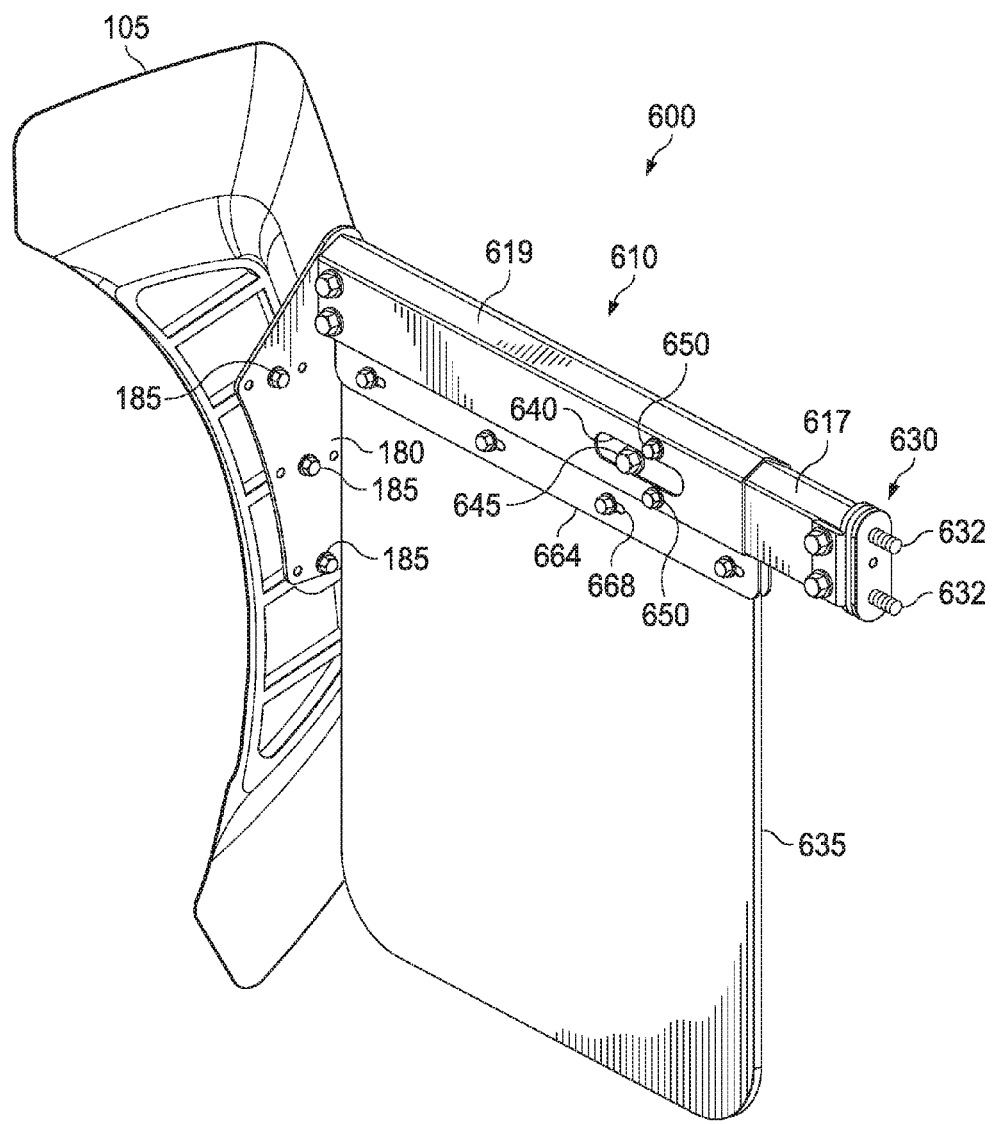
FIG. 6 depicts views of another embodiment of a mud flap hanger fairing assembly.

FIG. 6 depicts views of another embodiment of a rear mud flap fairing assembly 600 comprising an arm 610 that attaches to a vehicle at a proximate end and supports a fairing 105 at a distal end. Arm 610 may also provide support for a mud flap 635 suspended below arm. Fairing 105 may mount to the distal end of arm 610 using an adapter plate 180.

Arm 610 couples to vehicle at a base 630 that connects to the vehicle using one or more connection members 632, welding or other coupling mechanism. Arm 610 may be rotatable relative to base 630 about one or more axes of rotation to enable arm 610 to deflect relative to the vehicle frame. Arm 610 may be straight along its entire length or arm 610 may be curved or angled. In some embodiments, arm 610 being curved or angled such that fairing 105 is supported more closely to its midline or center of mass of fairing 105.

Arm 610 may also be adjustable to extend some length L as needed to position fairing 105 relative to the wheels of the vehicle. To this end, arm 610 may be telescoping, having multiple portions that can slide into each other to allow adjustability. Accordingly, according to one embodiment, arm 610 may comprise an inner portion 617 translatable within an outer sleeve 619. While only two portions are illustrated, arm 610 may include additional telescoping portions and include other arrangements By way of example, but not limitation, the relative positions of sleeve 619 and inner portion 617 may be reversed such that the sleeve mounts to the vehicle and the fairing 105 mounts to the inner portion. A locking mechanism such as bolts 650 or other mechanism may be used to lock the positions of the telescoping portions to achieve a desired length of arm 610.

In some embodiments, sleeve 619 may comprise a main body formed from a single sheet of material, such as steel or other material that is bent, curved or angled into a desired configuration. In other embodiments, the main body may be formed multiple pieces and materials. The sleeve main body may include a receiving portion that defines a channel into which an inner portion 617 may be inserted. The channel may have a profile that generally matches the outer profile of the inner portion 617. A pattern of length selection holes may be defined through the front and back faces of the sleeve main that are spaced so that the holes match corresponding length selection holes in the inner portion 617. A through bolt 650 passing through the holes or other securing mechanism can be used to secure the relative positions of sleeve 619 and the inner portion 617.

Sleeve 619 may further include a mud flap hanger members 664 that comprises portions of material extending downward at the lower portion of the main body and that define a set of horizontally spaced mud flap mounting slots 668. Mud flap hanger members may run a sufficient horizontal distance to allow a mud flap to be mounted at multiple points.

Sleeve 619 may further define a lateral slot 640 to accommodate an anchor member 645 passing through inner portion 617. Slot 640 allows arm 610 to accommodate anchor member 645 when sleeve 619 and inner portion 617 are in a variety of relative positions. Thus, arm 610 may be similar to arm 110 except that sleeve 619 accommodates the through bolt.

A fairing may be directly coupled to an arm or may be coupled to an arm using an adapter. Suitable adapters may be provided to mount a fairing to a variety of arms, including conventional mud flap hanger arms that are not otherwise configured to support a fairing.

FIG. 6 depicts one embodiment of fairing 105 mounted to arm 610 with an adapter that comprises mounting adapter plate 180. Adapter plate 180 may mount to the end of arm 610 to have a generally longitudinally aligned outer surface and inner surface. Adapter plate 180 may comprise a pattern of fairing mounting holes to match holes in the fairing 105 and pattern of adapter mounting holes to match a pattern of end holes defined in a distal face of arm 610. Referring briefly to FIG. 3A and FIG. 12, the pattern of adapter mounting holes may match holes in the end of outer sleeve 619 (e.g., similar to holes 312 of FIG. 3) to allow adapter plate 180 to be mounted to the end of an arm and the pattern of fairing mounting holes may match fairing holes 1203 to allow a fairing 105 to be mounted on adapter plate 180 using connection members 185, such as bolts or other connection members. The pattern of holes on adapter plate 180 can be configured to allow the bracket to be mounted in various horizontal, vertical or rotational positions relative to the arm and hence the fairing to be mounted in various positions so that the vertical, horizontal and angle of rotation of the fairing may be selected. Thus, an adjustable bracket may be couple to a fixed end plate (e.g., end plate 310) to provide a mounting adapter for the fairing. In other embodiments, the adapter plate may only provide a single mounting position. In yet other embodiments, the fairing may mount directly to end plate 310 in a single or in multiple positions.

Figure 7:
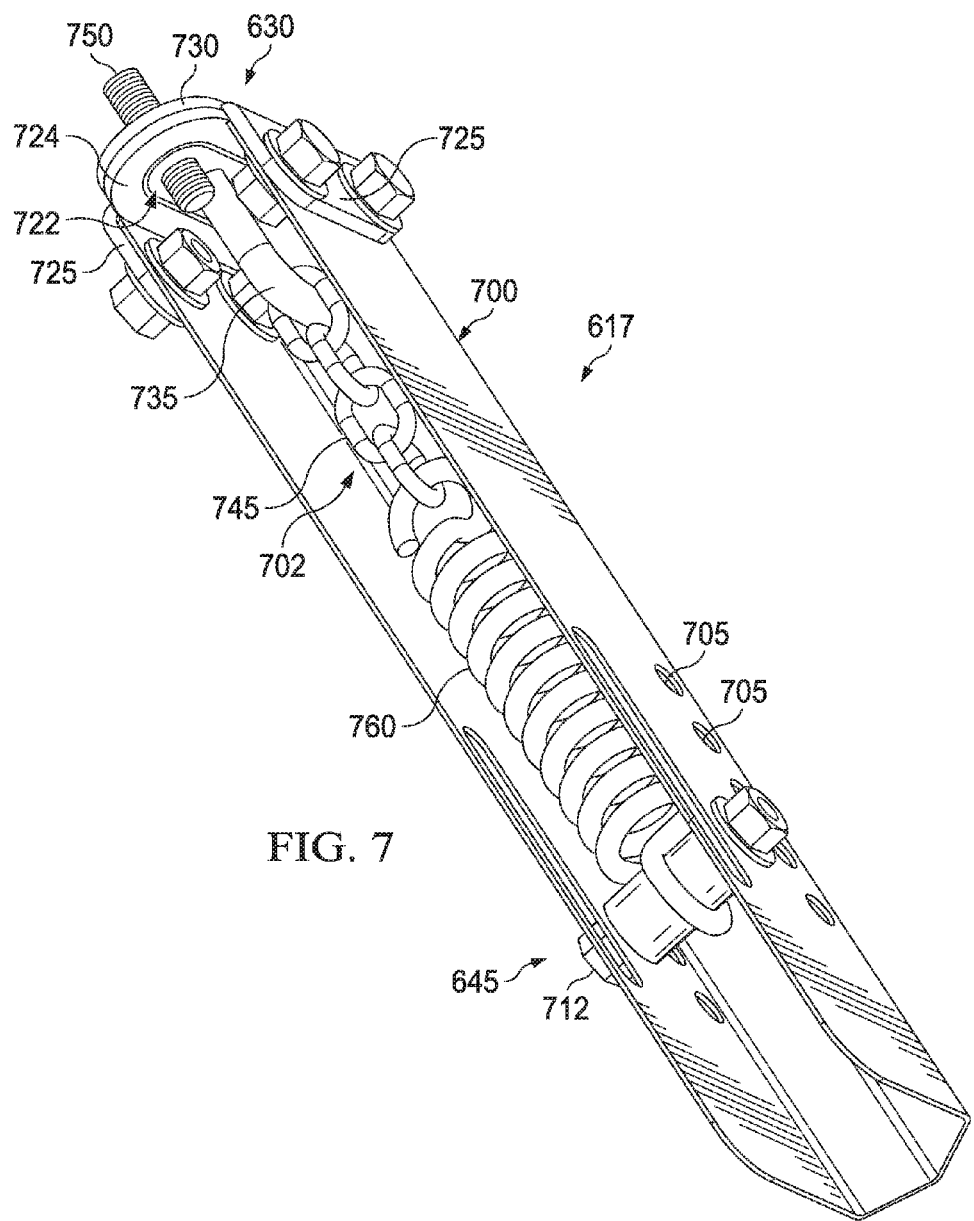
FIG. 7 depicts another embodiment of an inner portion of a fairing support arm.

FIG. 7 depicts a view of one embodiment of an inner portion 617, illustrating an alternate return mechanism for allowing arm 610 to deflect relative to base 630 and to return to a preferred position. Inner portion 617 can comprise a main body 700 defining a channel 702 sized to accommodate various components. A pattern of length selection holes 705 may be defined through main body 700 that can correspond to length selection holes in the outer sleeve to allow a securing mechanism, such as a through bolt, to pass through inner portion 617 and the outer sleeve to lock inner portion 617 and the outer sleeve in preferred relative positions such that the arm has a desired length.

A proximate end plate 724 may be coupled to inner portion 617 that at least partially covers the proximate end of channel 702. An opening 722 through end plate 724 can provide access to channel 702. Opening 722 can be sized to allow various components to pass through opening 722. Front and rear lateral extensions 725 may extend outward from end plate 724 and be spaced to be wider than the outer walls of main body 700 and preferably to abut the outer surfaces of main body 700. Bolts or other connecting members may be accommodated through holes in main body 700 and front and rear lateral extensions 725 to couple end plate 724 to main body 700. In another embodiment, lateral extensions may extend to the inside of channel 702 to allow connection of end plate 724 to inner portion 617.

Base 630 may include a base plate 730 and an anchor member 735 coupled to base plate 730. Anchor member 735 may be an eye bolt, a U-bolt, a u-shaped piece of metal or other member to which chain 745 or tension member can anchor. According to one embodiment, anchor member 735 is a U-bolt with a single post that passes through base plate 730 (a partial U-bolt). The post can act as a connection member to secure base 630 to the vehicle. A second connection member 750, such as a threaded post, may be used to further secure base 630 to the vehicle frame. Thus, base 630 may be bolted to frame rails.

Figure 8A:
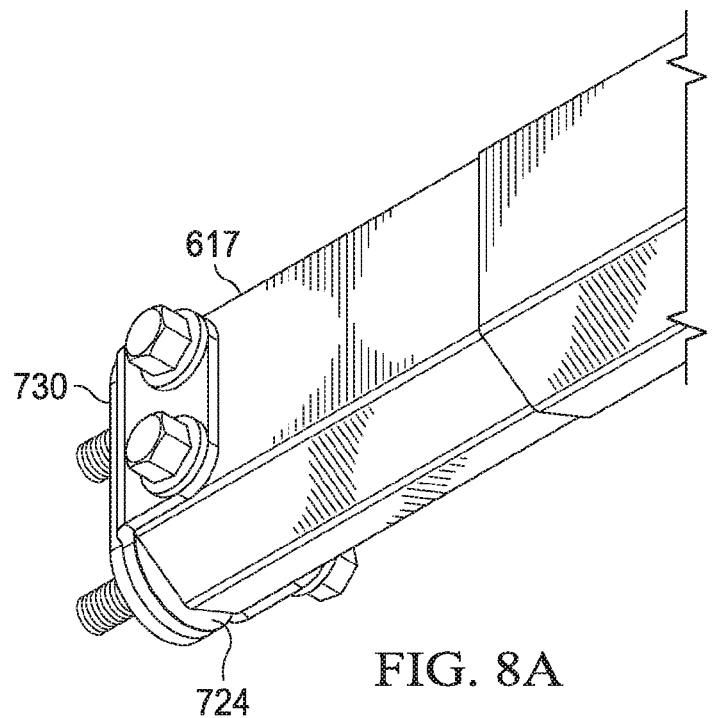
FIGS. 8A-8B depict a partial view of one embodiment of support arm illustrating deflection of an arm.
Figure 8B:
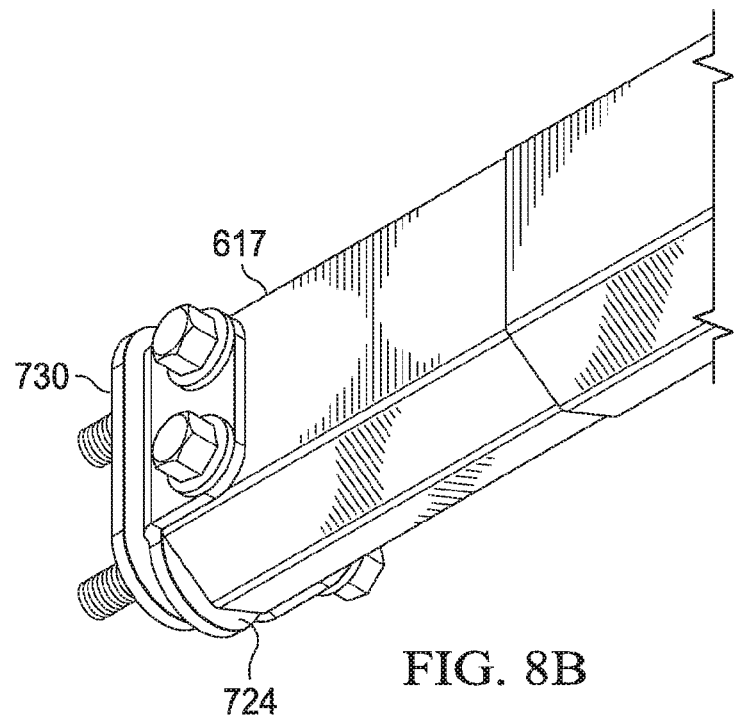

A hook at the first end of spring 760 may connect to anchor member 645, which may be part of a through bolt 712 or other cross-member running transverse to channel 702. A hook at the second end of spring 760 may connect to chain 745 which, in turn, connects to anchor member 735. Spring 760 maintains tension on chain 745 coupling inner member 617 to base 630 through tension. However, if sufficient force is asserted on inner member 617, inner member 617 may rotate relative to base 630. FIG. 8A, for example, depicts inner portion 617 in a neutral position in which end plate 724 and the base plate 730 are generally parallel and abutting and FIG. 8B depicts lateral deflection of inner portion 617 relative to base 630, such that end plate 724 is angled relative to the base plate 730. For simplicity, FIG. 8B only depicts simple deflection in a substantially horizontal plane. However, the deflection may occur in multiple planes or may include some rotation about an axis normal to the vehicle frame rail, or some combination.

Figure 9A:
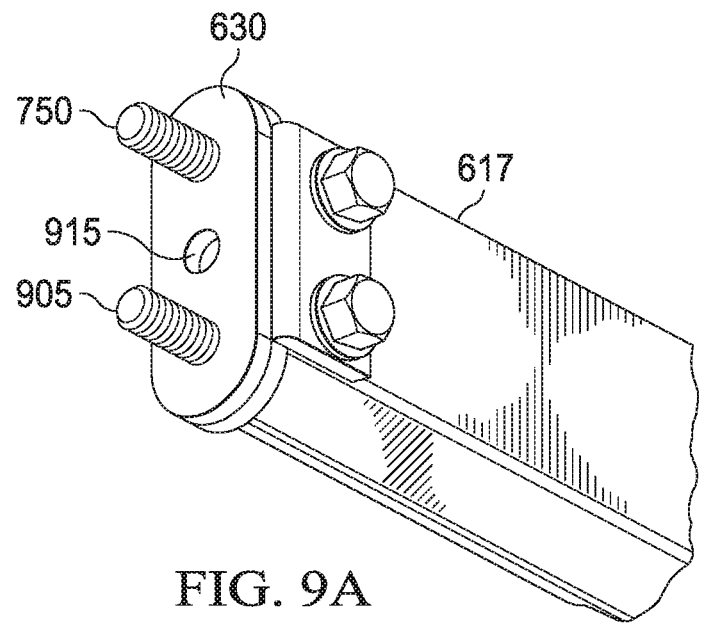
FIGS. 9A-9B depict a partial view of one embodiment of a support arm illustrating selectable connection member spacing.
Figure 9B:
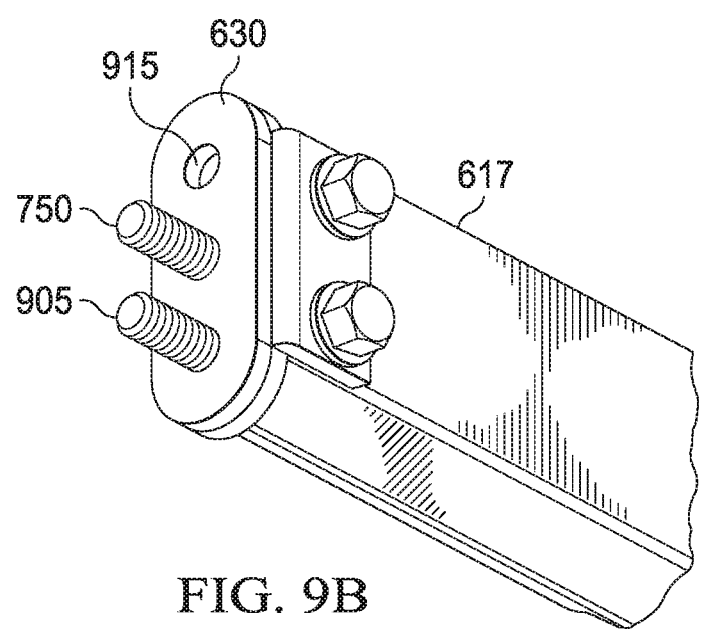

FIGS. 9A and 9B depict one embodiment of inner portion 617 and base 630 illustrating various arrangements of connection members. In the example of FIGS. 9A and 9B, first connection member 905 may be the shank of a U-bolt or other bolt (e.g., extending from anchor member 735 through base plate 730 of FIG. 7), may be a fixed threaded post separate from the anchor member or may be another connection member, such as a threaded stud. Second connection member 750 is a threaded stud that can be received in one of several spaced holes 915 through base plate 730. The selection of any opening 915 may be based on the openings aligning with corresponding openings on the vehicle frame. The connection members can pass laterally through a vehicle frame and be secured with nuts.

Figure 10:
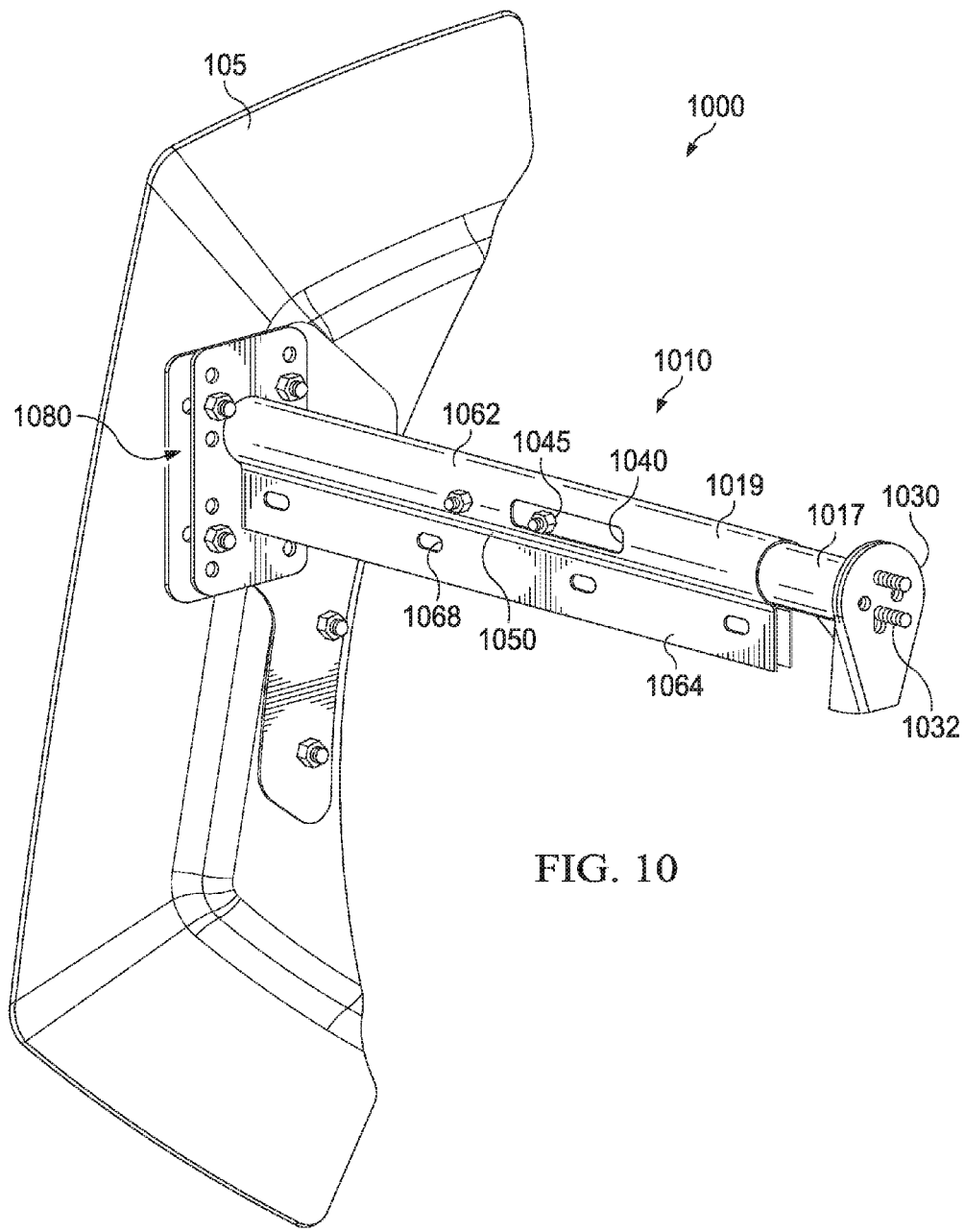
FIG. 10 depicts a view of another embodiment of a mud flap hanger fairing assembly.
Figure 11:
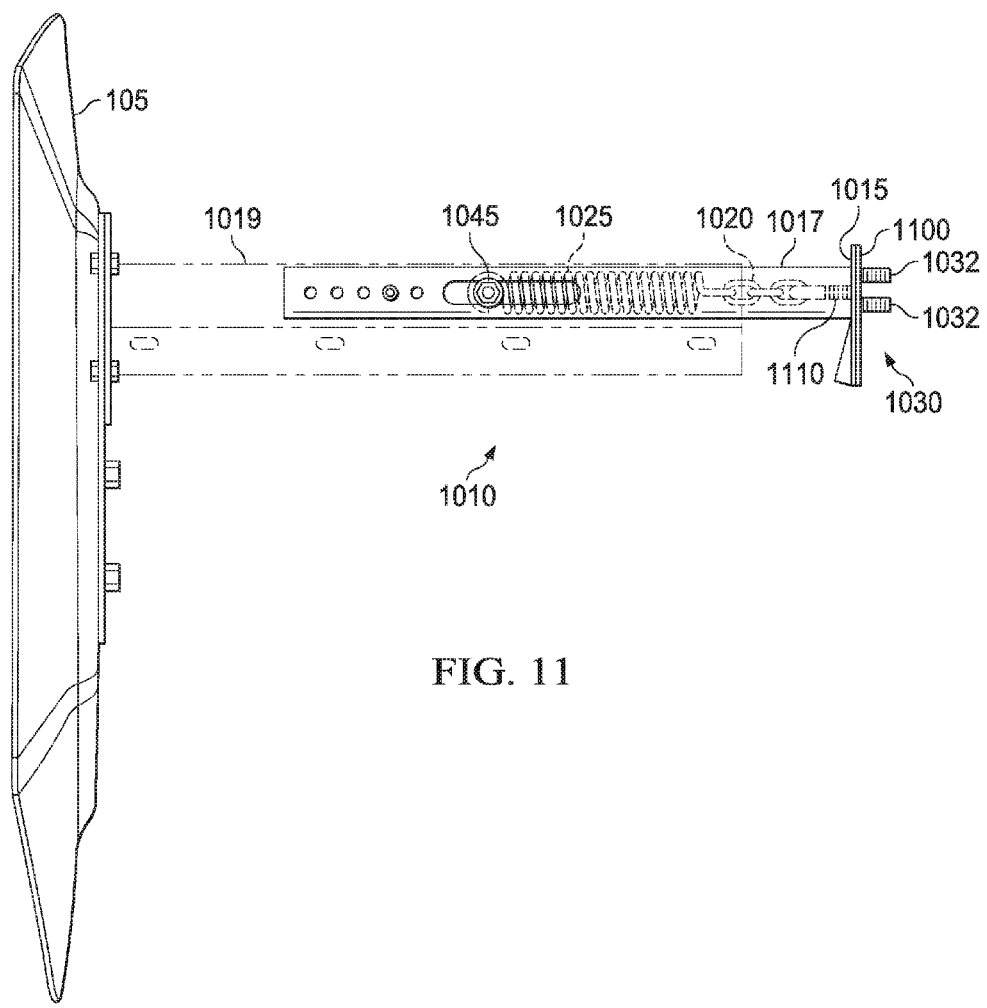
FIG. 11 depicts a view of another embodiment of a mud flap hanger fairing assembly.

FIGS. 10 and 11 depict views of one embodiment of a rear mud flap fairing assembly 1000 comprising an arm 1010 that attaches to a vehicle at a proximate end and supports a fairing 105 at a distal end. Fairing 105 may be mounted to arm 1010 using an adapter 1080 that couples to the distal end of sleeve 1019. One embodiment of adapter 1080 is discussed in more detail below in conjunction with FIGS. 13A and 13B.

Arm 1010 couples to vehicle at a base 1030 at the proximate end and connects to the vehicle using one or more connection members 1032, such as threaded shanks that attach with nuts or other connection members, welding or other coupling mechanism. Arm 1010 may be rotatable relative to base 1030 about one or more axes of rotation to enable arm 1010 to deflect relative to the vehicle frame. Arm 1010 may be straight along its entire length or arm 1010 may be curved or angled Arm 1010 may also be adjusted to length L as needed to position fairing 105 relative to the wheels of the vehicle. To this end, arm 1010 may be telescoping having multiple portions that can slide into each other to allow adjustability. Accordingly, according to one embodiment arm 1010 may comprise an inner portion 1017 translatable within an outer sleeve 1019. While only two portions are illustrated, arm 1010 may include additional telescoping portions and include other arrangements By way of example, but not limitation, the relative positions of sleeve 1019 and inner portion 1017 may be reversed such that the sleeve mounts to the vehicle and the fairing 105 mounts to the inner portion. A locking mechanism such as bolt 1050 or other mechanism may be used to lock the positions of the telescoping portions to achieve a desired length of arm 1010.

In some embodiments, sleeve 1019 may comprise a main body formed from a single sheet of material, such as steel or other material that is bent, curved or angled into a desired configuration. In other embodiments, the main body may be formed multiple pieces and materials. The sleeve main body may include an inner portion receiving portion 1062 that defines a channel into which an inner portion 1017 may be inserted. The channel may have a profile that generally matches the outer profile of the inner portion 1017. In the example of FIGS. 10 and 11, the channel has a generally circular shape. A pattern of holes may be defined through the front and back faces of the sleeve main that are spaced so that the holes match corresponding holes in the inner portion 1017. A through bolt 1050 passing the holes or other securing mechanism can be used to secure the relative positions of sleeve 1019 and the inner portion 1017 received in receiving channel.

Sleeve 1019 may further include mud flap mounting members 1064 that comprise portions of material extending downward at the lower portion of the main body and that define a set of horizontally spaced mud flap mounting slots 1068. Mud flap hanger members may run a sufficient horizontal distance to allow a mud flap to be mounted at multiple points.

Sleeve 1019 may further define a slot 1040 to accommodate an anchor member 1045 passing through inner portion 1017. Slot 1040 allows arm 1010 to accommodate anchor member 1045 when sleeve 1019 and inner portion 1017 are in a variety of relative positions. Anchor member 1045 may be a bolt or other cross member that provides an anchor point for a spring as discussed above.

With reference to FIG. 11, base 1030 can include a base plate 1100, connection member 1032 and an anchor member 1110 coupled to base plate 1100. Anchor member 1110 can extend through an opening in endplate 1015 of inner portion 1017. A tension member comprising a chain 1020 and spring 1025 can be coupled between anchor member 1110 and a second anchor member 1045 to create a tension force that holds inner portion 1017 and base 1030 together. As discussed above, the spring allows inner portion 1017 to deflect and return to a neutral position.

Thus, as discussed above, mud flap fairing assemblies may include deflectable arms having variable lengths in a variety of form factors. In other embodiments, the arms may be configured without mounting areas for mud flaps so that the arms act as fairing supports but not mud flap hangers. In any case, fairing support arms may be placed in desired locations on the vehicle to support a variety of fairings.

As discussed above, fairing assemblies may include a fairing to direct airflow. The shape, size, materials, stiffness, and other characteristics of a fairing may be selected to minimize splash/spray or provide other advantages along with directing air flow. In some embodiments, a first fairing may be designated for use on the left side of a vehicle and a second fairing may be designated for use on the right side of the vehicle, such that fairings are manufactured asymmetrically for use on a particular side. For example, top and bottom edges may differ in one or more of shape, curvature, stiffness, etc. In other embodiments, fairings may be symmetric or otherwise manufactured for use on either side of the vehicle.

Figure 12A:
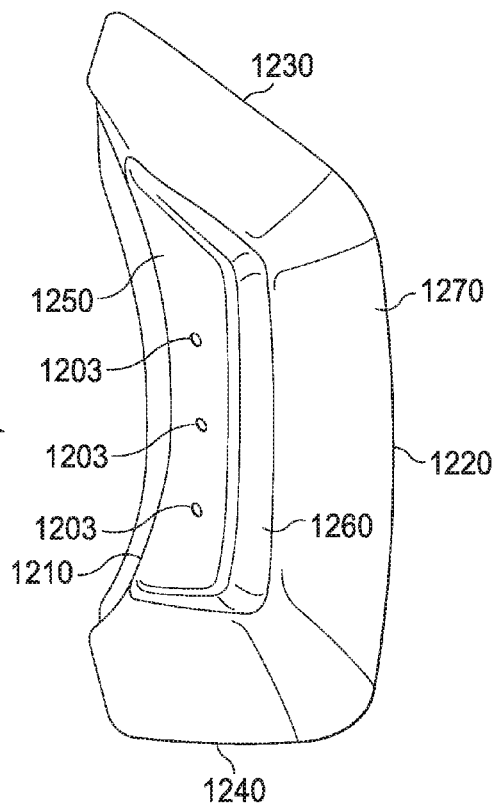
FIGS. 12A-12C depict views of one embodiment of a fairing.
Figure 12B:
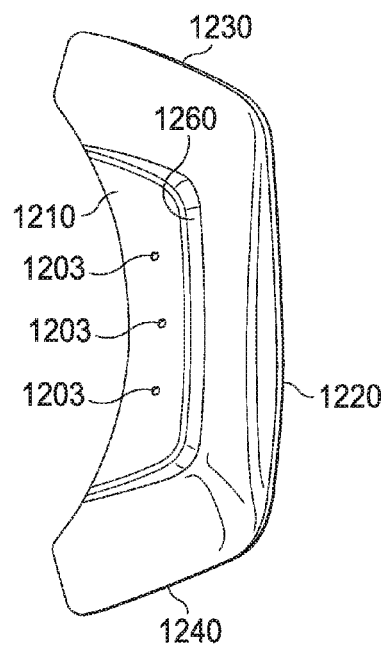
Figure 12C:
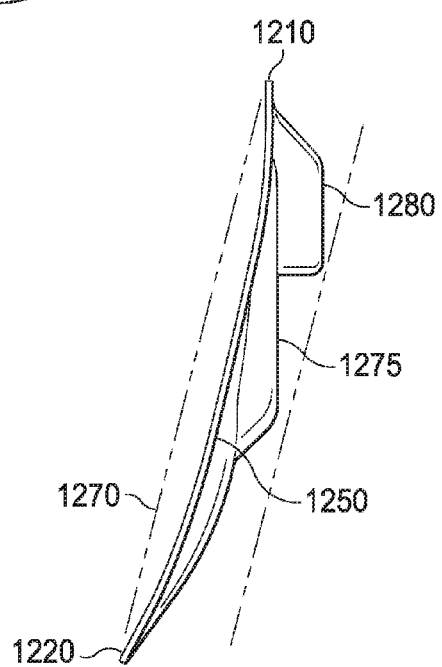

FIGS. 12A-12C depict views of one embodiment of a fairing having a leading edge 1210, a trailing edge 1220, a top edge 1230 and a bottom edge 1240. The fairing may include a pattern of holes 1203 that allow mounting of the fairing. Leading edge 1210 has a curved portion for accommodating the profile of a wheel. The fairing may be shaped to have a continuous aerodynamic surface from leading edge 1210 to trailing edge 1220 to promote attached flow across the surface. According to one embodiment, the fairing may be shaped to direct airflow over a first surface portion 1250, over a transition area 1260, over a second surface portion 1270 or some combination. In one embodiment, first surface portion 1250 may be formed as a relatively flat surface, transition area 1260 may be formed as a discrete or stepped transition zone transitioning from first surface portion 1250 to second surface portion 1270, and second surface portion 1270 may be formed as an angled or curved outward surface. The fairing may include more or fewer surfaces, areas or zones as needed and in some embodiments may have flat outer surfaces. Curves may be compound or simple, and stepped areas may include more than one step.

The inner surface of the fairing may provide a flat mounting zone 1275 that may abut and outboard face of an arm or adapter. An area of increased thickness 1280 may be disposed in front of the mounting zone provide additional support. The front face of area 1280 may be curved.

Figure 13A:
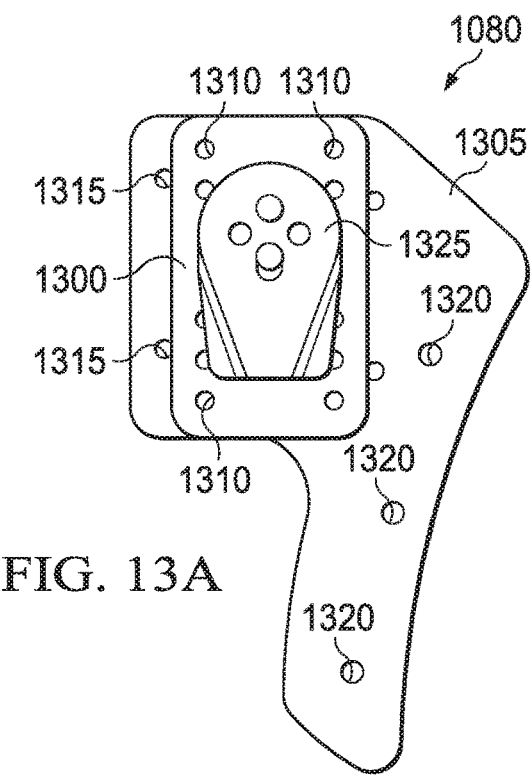
FIGS. 13A-13B depict views of one embodiment of a mounting bracket.
Figure 13B:
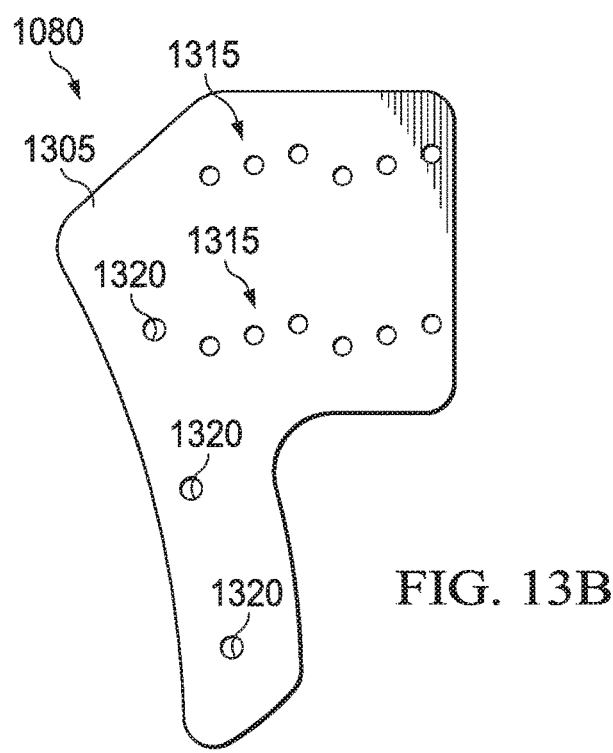

Fairing 105 and other fairings may be mounted to the end of support arms using a variety of adapters, such as adapter 180, adapter 1080 and other adapters. FIGS. 13A and 13B depict views of one embodiment of adapter 1080 that may be used to mount a fairing. In particular, adapter may be used with existing mud flap hangers or other support arms. Adapter 1080 may comprise an inboard fixed plate 1300 and an outboard adjustable plate 1305. The inner face of plate 1305 may face the outer face of plate 1300. Adapter 1080 may also include a connector plate 1325. Connector plate 1325 may shaped to connect to the end of a hanger arm, such as arm 1010 of FIG. 10 or a conventional mud flap hanger through welding, bolts or other connection mechanism. Plate 1300 may be connected to connector plate 1325 or otherwise coupled such that plate 1300 is in a fixed orientation relative to the arm.

Fixed plate 1300 may include a first set of holes 1310. Adjustable plate 1305 may include a pattern of plate mounting holes 1315 and a set of fairing mounting holes 1320. Fairing mounting holes 1320 may be configured correspond with holes in a fairing. Plate mounting holes 1315 may be configured so that multiple holes 1315 in adjustable plate 1305 may align with multiple holes 1310 in fixed plate 1300 in various positions of rotation, or horizontal or vertical translation, allowing adjustable plate 1305 to be positioned and secured relative to first plate 1300. Consequently, the fairing may be secured at a selected one of several mounting positions relative the arm. In other embodiments, only a single mounting position is provided. In yet other embodiments, the fairing may mount directly to first plate 1300, connector plate 1325 or otherwise mount to the arm.

Figure 14:
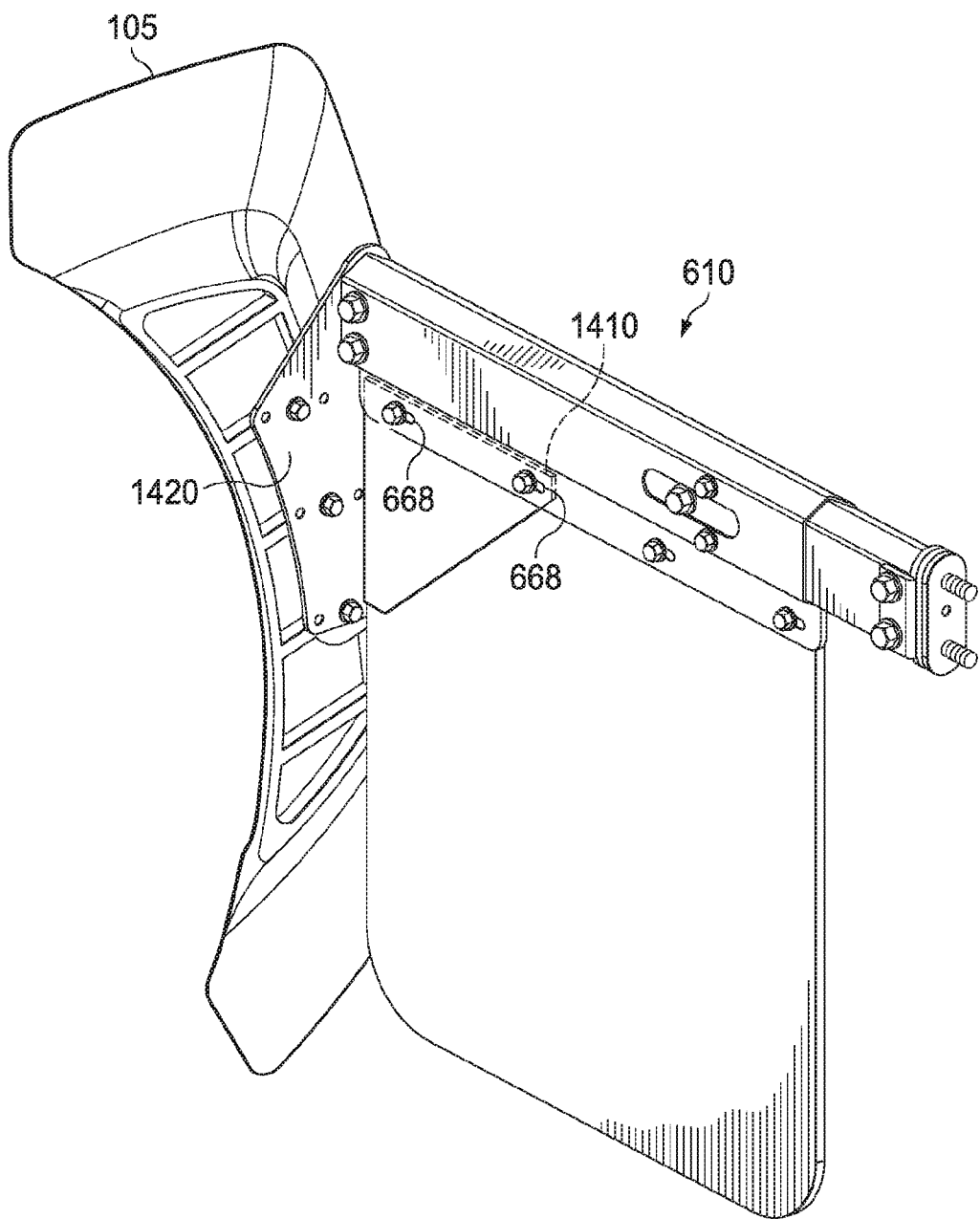
FIG. 14 depicts a view of another embodiment of a mud flap hanger fairing assembly.

FIG. 14 depicts another embodiment of a mounting bracket used with an arm, such as arm 610. In the embodiment of FIG. 14, an adapter may include one or more of a front or rear lateral extensions 1410. The lateral extensions include spaced openings to align with multiple spaced slots 668 so that the lateral plates can be coupled to arm 610 using the same connection members as the mud flap. The lateral extensions may be spaced to fit between the lateral mud flap mounting members that provide mud flap mounting openings or may be spaced to fit outside the mud flap mounting members. The outer edge of lateral extensions 1410 may be welded or otherwise coupled to mounting bracket 1420. Mounting bracket 1420 may have a pattern of fairing mounting openings that allow a fairing to mount to mounting bracket 1420 in various positions.

Figure 15:
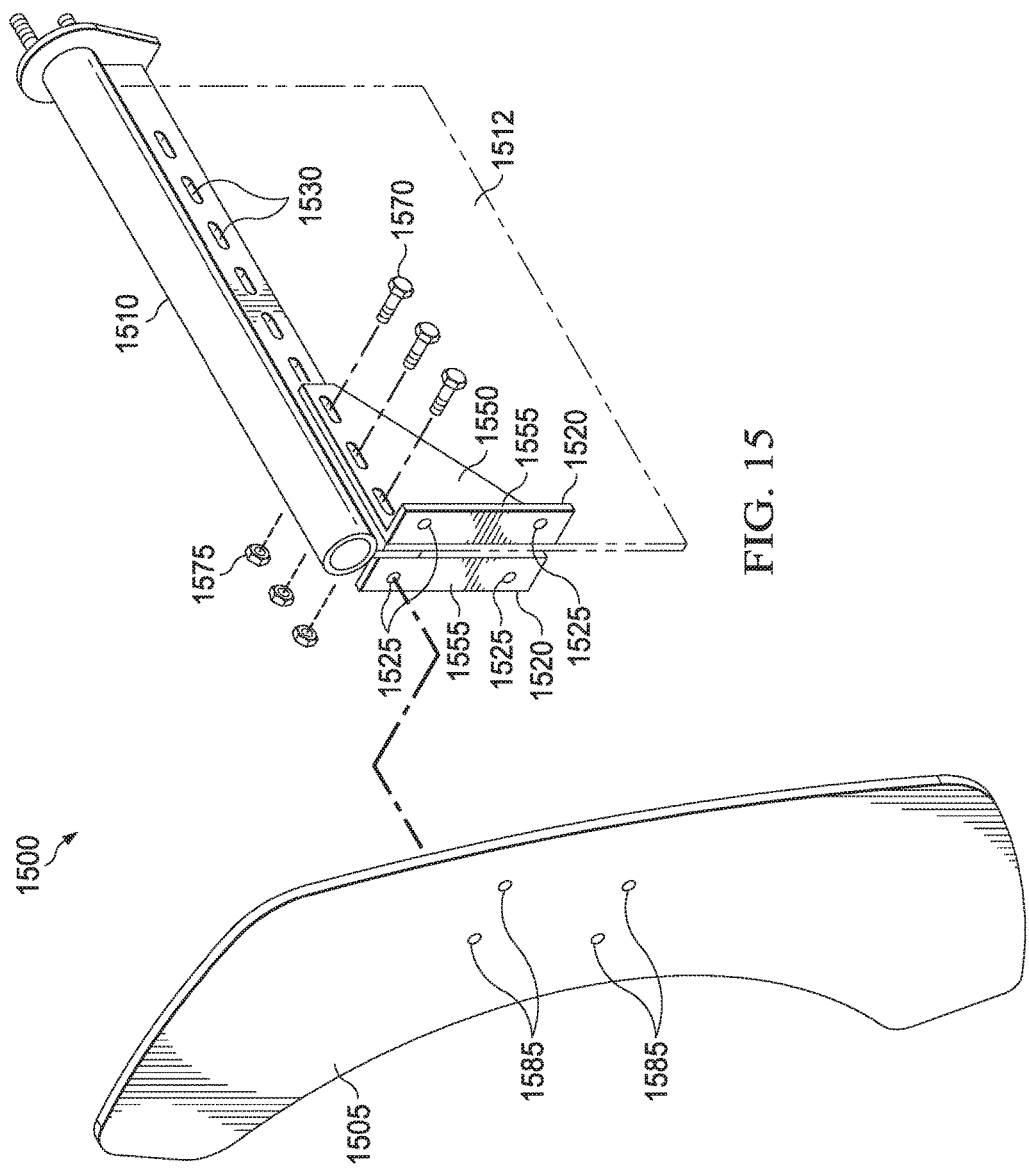
FIG. 15 depicts a view of another embodiment of a mud flap hanger fairing assembly.

FIG. 15 depicts another embodiment of mud flap hanger assembly 1500 comprising an arm 1510 that mounts to a vehicle at a proximate end and to a fairing 1505 at a distal end. Arm 1510 may be a fixed length arm or a variable length arm and may be a deflectable or non-deflectable arm. Arm 1510 comprises a mud flap mounting area having a set of spaced slots 1530 used to mount a mud flap. A fairing mounting adapter may include front and rear mounting brackets 1520 having lateral extensions 1550 and end flanges 1555. Lateral plates may include spaced openings that align with spaced slots 1530 to allow the mounting brackets 1520 to be mounted to arm 1510 using the same connection members (such as bolts 1570 with nuts 1575 or other connection members) as mud flap 1512. The lateral extensions may fit to the inside or outside of the mud flap mounting members that provide the mud flap mounting holes. End flanges 1555 define fairing mounting holes that align with fairing holes 1585 to allow fairing 1505 to be mounted to the mounting brackets 1520. In some embodiments, the holes may be defined so that fairing 1505 may mount in multiple rotational, horizontal or vertical positions.

FIG. 16 depicts a view of another embodiment of a mud flap hanger assembly 1600 comprising an arm 1610 that mounts to a vehicle at proximate end and supports a fairing 1605 at a distal end. The arm 1610 may also support a mud flap 1612. Arm 1610 may be a variable length or fixed length arm and may be deflectable or non-deflectable.

Fairing 1605 couples to arm 1610 at an adapter 1615. In the embodiment depicted, adapter 1615 comprises a post 1620 that can be received in a corresponding post opening provide by arm 1610 and an end plate 1625 coupled to the post. Post 1620 and arm 1610 may include corresponding openings (e.g., holes 1630 and adapter mounting holes 1635) so that a connection member, such as bolt, or other connection member may be used to secure adapter 1615. As can be seen, post 1620 may include multiple spaced openings so that the lateral position of end plate 1625 may be adjusted. End plate 1625 may include a pattern of fairing mounting holes to allow fairing 1605 to be mounted in multiple positions.

FIG. 17 depicts another embodiment of mud flap hanger assembly 1700 comprising an arm 1710 that mounts to a vehicle at a proximate end and to a fairing 1705 at a distal end and FIG. 18 depicts a view of an adapter 1720. Arm 1710 may be a fixed length arm or a variable length arm and may be a deflectable or non-deflectable arm. As depicted, arm 1710 is a bent arm that extends lateral and then bends downward. Arm 1710 may bend down a desired amount, including but not limited to an angle between 5-45 degrees and preferably between 5-15 degrees. In other embodiments, arm 1710 but may be a straight arm or may bend more than 45 degrees.

Arm 1710 comprises a mud flap mounting area having a set of spaced slots used to mount a mud flap. An adapter 1720 may include lateral plate 1725 having an upper edge that generally conforms to the shape of arm 1710. Lateral plate 1725 may include spaced openings that align with spaced slots to allow the adapter 1720 to be mounted to arm 1710 using the same connection members (such as bolts or other connection members) as mud flap 1712. Lateral plates 1725 may be spaced to be to the inside of or to the outside of the mud flap mounting members that provide the mounting holes of the mud flap.

Lateral plate 1725 is coupled to an adapter plate 1730. According to one embodiment, adapter plate 1730 can have longitudinally aligned inboard and outboard surface or may be aligned at an angle to the longitudinal. Mounting plate can define a set of fairing mounting holes to allow fairing 1705 to be mounted in multiple vertical, horizontal or rotational positions. As shown in FIG. 18, adapter plate 1730 may include multiple rows of fairing mounting holes, in this case slots, where the holes allow for horizontal positioning and the rows allows of vertical positioning.

Figure 19:
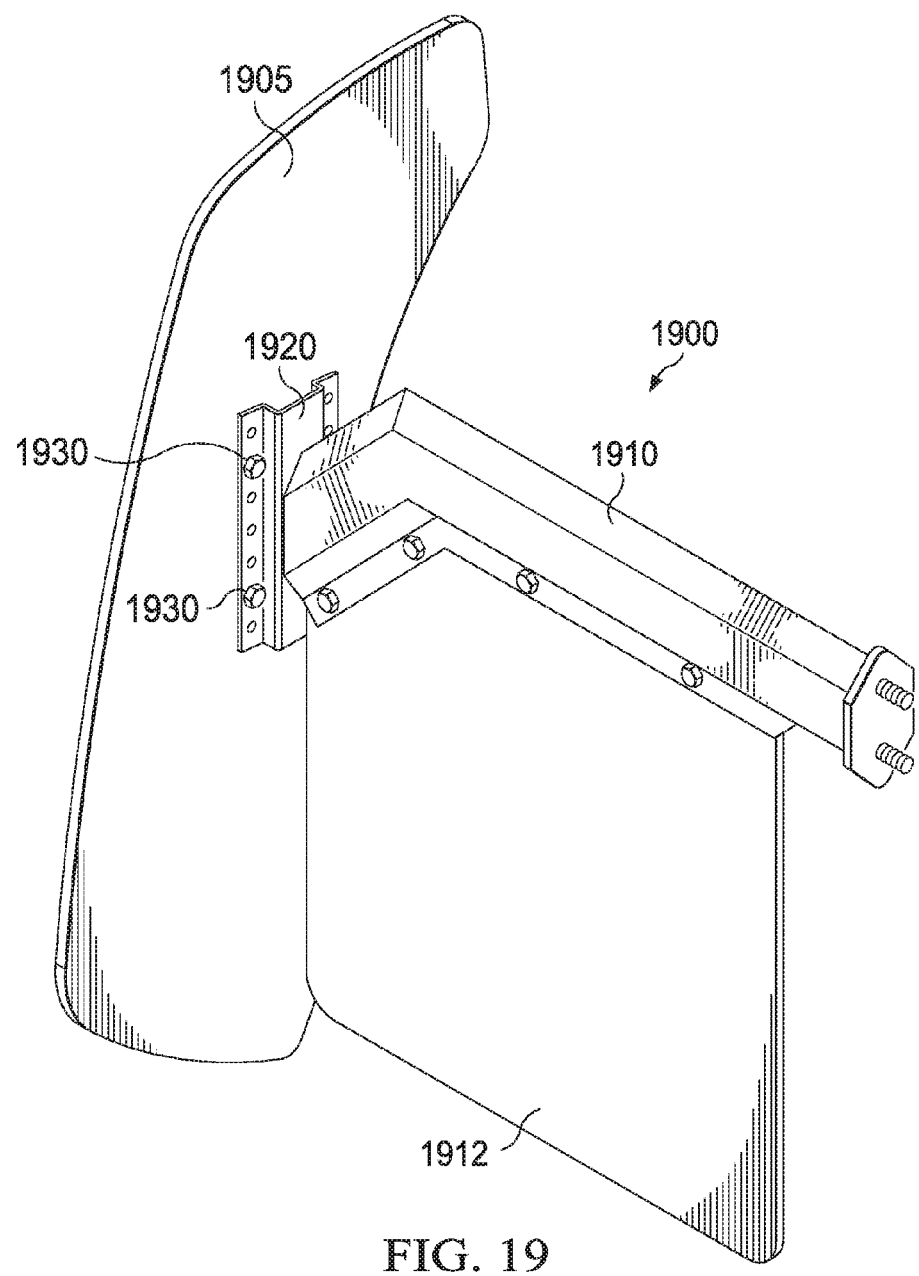
FIG. 19 depicts a view of another embodiment of a mud flap hanger fairing assembly.
Figure 20:
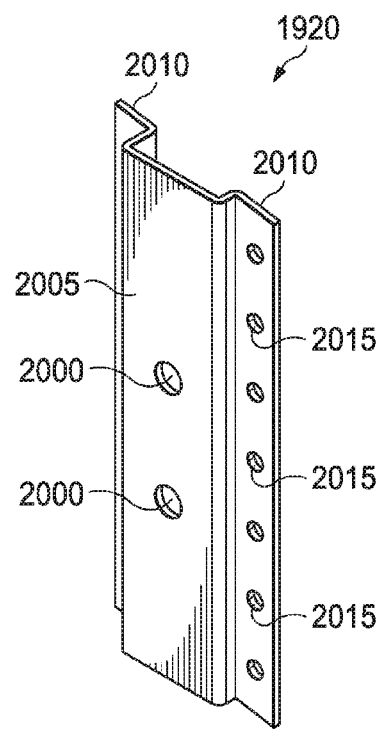
FIG. 20 depicts another embodiment of a mounting bracket.
Figure 21:
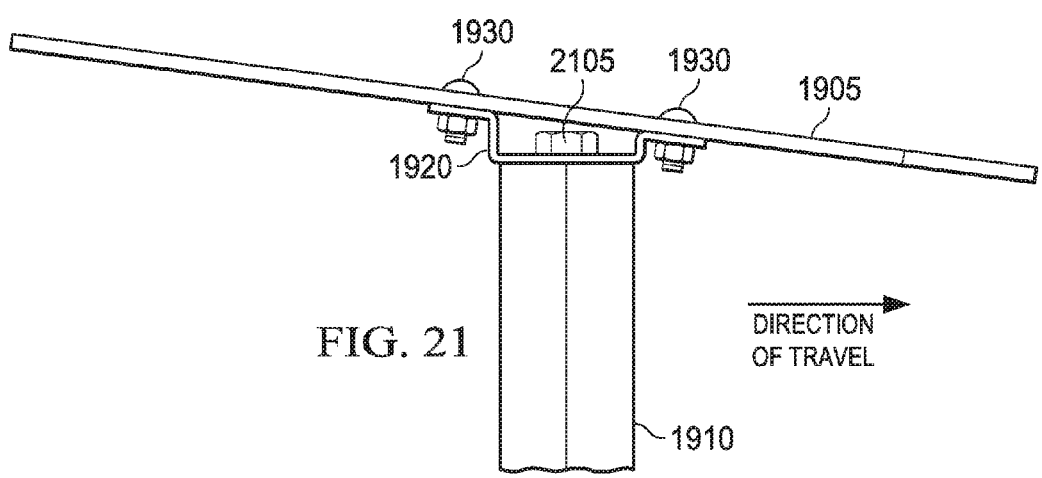
FIG. 21 depicts one embodiment of a fairing mounted to a support arm.

FIG. 19 depicts another embodiment of a mud flap hanger assembly 1900 comprising an arm 1910 that mounts to a vehicle at a proximate end and to a fairing 1905 at a distal end. FIG. 20 depicts a view of a fairing mounting adapter 1920. FIG. 21 depicts a view of fairing 1905 mounted to arm 1910. Arm 1910 may be a fixed length arm or a variable length arm and may be a deflectable or non-deflectable arm. As depicted, arm 1910 is a bent arm, but it may also be straight arm. Arm 1910 comprises a mud flap mounting area having a set of spaced slots used to mount a mud flap 1912.

An adapter 1920 may include an adapter plate having adapter mounting openings 2000 through a base portion 2005. Connection member 2105 may be used to mount the bracket to the end of arm 1910. Adapter 1920 may further comprise a set of fairing mounting flanges 2010 having a set of fairing mounting openings 2015 that allow fairing 1905 to be mounted using connection members 1930. As shown in FIG. 21, the fairing mounting flanges 2010 may be offset different distances from base portion 2005 and may be angled to allow the fairing 1905 to mount at a desired longitudinal angle, including, but not limited to 0-45 degrees from the longitudinal and preferably 5-15 degrees from the forward direction of travel when viewed from above. The pattern of fairing mounting holes 2015 allows fairing 1905 to be mounted in multiple vertical positions.

Figure 23:
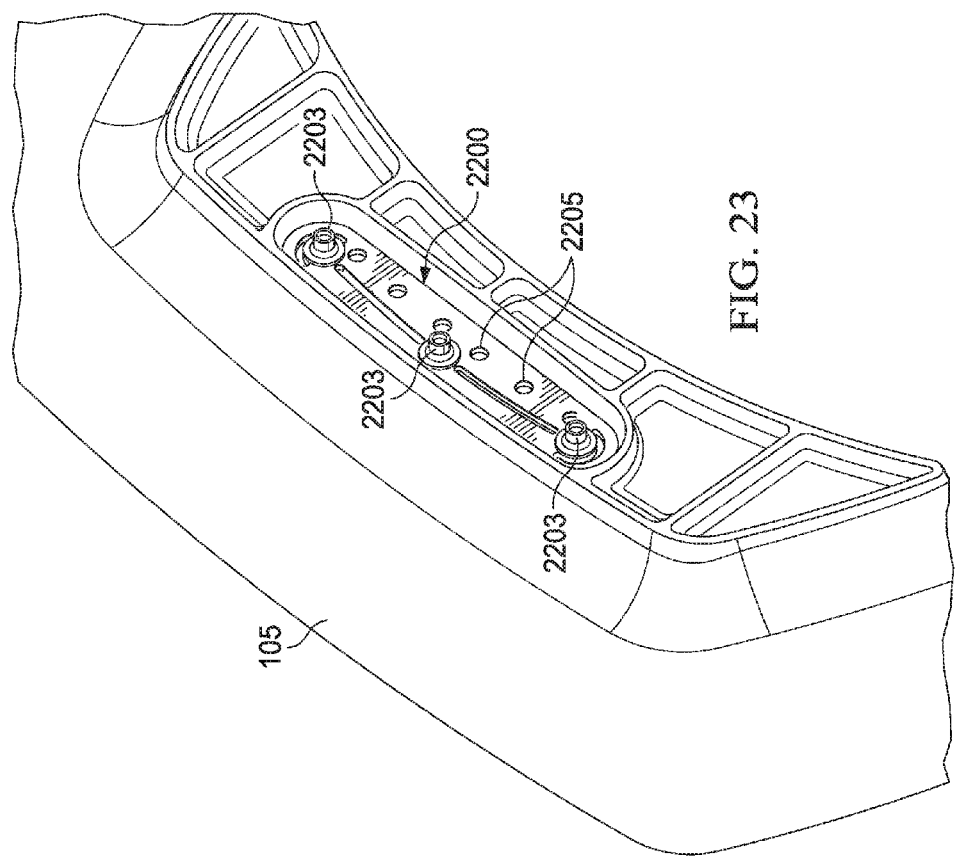
FIG. 23 depicts one embodiment of a support member and fairing.
Figure 22:
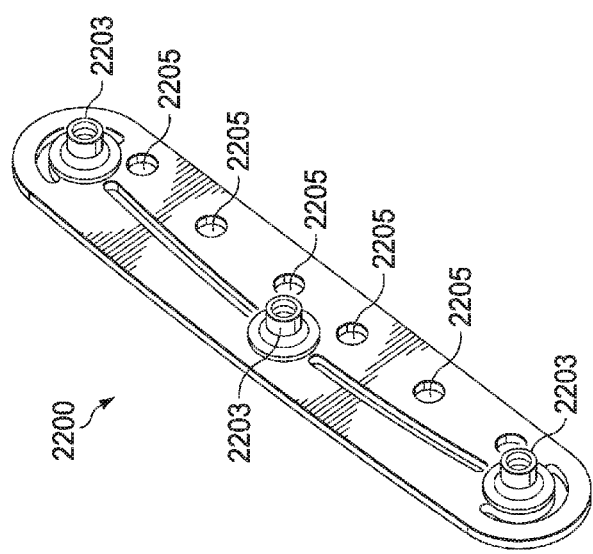
FIG. 22 depicts one embodiment of a support member.

As discussed above, a fairing may be coupled to the end of an arm, in some cases using an adapter. Because the fairing may be made out of a plastic or rubber, in some embodiments, it may be beneficial to provide additional structure support to the fairing at the mounting point so that, for example, the mounting hardware does not tear a hole in the plastic through repeated dynamic loading. Furthermore, a vehicle may be used in climates in which ice or mud is expected to build up on a fairing adding stress to the mounting hardware. To address these possibilities and others, a plate or bar of more rigid material, such as a metal, may be coupled to the fairing to provide additional support. The mounting hardware, such as bolts, may be received by or through the support member so that the support member alleviates stress from less rigid components. FIG. 22 and FIG. 23 depict views of one embodiment of a support plate 2200 used in conjunction with fairing 105. Support plate 2200 may be any suitable shape or form factor. A set of posts 2203 may extend inboard from the inboard side of the support plate that can align with and, in some embodiments, be at least partially received in fairing mounting openings in a mounting adapter. In one embodiment, posts 2203 may provide fairing holes and be threaded to allow a bolt or other connection member to pass through fairing 105 for attachment to the bracket (e.g., to receive connection members 185 as illustrated in FIG. 6). In other embodiments, the support member may simply comprise holes through which the mounting hardware passes.

Support plate 2200 may be coupled to a fairing 105 in any suitable manner. In some embodiments, support plate 2200 may be formed first and then fairing 105 injection molded around support plate 2200, such as by placing support plate 2200 in a mold and injection molding the fairing using the mold. FIG. 23 depicts a partial view of one embodiment of fairing 105 with support plate 2200 formed therein. Openings 2205 can provide areas for the polymer to flow during the injection molding process creating a stronger coupling between support plate 2200 and fairing 105.

As noted above, a support arm may be deflectable relative to a vehicle. In other embodiments the fairing support may be deflectable. FIGS. 24-27 illustrate various embodiments of arms in which one or both of the support arm or fairing a deflectable through a spring attachment. The support arms of FIGS. 24-27 may be fixed length support arms or variable length support arms.

Figure 24A:
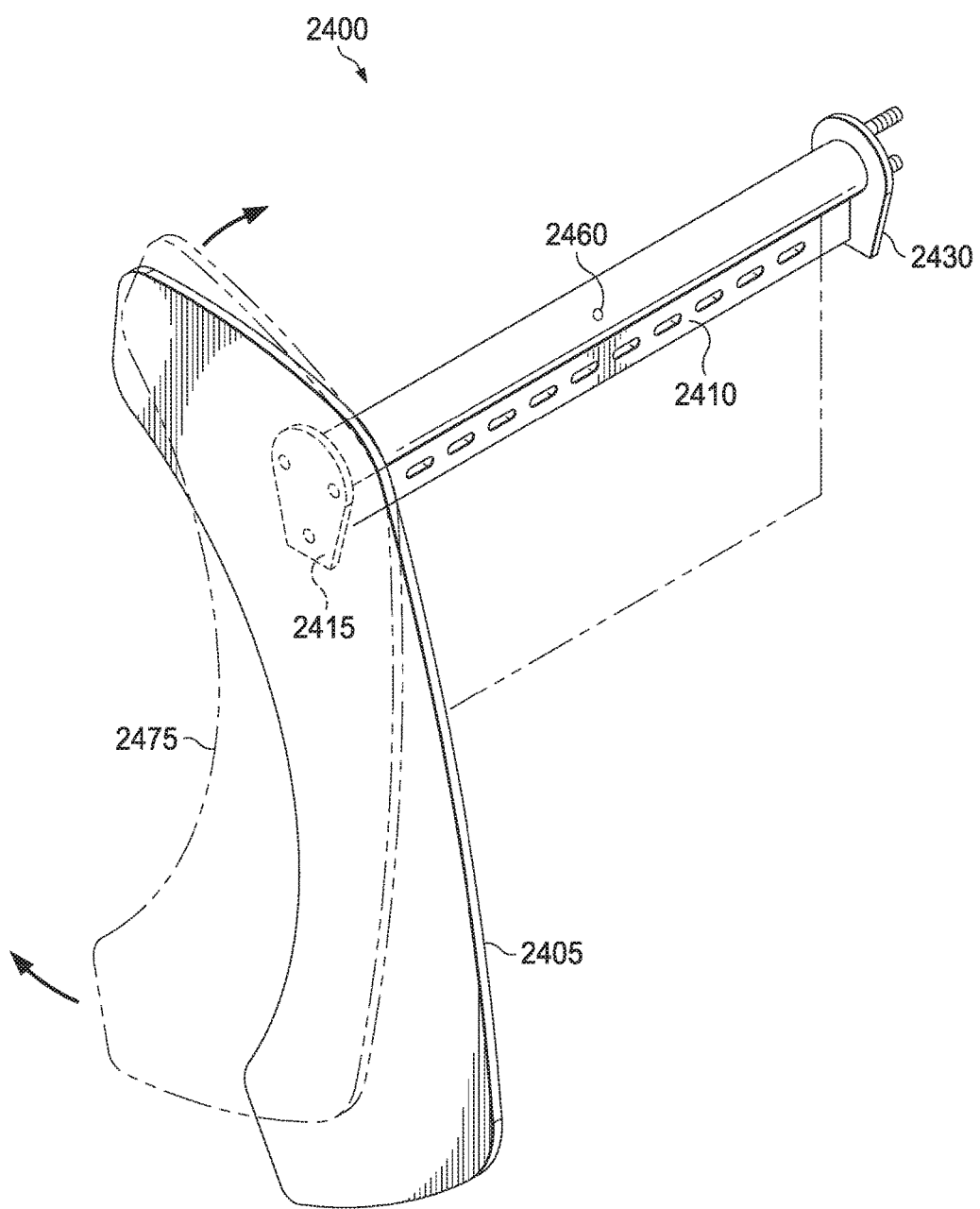
FIGS. 24A-24B depict another embodiment of a mud flap hanger fairing assembly.
Figure 24B:
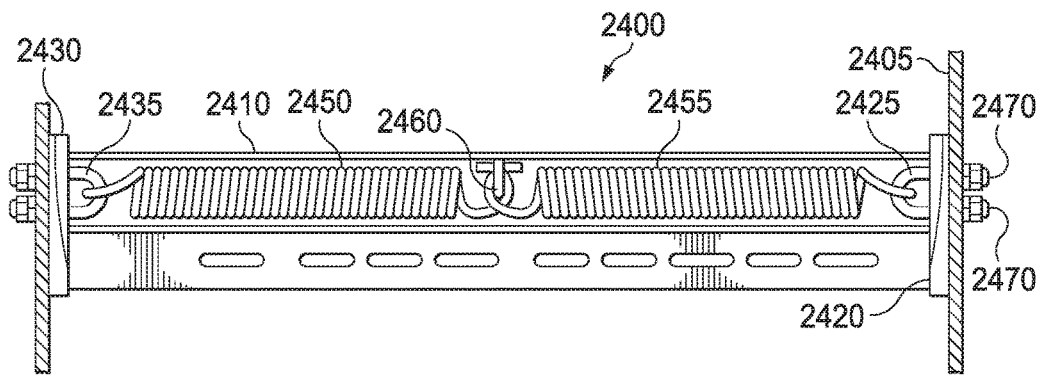

FIGS. 24A and 24B depict one embodiment of a mud flap hanger assembly 2400 comprising an arm 2410 that couples to vehicle at a proximate end and to a fairing 2405 at a distal end. According to one embodiment, assembly 2400 includes a base 2430 with an anchor member 2435 to which a spring 2450 is hooked. The other end of spring 2450 may be hooked to another anchor member 2460. Base 2430 may be similar to the bases described above to allow deflection of arm 2410 relative to the vehicle.

Similarly, adapter 2420 may include an anchor member 2425, such as a U-bolt, an eye bolt or other anchor member. Connection members 2470 may couple mounting adapter 2420 to fairing 2405. An outer end plate 2415 may also be used to provide additional support around connection members 2470. In one embodiment, the connection members 2470 and anchor member 2425 may be portions of the same component, such as U-bolt, an eye bolt or other component, or may be separate. A spring 2455 is hooked to anchor member 2425 and anchor member 2460. In this example, mounting adapter 2420 is not rigidly connected to arm 2410, but is held against arm 2410 by the tension force of spring 2455. Thus, mounting adapter 2420 and fairing 2405 may deflect relative to arm 2410 (e.g., to position 2475 or other position illustrated in FIG. 24A). While illustrated in conjunction with a specific embodiment, the skilled artisan would recognize that spring attachment to a deflectable fairing can be incorporated with other embodiments of arms, such as those described previously and below.

Figure 25:
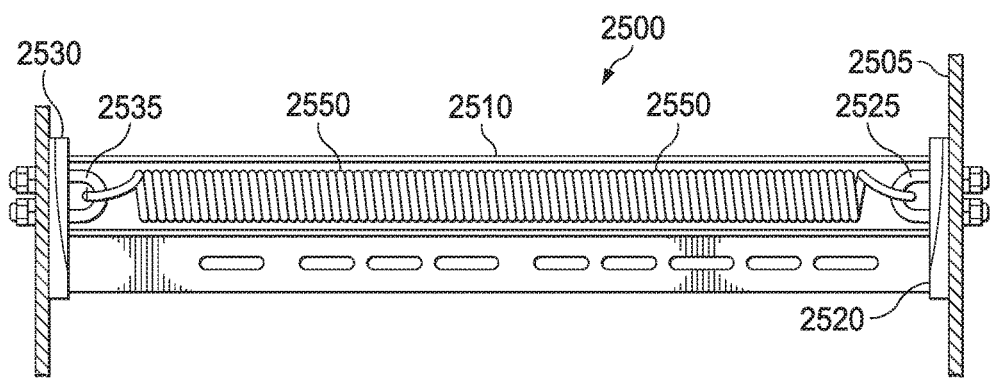
FIG. 25 depicts one embodiment of a fairing support arm.

FIG. 25 depicts another embodiment of a mud flap hanger assembly 2500 comprising an arm 2510 that couples to vehicle at a proximate end and to a fairing 2505 at a distal end. According to one embodiment, assembly 2500 includes a base 2530 having an anchor member 2535. Arm 2510 is not rigidly mounted to base 2530, but is held against base 2530 through tension provided by spring 2550 or other tension member and, as discussed above, may deflect relative to the vehicle. Similarly, mounting adapter 2520 may include an anchor member 2525. Mounting adapter 2520 is not rigidly connected to arm 2510, but is held against arm 2510 by the tension force of spring 2550 or other tension member coupled to anchor member 2535 and anchor member 2525. Consequently, fairing 2505 may deflect relative arm 2510 as the spring 2550 stretches under sufficient force.

Figure 26:
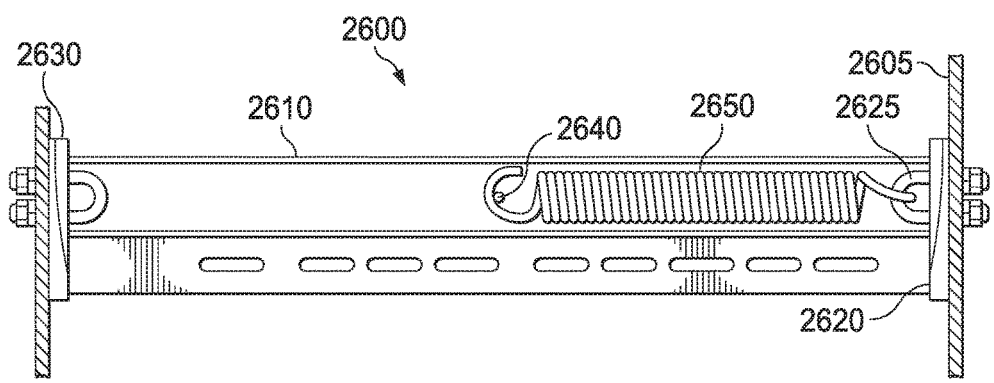
FIG. 26 depicts another embodiment of a fairing support arm.

FIG. 26 depicts one embodiment of a mud flap hanger assembly 2600 comprising an arm 2610 that couples to vehicle at a proximate end and to a fairing 2605 at a distal end. According to one embodiment, assembly 2600 includes a base 2630 that mounts to the vehicle. Arm 2610 may be fixed relative to the vehicle. Mounting adapter 2620 may include an anchor member 2625, such as a U-bolt, an eye bolt or other anchor member. Mounting adapter 2620 is not rigidly connected to arm 2610, but is held against arm 2610 by the tension force of spring 2650 or other tension member coupled to anchor member 2625 and an anchor member 2640. Consequently, fairing 2605 may deflect relative to arm 2610 under sufficient force. Spring 2650, however, biases arm fairing 2605 back to an original position.

Figure 27:
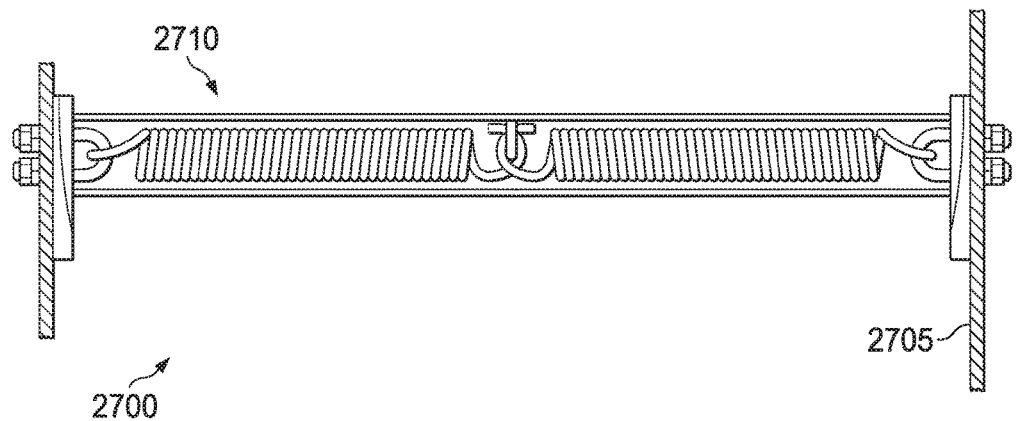
FIG. 27 depicts yet another embodiment of a fairing support arm.

While several embodiments above have been discussed in terms of mounting fairings in conjunction with a mud flap, other embodiments may be used to mount fairings without accommodating mud flaps. Some embodiments of such arms may be similar to those previously described, but lack features for mounting mud flaps. FIG. 27, for example illustrates one embodiment of an assembly 2700 having an arm 2710 that mounts to a vehicle at a proximate end and supports a fairing 2705, such as a middle fairing, as discussed below, at a distal end. Arm 2710, in this example, is similar to arm 2410, but lacks features to mount a mud flap.

Figure 28:
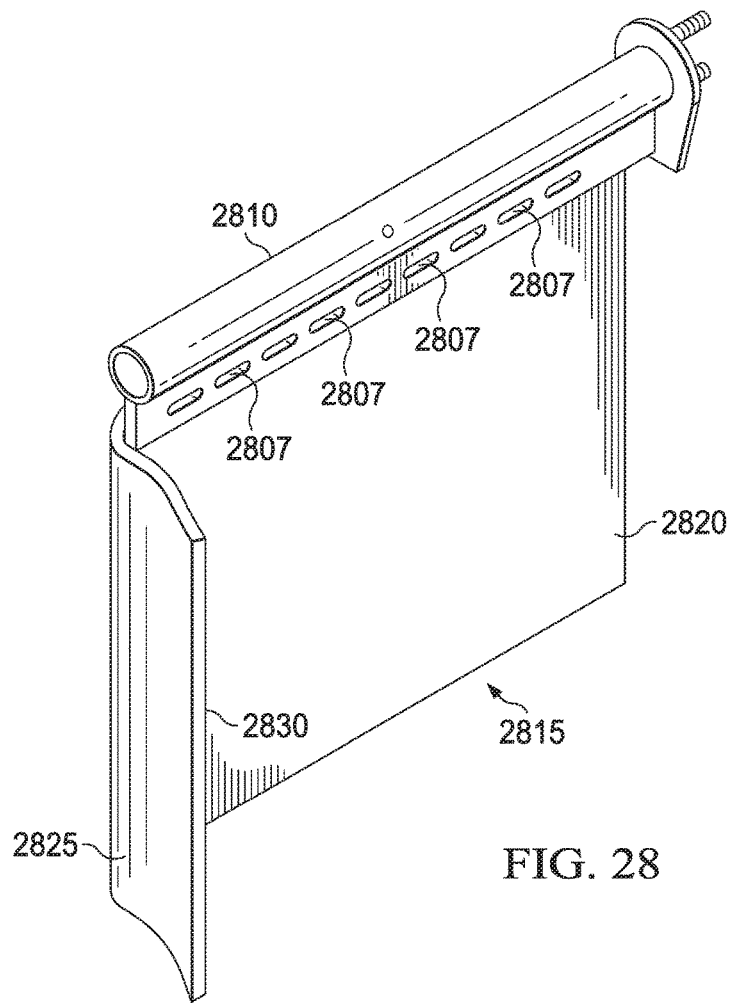
FIG. 28 depicts yet another embodiment of a mud flap hanger fairing support assembly.
Figure 29:
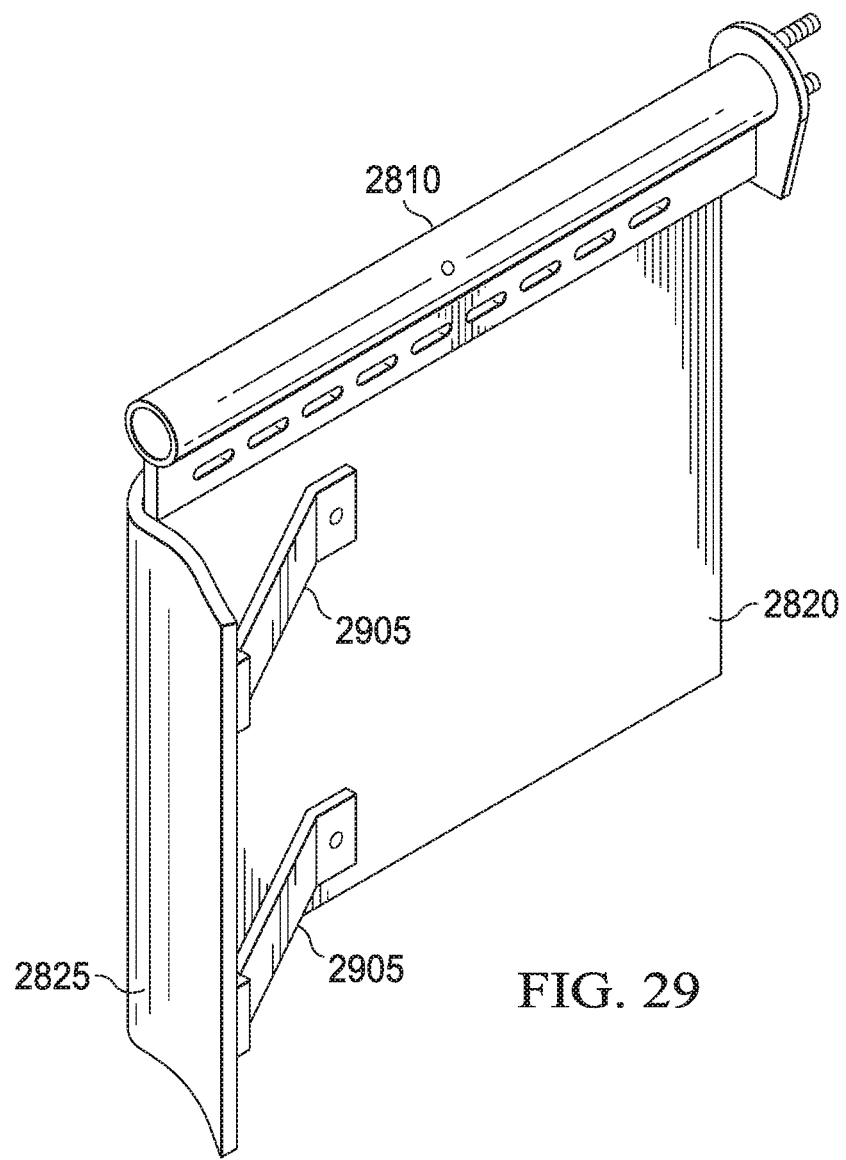
FIG. 29 depicts yet another embodiment of a mud flap hanger fairing support assembly.

FIG. 28 illustrates another embodiment of a mud flap fairing assembly comprising an arm 2810 which may be deflectable or not deflectable and may have an adjustable length or may have a fixed length. Arm 2810 may include spaced slots 2807 to accommodate mounting mud flap 2815. In the embodiment of FIG. 28, a mud flap 2815 comprises a mud flap section 2820 that extends laterally a length along arm 2810 and vertically down from arm 2810 to create a relatively rectangular cross-section from the direction of travel. Mud flap 2815 further comprises an integrated fairing section 2825 that bends rearward relative to the direction of travel. Integrated fairing section 2825 may bend slightly outward such that the leading edge is more inboard than the trailing edge 2830 of integrated fairing section 2825. The leading edge may be formed by the point in the transition to mud flap section 2820 where airflow may attach to the outer surface of fairing section 2825. FIG. 29 illustrates mud flap 2815 with braces 2905 running from a surface of mud flap section 2820 to the inner surface of fairing section 2825 to provide structural support and prevent flapping.

Figure 30:
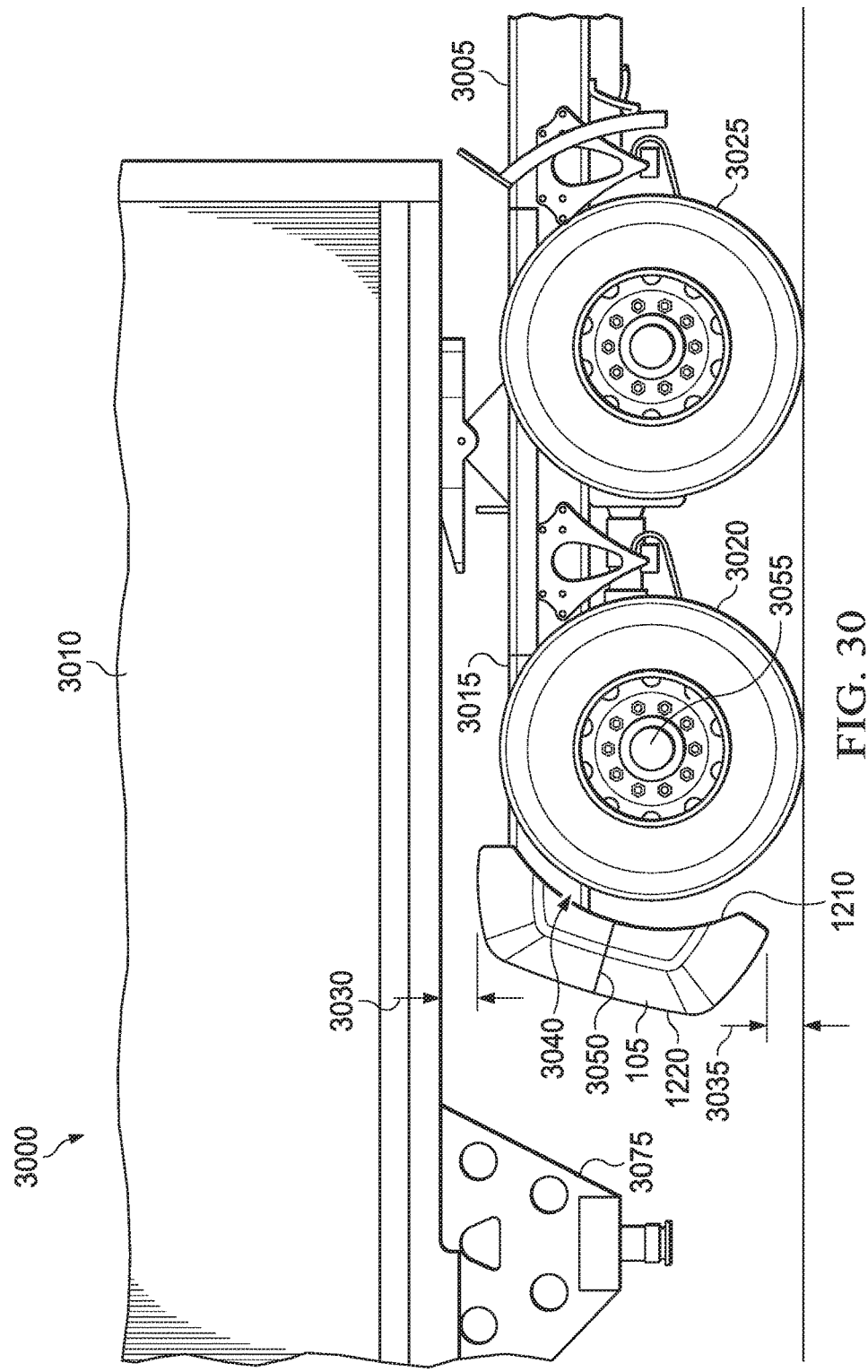
FIG. 30 depicts a view of a mud flap hanger fairing mounted to a tractor trailer.

FIG. 30 depicts a portion of a tractor-trailer combination vehicle 3000 that comprises a tractor or truck 3005 and a trailer 3010. The frame rails 3015 of the tractor typically extend rearward below a portion of the trailer 3010. There may be one or more axles (i.e., a single axle or tandem axles) with two or four wheels per axle. The embodiment depicted is a tandem axle tractor with front drive axle (or forward tandem axle) tires 3025 and rear drive axle (or rear tandem axle) tires 3020. In the embodiment illustrated, a fairing 105 is mounted behind the rearmost set of tires 3020 in an area overhung by trailer 3010. Fairing 105 can be sized and mounted so that a gap 3030 exists between the top of fairing 105 and the bottom of trailer 3010 and a gap 3035 exists between the bottom of fairing 105 and the ground. Additionally, a gap 3040 may exist between the trailing edge of the tire and the leading edge of fairing 105. The gaps may have any size depending on where the fairing is mounted. Preferably, the gaps are less than 10 inches each. However, the gaps may be larger or smaller in size and may vary depending on the height of the 5th wheel, type of truck, road or suspension.

Embodiments of a rear mud flap fairing may be mounted on a vehicle according to one or more considerations, such as ground clearance, trailer clearance, etc. In some embodiments, the position or orientation of fairing 105 relative to tires 3020, trailer 3010 or the ground may be based on the mounting position selected for the support arm on the truck and the mounting position of the fairing to the support arm. Fairing 105 may be mounted close to tires 3020 or farther away, may be mounted such that a lower edge is some distance above the ground or top edge is some distance below a trailer, may be angled relative to the ground or the trailer, etc. According to one embodiment, the leading edge 1210 fairing 105 can correspond to the shape of the adjacent tire (e.g., the rear tandem tire 3020) and may be mounted such that the distance D between fairing 105 and tires 3020 is substantially constant along a selected arc length when centerline 3050 of fairing 105 generally points to the center (hub) 3055 of tires 3020. According to one embodiment, the selected arc length comprises the majority or entirety of leading edge 1210.

In some embodiments, the vertical angle of trailing edge 1220 of fairing can be ±5 degrees of a typical trailer landing gear front edge 3075. Selecting an angle as described may be more aesthetically pleasing. Also, the mud flap fairing angle may be selected such that if the mud flap fairing comes into contact with a trailer landing gear assembly the mud flap fairing may be less likely to receive damage. Further, properly selecting an angle for the mud flap fairing edge (which in this particular embodiment is approximately equal to the angle of the fairing in relation to the ground) can be aerodynamically advantageous because 1) airflow (including mist or other debris) may also be directed downward according to the angle of the fairing or fairing edges, and 2). Certain angles may allow for the use of increased surface area on the fairing (or for the fairing to extend further rearward) while minimizing risk of damage. While ±5 is provided for example, the trailing edge 1220 may be arranged at other angles including vertically or otherwise.

Figure 31A:
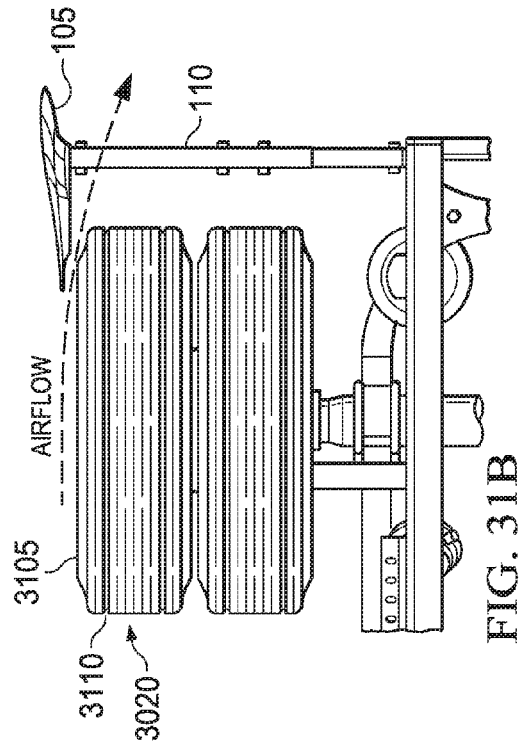
FIGS. 31A-31C depict views of positioning a mud flap hanger fairing.
Figure 31B:
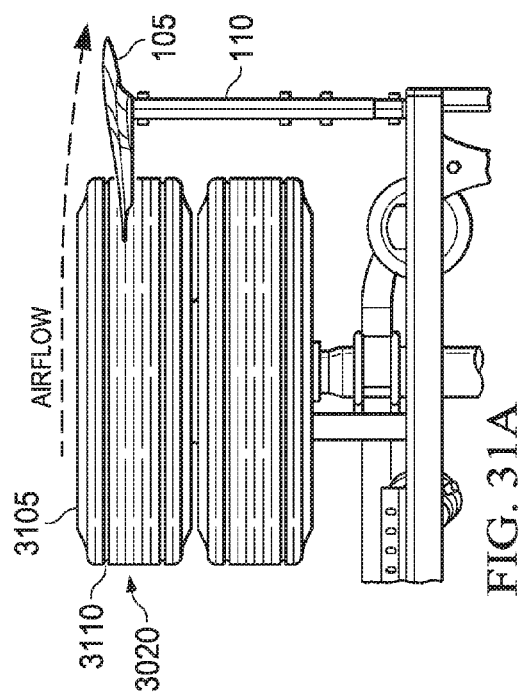
Figure 31C:
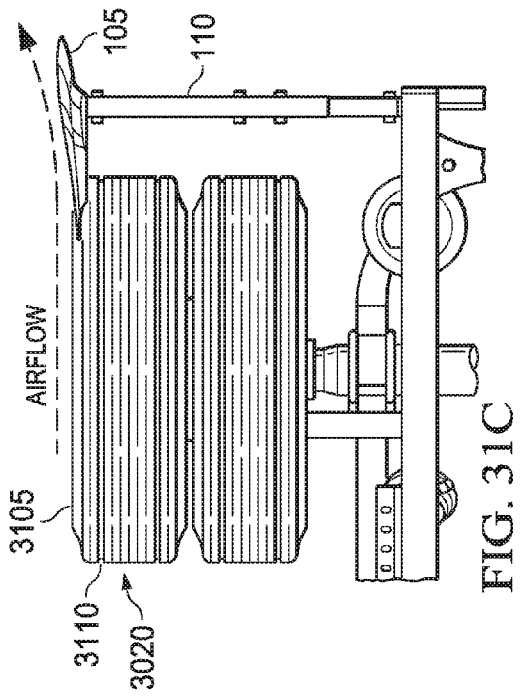

The outward position of fairing 105 may be controlled by selecting a fixed length arm of the desired length, adjusting the length of an adjustable length arm, offsetting the arm from the frame, selecting the thickness of fairing 105 to ensure proper positioning and configuration of fairing 105, selecting the position of an adapter (such as adapter 1615 of FIG. 16) or otherwise controlling the position of the fairing. FIGS. 31A-31C depict top views of a mud flap fairing assembly installed on a truck, illustrating the flow of air when fairing 105 is adjusted too far inboard (FIG. 31A), too far outboard (FIG. 31B) and properly positioned (FIG. 31C). In a preferred embodiment, fairing 105 is configured to have leading edge 1210 positioned inboard of outer edge 3105 and outboard of tread 3110 of tire 3020. However, a fairing adjusted to other positions that are too far inboard or too far outboard may still provide benefits over not having fairing 105 at all.

Figure 32:
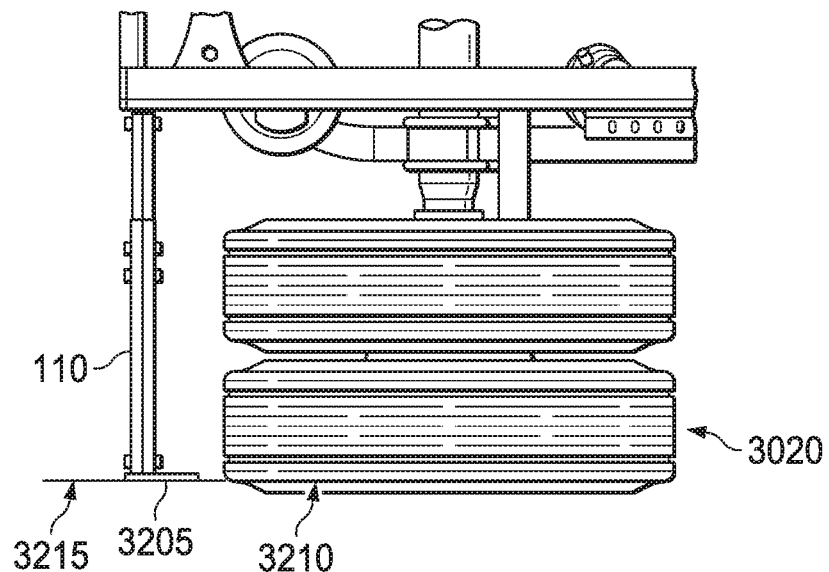
FIG. 32 depicts a view of positioning another embodiment of a mud flap hanger fairing.

While the embodiment of fairing 105 of FIGS. 31A-C is configured to "kick-out" air flow by directing airflow to the rear and outward, other embodiments of fairings may produce other air flow patterns. FIG. 32 depicts one embodiment of a fairing 3205 mounted to arm 110 behind tire 3020. Fairing 3205 has a flat aerodynamic outer profile between the leading edge 3210 and trailing edge 3215. A substantially flat fairing may be preferred if there is skirting along the length of the trailer, for example. Fairing 3205 may direct air substantially to the rear.

Figure 33:
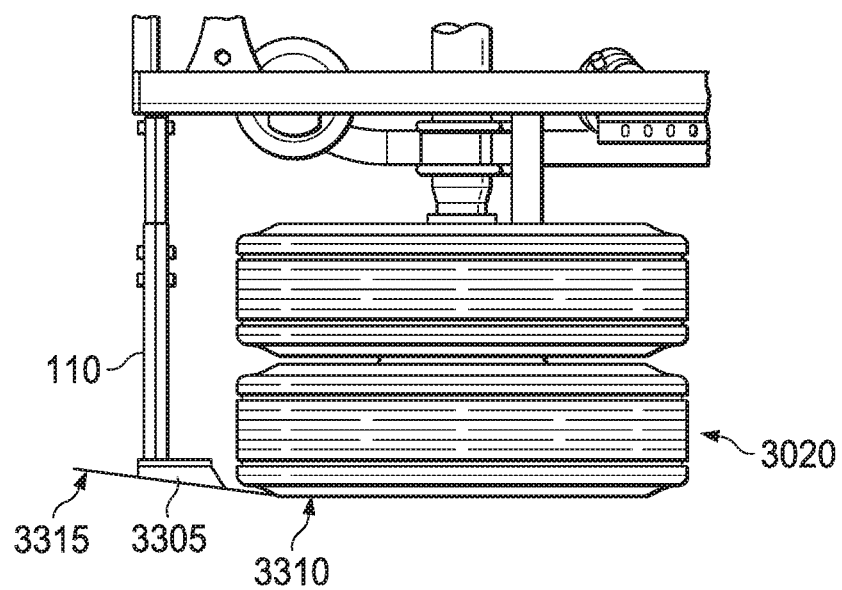
FIG. 33 depicts a view of positioning yet another embodiment of a mud flap hanger fairing.

FIG. 33 depicts one embodiment of mud flap fairing assembly having a fairing 3305 mounted to arm 110. Leading edge 3310 of fairing 3305 is proximate to the outer edge of tire 3020. The aerodynamic outer surface of fairing 3305 bends inward so that trailing edge 3315 is more inboard than leading edge 3310 to direct air flow inward. Thus, according to one embodiment, the fairing can be angled/curved inward to direct airflow to the rear and inward. This may be preferred if, for example, the trailer is configured differently such that the total vehicle aerodynamic drag is reduced if the fairing is angled inward rather than outward. This may be the case if the trailer suspension has an aerodynamic fairing, for example.

It can be noted that in the various embodiments discussed the leading edge of the mud flap fairings may be positioned outboard of the outer edge of a tire. The mud flap fairing may be shaped and sized to overlap the tire when the vehicle is viewed from the side (e.g., to partially cover the tire from the side). Furthermore, while mud flap fairings have been generally discussed in terms of mud flap fairings that are outboard of the mud flap, mud flap fairings may be in board of a mud flap. In some cases, multiple fairings may be used with the same mud flap, such as a fairing inboard of the mud flap and a fairing outboard of the mud flap with the fairings mounted to the same support arm. In addition, in some embodiments, adapters may be integrated with the fairing. By way of example, an adapter to mount to an end plate or to mud flap mounts may be molded as a portion of a fairing.

Furthermore, it may be noted mud flap fairings can be supported by any suitable mud flap hanger arm. While the embodiments of mud flap fairing assemblies discussed above were described in terms of mud flap fairing assemblies that utilize arms that extend generally laterally from the frame or other support structure of a vehicle, embodiments may also be utilized to mount fairings to other styles of mud flap hangers. For example, some mud flap hanger systems utilize a bar that is positioned behind a truck and extends laterally behind the truck to both sides of the truck. Mud flaps are mounted to the bottom of the bar near each end of the bar (e.g., mud flaps positioned behind the right and left sets of tires are mounted to the same bar). Embodiments described herein may be utilized with such systems to mount fairings to the ends of the bar. Furthermore, sleeves may be provided at the ends of the bar so that the position of the fairings may be adjusted.

In some embodiments, an arm base may include an adapter bracket that mounts to the vehicle. The adapter bracket may have a pattern of holes such that the arm can be mounted to the vehicle in a number of positions (horizontal, vertical or rotational). In some cases, the position of the fairing may be selected by selecting the position of the arm.

Other embodiments may reduce aerodynamic drag by placing fairings in other locations, such as between tires 3025 and 3020 of FIG. 30. To this end, a middle fairing assembly may mount to the vehicle frame and span between tires on a front tandem axle and tires on a rear tandem axle. A middle fairing may ensure air flow stays outboard of the tires on the rear axle (i.e., may reduce or prevent air flow from entering the space between the front axle tires and the rear axle tires). The middle fairing may also contain other aerodynamic features such as vents, ribs, etc., for reducing drag and controlling splash and spray, or providing ventilation for dissipating heat.

The shape of the middle fairing may be selected to provide several advantages, including but not limited to: the greatest surface area for optimal aerodynamics; clearance with wheels to prevent rubbing/damage; clearance from top (trailer contact) to prevent damage; clearance from bottom/road (ground contact) to prevent damage; universal fit (different trucks have different wheel sizes/spacing, frame heights, etc.); obtain certain rigidity or structure, especially to provide increased rigidity in areas of the middle fairing that are used for mounting or that are unlikely to come into contact with the wheels, trailer, or ground, for example. Additionally, the shape can be selected to provide increased flexibility and resiliency in areas that are likely to come into contact with the wheels, trailer, or ground, for example; and aesthetics—curved and sized for use by itself and in combination with any of the mud flap fairing, aerodynamic quarter, and wheel covers.

According to one embodiment, the middle fairing can be attached to a support arm. The support arm may be coupled to a mounting bracket having multiple holes that allow for horizontal and telescopic adjustability and improved universality of fit. The array of holes can be used to attach the support arm to a fifth wheel rail with fasteners. A fairing adapter plate can also be coupled to the support arm. The fairing adapter plate can have multiple holes to allow for horizontal, vertical or rotational adjustment of the middle fairing.

The support arm, according to one embodiment, is angled. Angled support arms may provide advantages to an aerodynamic system. For example, an angled support arm may support the middle fairing closer to the center of the part to provide improved rigidity without the need for an additional support or angle bracket. An angled support arm may also prevent someone from standing thereon or prevent build-up of snow and ice, for example, which adds unwanted weight to the assembly.

Figure 34A:
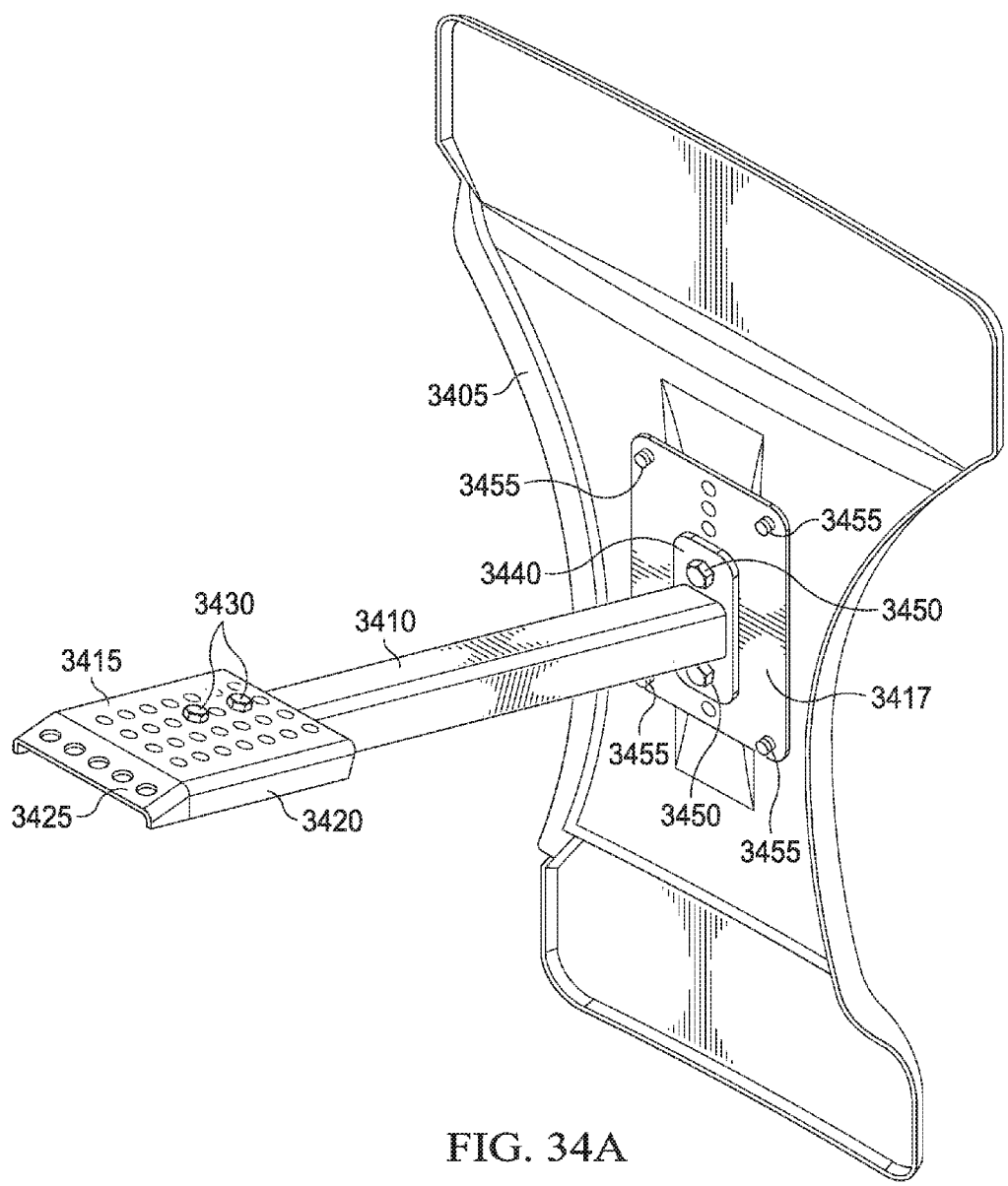
FIGS. 34A-34C depict views of a middle fairing assembly.
Figure 34B:
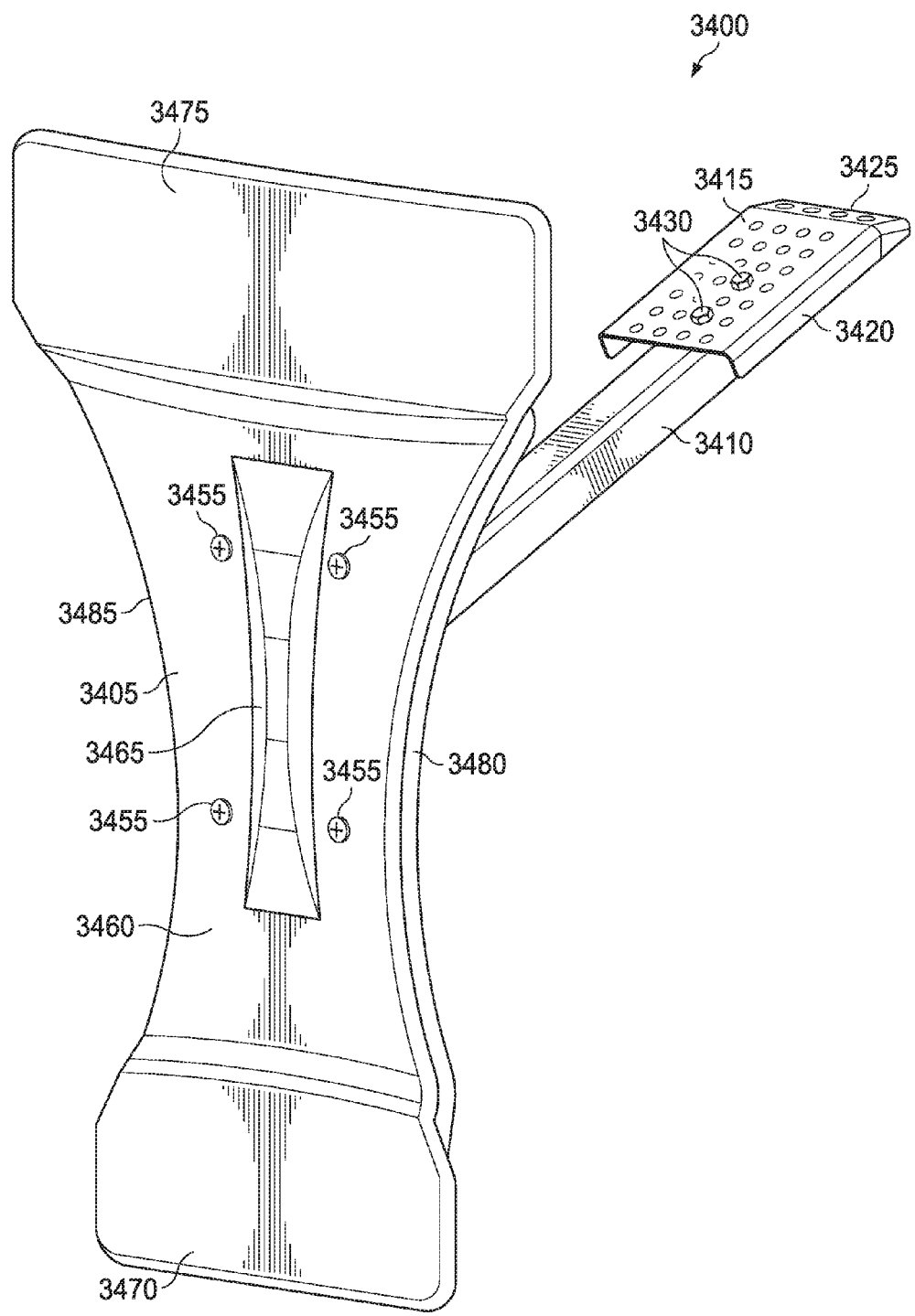
Figure 34C:
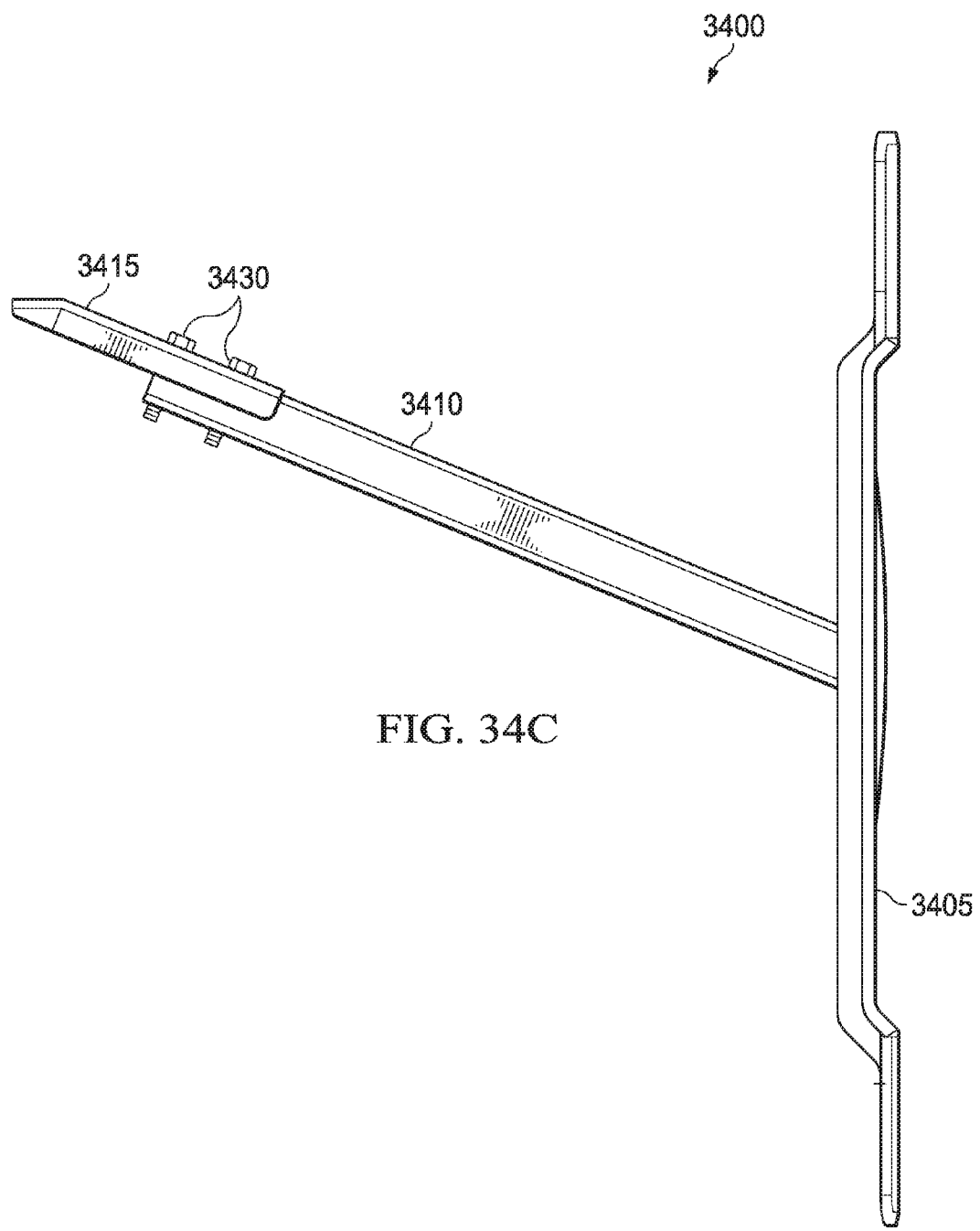

FIGS. 34A-34C depict one embodiment of a middle fairing assembly 3400 comprising a middle fender support arm 3410 that mounts to the vehicle at a proximate end and to a middle fairing 3405 at a distal end. Support arm 3410 may couple to a vehicle frame rail at base bracket 3415 and fender 3405 at adapter plate 3417.

Bracket 3415 can comprise an arm mount portion 3420 that is generally parallel to arm 3410 and a frame rail mount portion 3425 that is angled a desired angle relative to first portion 3420. Bracket 3415 may be coupled to the frame rail of the vehicle in a desired position through welding, using connection members or according to another connection mechanism. Arm 3410 may be connected to bracket 3415 using connection members 3430 passing through holes in portion 3420 and corresponding holes in arm 3410, welding or other connection mechanism. Because of the difference in angle of arm mount portion 3420 and frame rail mount portion 3425, arm 3410 may extend laterally outward and be angled downward from the frame rail discouraging standing on arm 3410 and potentially reducing the accumulation of snow and mud. In other embodiments, arm 3410 may extend parallel to the ground.

The tolerances, sizes, spacing and number of openings in bracket 3415 and arm 3410 may determine how much adjustability there is for positioning a middle fairing. For example, the tolerances of openings may allow the distal end of arm 3410 (i.e., the end coupled to fender 3405) to advance or lag a desired distance and may allow a fairing to cant in or out to direct airflow in a desired direction. This adjustability allows embodiments to accommodate different size wheels, different vehicle parameters, different driving conditions, and the like.

The distal end of arm 3410 can be coupled to fender 3405. According to one embodiment, arm 3410 includes a fixed end plate 3440. End plate 3440 may be angled relative to a long axis of the main body of arm 3410 so that the outboard surface of end plate 3440 is generally vertically aligned in a longitudinal plane or an angle to the longitudinal. End plate may have openings that can receive connection members 3450. The opening may be threaded or non-treaded. According to one embodiment, nuts may be welded or otherwise attached to the inboard side of end plate 3440 to provide threads.

According to one embodiment, an adapter plate 3417 may be longitudinally aligned or aligned at an angle to the longitudinal. Adapter plate 3417 may define pattern of holes to receive connection members 3450 for mounting adapter plate 3417 to end plate 3440 in one of several positions. By selecting the position of adapter plate 3417, the mounting position of fender 3405 may be selected. Adapter plate 3417 may further include fairing mounting holes to receive connection members 3417 securing fairing 3405 to adapter plate 3417.

The outboard surface of fender 3405 may form an aerodynamic surface between a leading edge 3480 and a trailing edge 3485 that promotes attached rearward flow (when the vehicle is moving forward). In some cases, the outer surface may direct the flow rearward or rearward and slightly inward or outward. The outer surface may have a variety of profiles including flat, curved outward toward the rear, or other profile. In FIG. 34B, fender 3405 comprises a middle portion 3460, a lower portion 3470 and an upper portion 3475. Middle portion 3460 provides a mounting area for fender 3405 and can include features 3465, such as ribs or other features, to increase the rigidity of fender 3405 around the mounting area. The outboard surfaces of one or more of the upper and lower portions may be in the same plane as, inset from or be more outboard from the outboard surface of middle portion 3460. The upper and lower portions may be more flexible than the middle portion to absorb impacts from the ground or trailer.

In some embodiments, fender 3405 may be symmetric for use on either side of a vehicle. In some embodiments, fender 3405 may be sized similar to fairing 105, may have a leading edge profile similar to leading edge of fairing 105, or may otherwise be manufactured to have a design complementary to fairing 105. According to one embodiment, leading edge 3480 may be curved to substantially conform to the shape of a tire forward of fender 3405 and trailing edge 3485 may have a curved shape to conform to the shape of tire to the rear of fender 3405.

Figure 35:
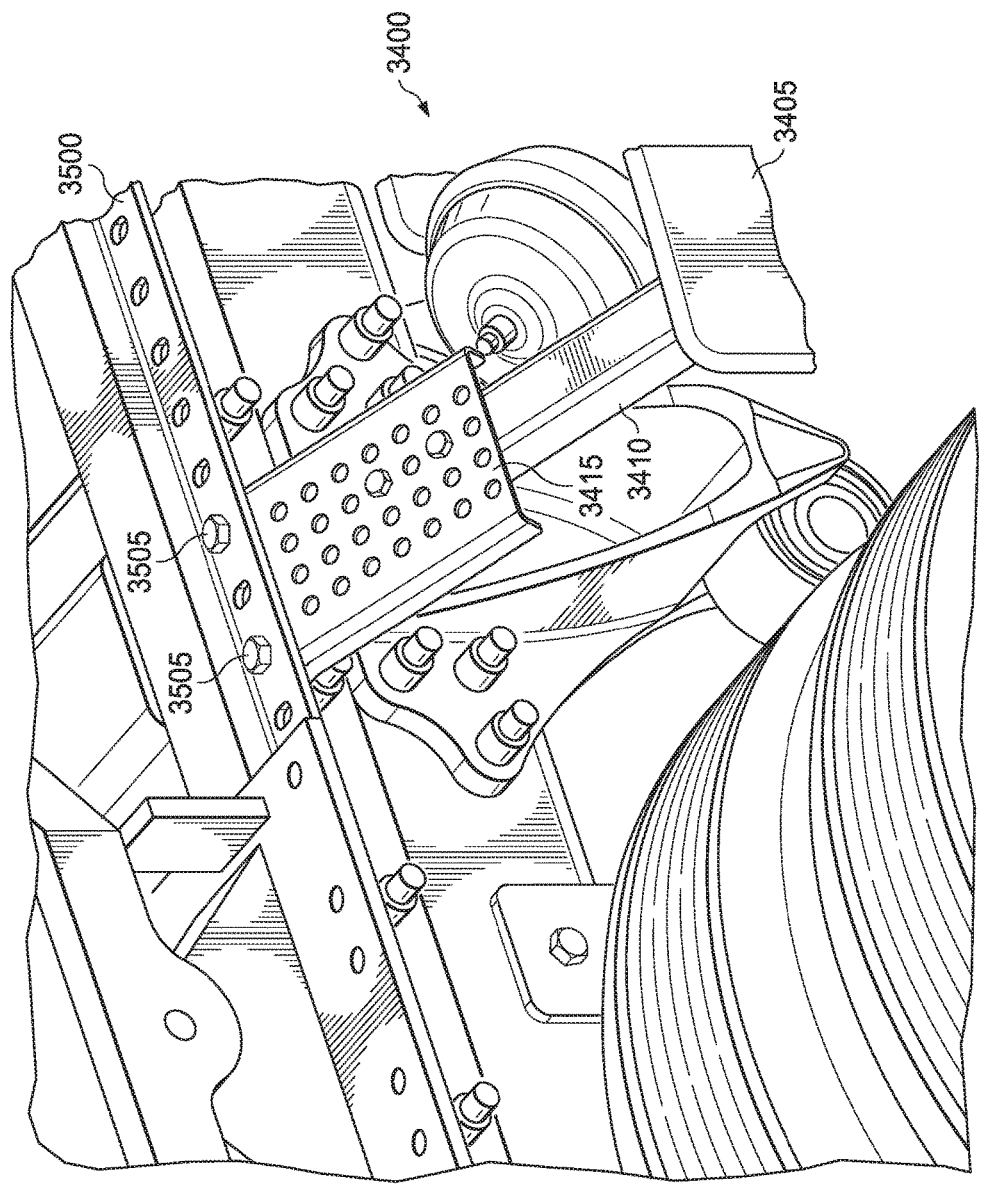
FIG. 35 depicts a view of a middle fairing assembly coupled to a frame rail.

FIG. 35 illustrates one embodiment of an assembly 3400 mounted to the frame rail (including, but not limited to, the outboard 5th wheel rail) 3500 of a truck. Connection members 3505 may pass through openings in the frame rail and complementary openings in the frame rail mount portion 3425 (see FIG. 34A) of bracket 3415 to mount bracket 3415 to the frame rail. The position of the bracket may be selected so that the distance between arm 3410 or fender 3405 with respect to the adjacent tires may be selected. Furthermore, the holes used to mount the arm may be selected to adjust the lateral position of the arm 3410 and, hence, fender 3405.

Figure 36A:
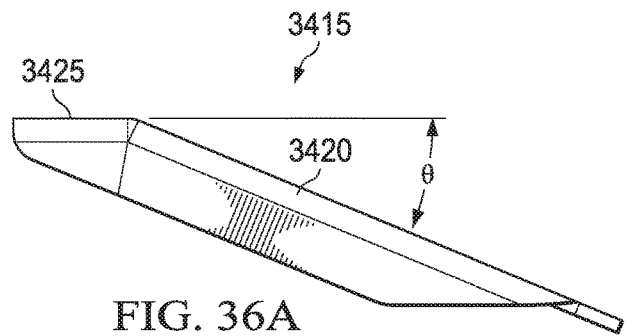
FIGS. 36A-36B depict a view of a middle fairing base bracket.
Figure 36B:
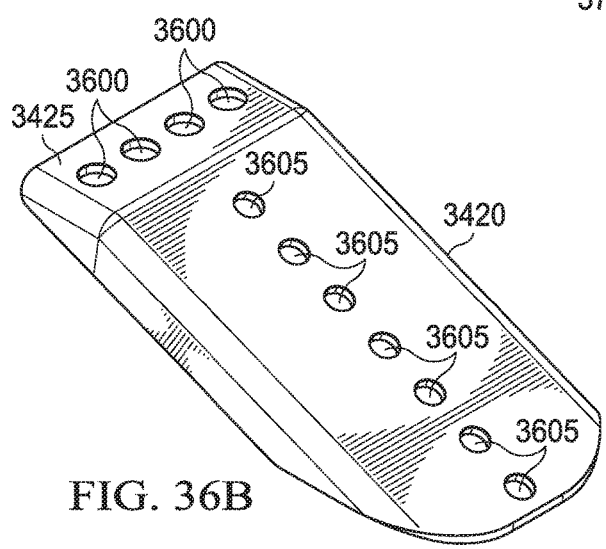

FIGS. 36A-36B depict views of one embodiment of bracket 3415. As illustrated in FIG. 36A, arm mount portion 3420 may have a surface aligned in a first plane and frame rail mount portion 3425 may have a surface aligned in a second plane a selected angle from the first plane. In some embodiments, the angle between frame rail mount portion 3425 and arm mount portion 3420 may be between 15-25 degrees, though in some cases the angle may be 0-15 degrees and in other cases greater than 25 degrees. A pattern of rail mounting holes 3600 may be defined through second portion 3425 perpendicular to the second plane and a pattern of arm mounting holes 3605 may be defined through arm mount portion 3420 perpendicular to the first plane. Thus, bracket 3415 may be used to mount an arm to the frame rail in a desired position and at an angle. According to one embodiment, bracket 3415 may be formed of a single sheet of material (e.g., steel) bent at desired angles. In other embodiments, bracket 3415 may be formed of other materials and may comprise multiple pieces.

Figure 37:
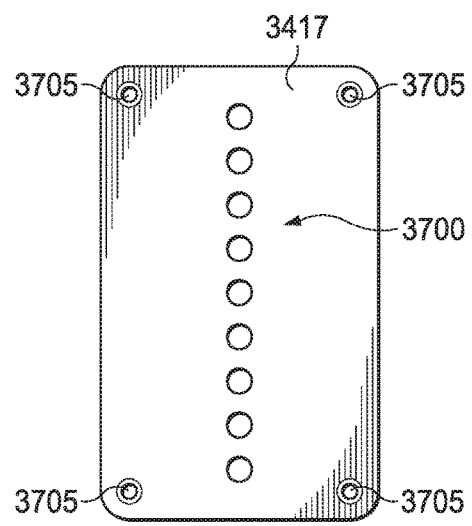
FIG. 37 depicts a view of a mounting plate.

A fairing may be attached to an arm directly or may use an adapter plate for additional rigidity or adjustability. FIG. 37 illustrates one embodiment of an adapter plate 3417. Adapter plate 3417 may comprise a generally flat plate of material, such as steel, having a pattern of fairing mounting holes 3705 configured to align with openings in the fairing. According to one embodiment, nuts may be welded or otherwise joined to the inboard side of adapter plate 3417 to provide threads for the fairing mounting holes 3705. Adapter plate 3417 may also include pattern of adapter mounting holes 3700 configured to align with openings in end plate 3440. Pattern of holes 3700 can allow the vertical position of the adapter plate 3417, and hence the fairing, to be selected.

The tolerances, sizes, spacing and number of openings may determine how much adjustability there is for positioning a middle fairing. For example, the tolerances of the openings may allow a fender to be rotated a few degrees about an axis normal to the vehicle frame or allow a fairing to be angled outward (i.e. a top edge outboard of a lower edge or a leading edge outboard of a trailing edge, etc.). This adjustability allows embodiments to accommodate different size wheels, different vehicle parameters, different driving conditions, and the like.

Figure 38:
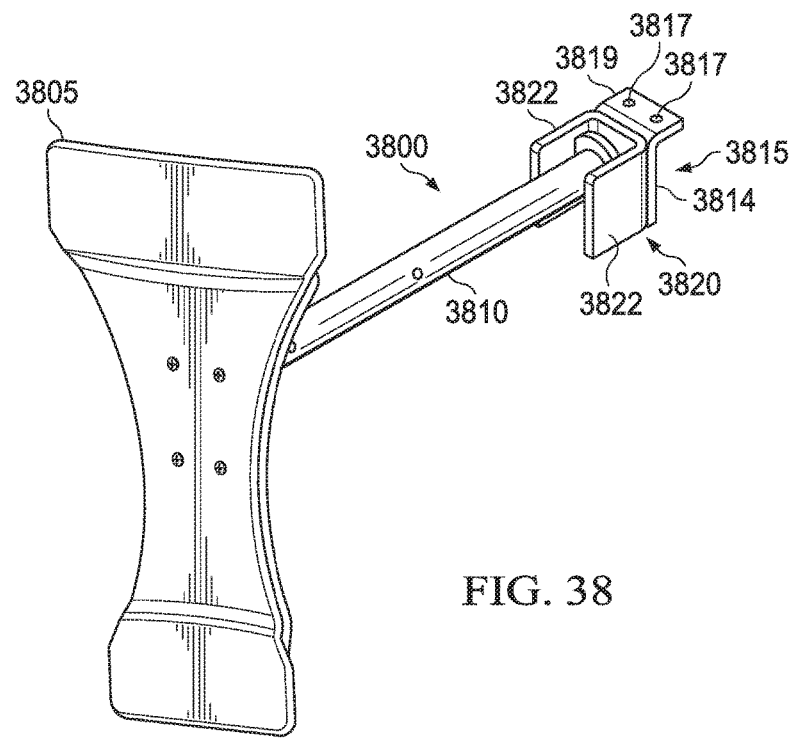
FIG. 38 depicts a view of another embodiment of a middle fairing assembly.
Figure 39:
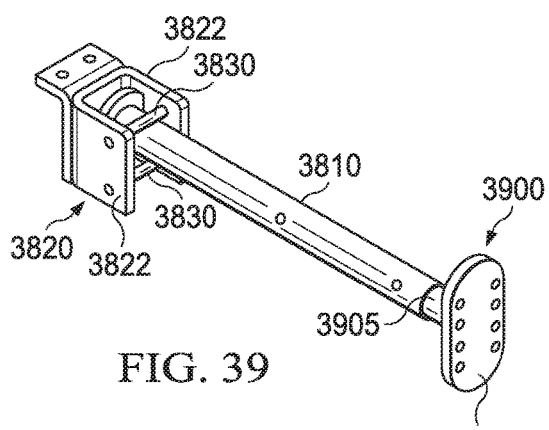
FIG. 39 depicts a view of another embodiment of a middle fairing support arm.

In the embodiment of FIG. 34, the support arm is non-deflectable and has a fixed length. In other embodiments the support arm may be deflectable or have an adjustable length. FIG. 38 illustrates one embodiment a fairing assembly 3800 for supporting a fender 3805 with a deflectable arm 3810 and FIG. 39 illustrates one embodiment of arm 3810 and base 3820. Arm 3810 may attach to a base bracket with a spring mounted connection similar to those discussed above in conjunction with mud flap hanger arms.

In FIGS. 38 and 39, a proximate end for coupling to a vehicle frame rail may comprise a base bracket 3815 with rail mounting openings 3817 on an upper portion 3819 for coupling to the frame rail. Base bracket 3815 may further comprise a lower section 3814 for coupling to middle fairing base 3820. According to one embodiment, upper section 3819 may have a generally horizontal top and bottom surfaces and lower portion 3814 may have generally vertical inboard and outboard surfaces.

Arm 3810 may be coupled to bracket 3815 in a manner that allows deflection, such as described above. Base 3820 may be coupled to bracket 3815 and may limit the forward and backward deflection of arm 3810 (which may be adjustable lengthwise), such as by front and rear flanges 3822 extending outward from an inboard wall to the front and back of arm 3810.

FIG. 39 depicts a perspective view of an alternate embodiment in which the vertical deflection of arm 3810 may be limited by pins or other hardware 3830. Those skilled in the art will appreciate that flanges 3822 may form front and rear limits and hardware 3830 running between flanges 3822 above and below arm 3810 may limit vertical deflection. FIG. 39 further depicts an adapter 3900 having a post 3905 that is inserted in a sleeve formed by arm 3810. Adapter 3900 may be coupled to arm 3810 using a connection member, welding or through other connection mechanism. In some embodiments the angle and lateral position of the adapter may be selected. The adapter may include a mounting plate 3910 coupled to post 3905 having a generally vertical outboard face and a pattern of holes used to mount a fairing. The pattern of fairing mounting holes can allow a fairing to be mounted in a variety of positions.

Figure 40:
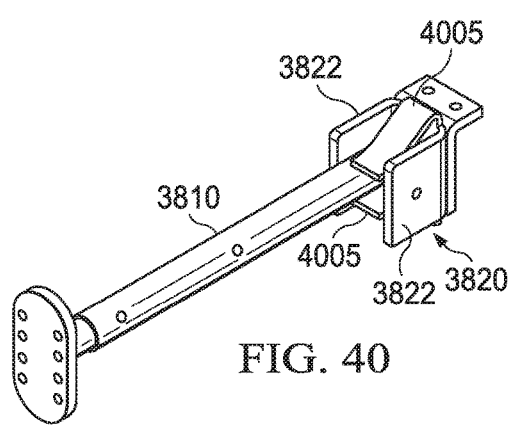
FIG. 40 depicts a view of another embodiment of a middle fairing support arm.
Figure 41C:
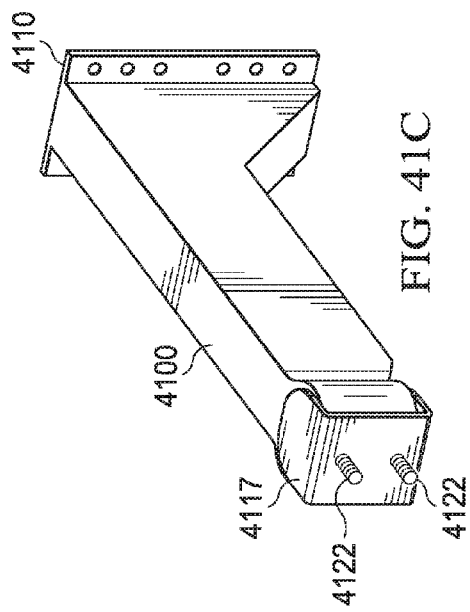
FIGS. 41A-41D depict views of another embodiment of a middle fairing support arm.
Figure 41D:
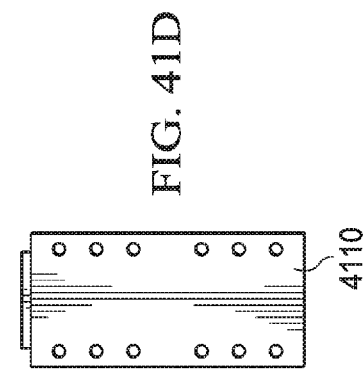
Figure 41A:
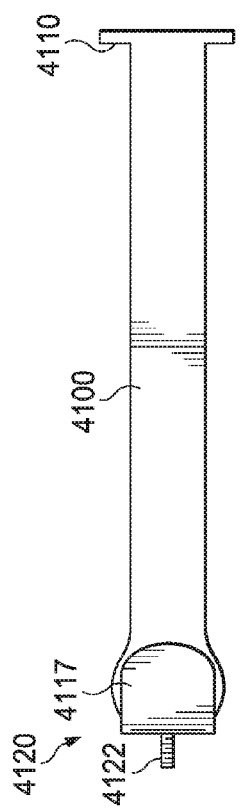
Figure 41B:
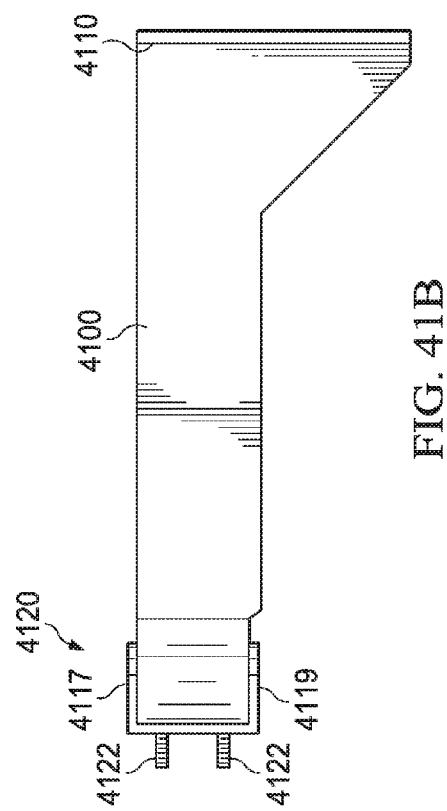

FIG. 40 depicts a perspective view of an alternate embodiment in which flanges 3822 are formed on the front and rear sides only to limit the deflection, whereas flanges 4005 of base 3820 are formed to contact arm 2810 on the top (or bottom) and provide a spring constant to bias arm in a desired direction.

FIGS. 41A-41D and FIGS. 42A-42C depict views of alternate embodiments of an arm and fairing assembly respectively. Arm 4100 may include a joint portion that receives a pin or post extending at least partially between an upper extension 4117 to a lower extension 4119 of base 4120. The pin provides an axis of rotation for arm 4100. Arm 4100 and base 4120 may form a joint that allows arm 4100 to rotate about the axis of rotation provided by base 4120. An internal spring or other biasing mechanism may bias arm 4100 to neutral position. Base 4120 can mount to the frame rail through connection members 4122 or other mechanism. Arm 4100, in some embodiments, may provide mud flap mounts such as a row of holes or slots.

Distal end of arm 4100 may be coupled to an adapter 4110 (as an integral part or separate adapter) for mounting a fairing. In one embodiment, adapter 4110 provides a plate having a flat outboard surface with through holes to allow attachment of a fairing using connection members such that the fairing may be attached in multiple positions.

In another embodiment, as illustrated in FIG. 42C, the fender 4210 may include features 4220 to snap over or receive adapter 4110 to provide attachment in conjunction with or instead of using connection members or to provide structural rigidity proximate to the mounting point. The fender 4210 may include an outer aerodynamic surface between a leading edge 4240 and a trailing edge 4245. The outer aerodynamic surface comprises a portion 4230 that extends generally longitudinally and a portion 4235 that curves inward such that the trailing edge is outboard relative to the leading edge. Attached flow can thus be directed back and outward.

Figure 43A:
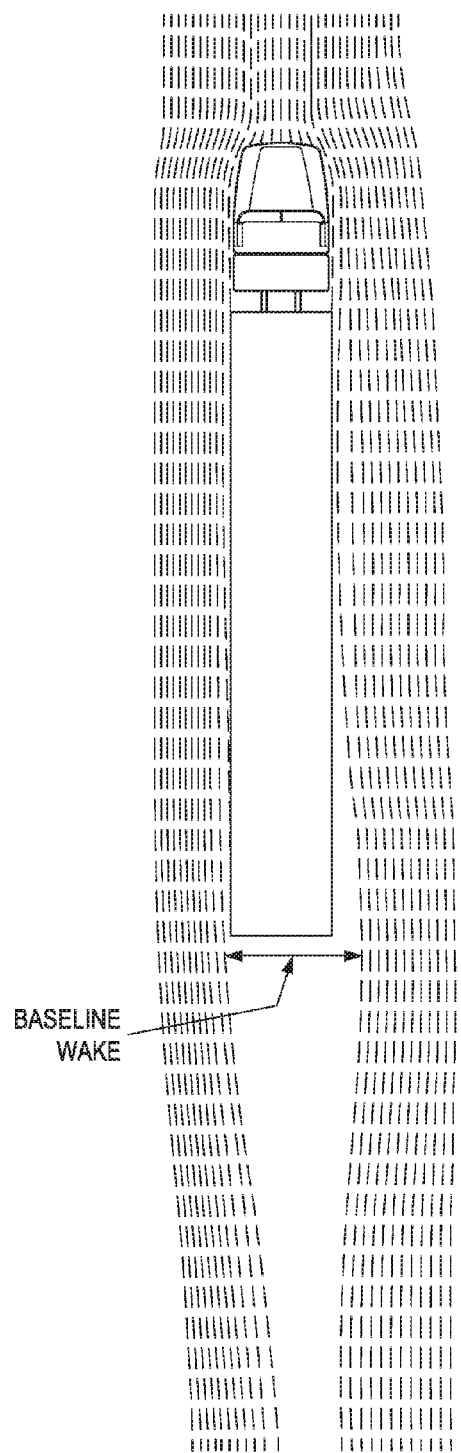
FIGS. 43A-43B depict simulations of air flow.
Figure 43B:
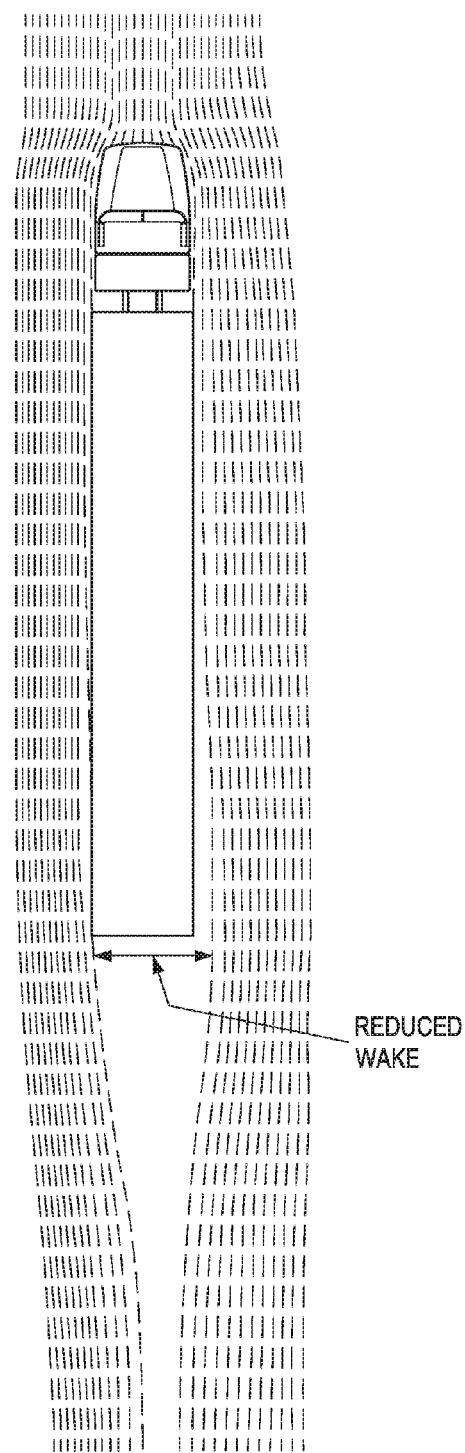

As noted above, fairings may increase the aerodynamics of a vehicle by directing air flow as needed to flow around wheels or components to improve aerodynamic efficiency or stability in large vehicles. FIGS. 43A and 43B depict top views of simulations of air flows around vehicles showing streamlines at approximately the height of the center of the wheels of the truck with a yaw angle of two degrees. FIG. 43A depicts airflow around a vehicle that does not have a fairing 105, showing a baseline wake. FIG. 43B depicts airflow around a vehicle having one embodiment of fairing 105. The differences between the two computer simulation images illustrate reduced drag effect possible due to embodiments of a mud flap hanger with a fairing 105. It should be apparent that the wake created by embodiments such as these disclosed herein may be significantly smaller than the baseline, providing more stable air flow, reduced fuel usage, reduced splash/spray, improved cooling airflow, or other advantages.

Figures 44, 45:
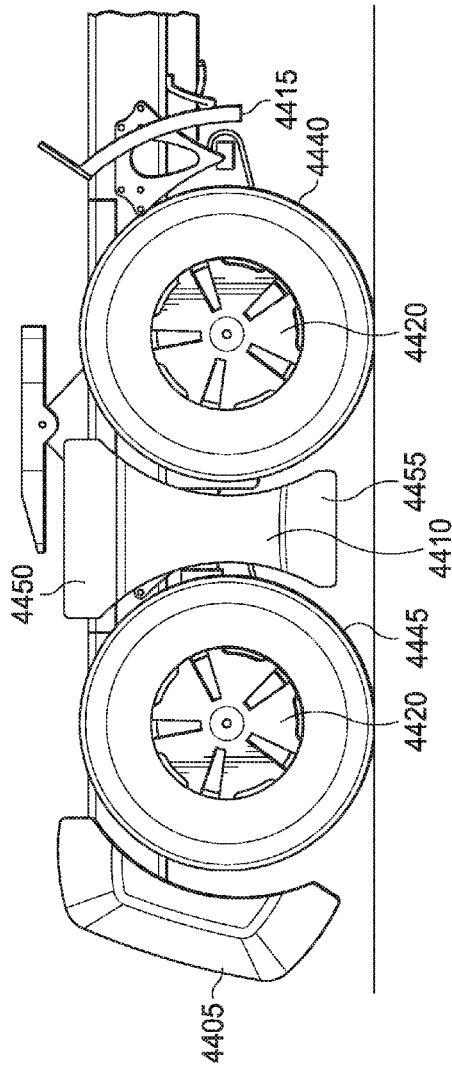
FIG. 44 depicts a view of an aerodynamic system.
FIG. 45 provides test results of testing an aerodynamic system.

In some cases, multiple fairings and other aerodynamic components may be used in conjunction with each other. FIG. 44 depicts one embodiment of an aerodynamic system installed on a tractor having rear tandem wheels comprising a forward set of wheels and a rear set of wheels. The aerodynamic system can comprise a rear mud flap fairing assembly having a first fairing 4405, a middle fairing assembly having a second fairing 4410, a quarter fender panel 4415 and aerodynamic wheel covers 4420. The rear mud flap fairing assembly can comprise a first arm mounted the vehicle and can comprise any suitable fixed arm, deflectable arm or adjustable length arm. The middle fairing assembly can comprise any suitable fixed arm, deflectable arm or adjustable length arm. The first fairing may be configured to direct airflow in a rearward angle (e.g., rearward, rearward and out, rearward and in) and the second fairing may comprise a second fairing outer surface configured to direct airflow in a second rearward angle or in other preferred manner. The first and second rearward angles may be the same or different. For example, a second fairing 4410 such as depicted in FIG. 34B may direct flow rearward while a first fairing 4405 such as depicted in FIG. 12 may direct flow rearward and outward.

A standard quarter fender in a standard location is shown installed in the figures. An aerodynamic quarter fender fairing may also be used with the aerodynamic system (instead of or in addition to the standard quarter fender). Examples of aerodynamic quarter fender fairings are described in U.S. patent application Ser. No. 13/452,249, entitled "Aerodynamic Quarter Fender Assembly and Construction Method," by inventors Joshua Butler, et al., which is fully incorporated as part of this disclosure for all purposes. Wheel covers 4420 may provide a substantially smooth surface flush with an outer sidewall of tires 4440 and 4445 or may provide another aerodynamic profile. Examples of aerodynamic wheel covers are described in U.S. patent application Ser. No. 13/545,100, entitled "Aerodynamic Wheel Covers and Mounting Assemblies," by inventors Joshua Butler, et al., which is fully incorporated as part of this disclosure.

In operation, airflow may be directed around forward tandem tires 4440 by a quarter fender fairing, pass by a first tire 4440, pass by middle fairing panel 4410, pass by a rear tandem tire 4445 and pass mud flap fairing 4405 which can facilitate a smooth transition behind wheels 4445, may extend the airflow in a direction substantially parallel with the outer sidewall of tires 4445, or may direct the airflow out (i.e., away from the frame rail). Additionally, embodiments of an aerodynamic system may direct airflow parallel with the ground, in a downward direction or an upward direction as desired.

Embodiments may have a variety of dimensions and may be positioned as needed or desired. The following provides example dimensions and positions for one embodiment of a tandem axle tractor-trailer system. However, it should be understood that the dimensions provided are provided by way of example and not limitation and other dimensions may be used.

DGT=distance between ground and trailer;

DDT=height of top deflectable portion 4450 of middle fairing 4410: 0 inches<DDT<12 inches; DDB=height of bottom deflectable portion 4455 of middle fairing 4410: 0 inches<DDB<12 inches DW=maximum width of middle fairing 4410: 16 inches<DW<36 inches;

DH=height of middle fairing 4410: 16 inches<DH<48 inches or DGT;

DT=clearance between top edge of middle fairing 4410 and trailer: 0 inches<DT<16 inches (DT≈−DDT in some embodiments whereby the bottom of the trailer may move into the middle fairing 4410 and deflect the middle fairing, especially the top deflectable portion of the middle fairing);

DG=ground clearance of middle fairing 4410: (0 inches or −DDB)<DG<12 inches (DG may be less than 0 in some embodiments whereby the middle fairing or the ground could move and therefore deflect the middle fairing, especially the bottom deflectable portion of the middle fairing);

D0=offset distance between a tire adjacent to middle fairing 4410 and the leading or trailing edge of middle fairing 4410: 0 inches<D0<10 inches (in some cases, middle fairing 4410 may be positioned from the center of the vehicle such that D0 may be negative (the middle fairing may overlap the tire) without middle fairing touching the tire.

D02=offset distance from a tire closest fairing 4405: D02≈D0±3" inches.

FIG. 45 depicts a table illustrating the results of a third party SAE J1321 Type II Fuel Economy Test for four configurations of aerodynamic systems on a tractor-trailer: 1) a tractor having aerodynamic wheel covers; 2) a tractor having a mud flap fairing 105; 3) a tractor having aerodynamic wheel covers, a middle fairing and mud flap fairing 105; and 4) a tractor having aerodynamic wheel covers and mud flap fairing 105 and the trailer having wheel covers. An aerodynamic quarter fender was not tested in these configurations but may provide increased fuel savings.

Figure 46:
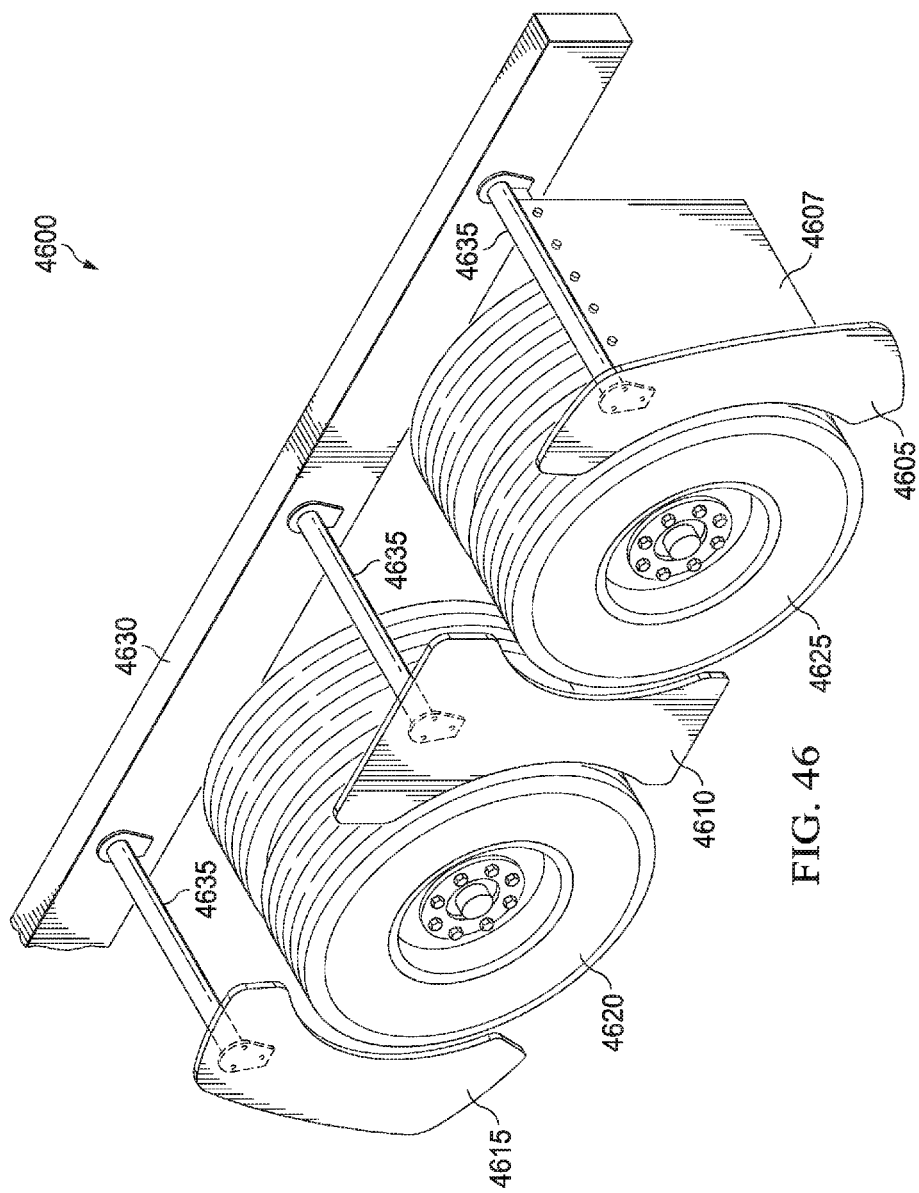
FIG. 46 depicts a view of another embodiment of an aerodynamic system.

FIG. 46 illustrates another embodiment of an aerodynamic system 4600 mounted to the frame rail by arms that may be deflectable or non-deflectable and may have adjustable lengths or fixed lengths. System 4600 may include a rear fairing 4605 outboard of mud flap 4607, a middle fairing 4610 between front tandem wheels 4620 and rear tandem wheels 4625 and front fairing 4615 mounted before front tandem wheel 4620. The fairings may be mounted to frame rail 4630 by arms 4635 which may each be the same type of arm or different types of arms. According to one embodiment, one or more of the arms may be configured to allow the arm to deflect relative to the frame rail and the respective fairing to deflect relative to the arm. In other embodiments, one or more of the arms may allow deflection at only one end or be non-deflectable. One or more of the arms may have a fixed length or adjustable length.

Figure 47:
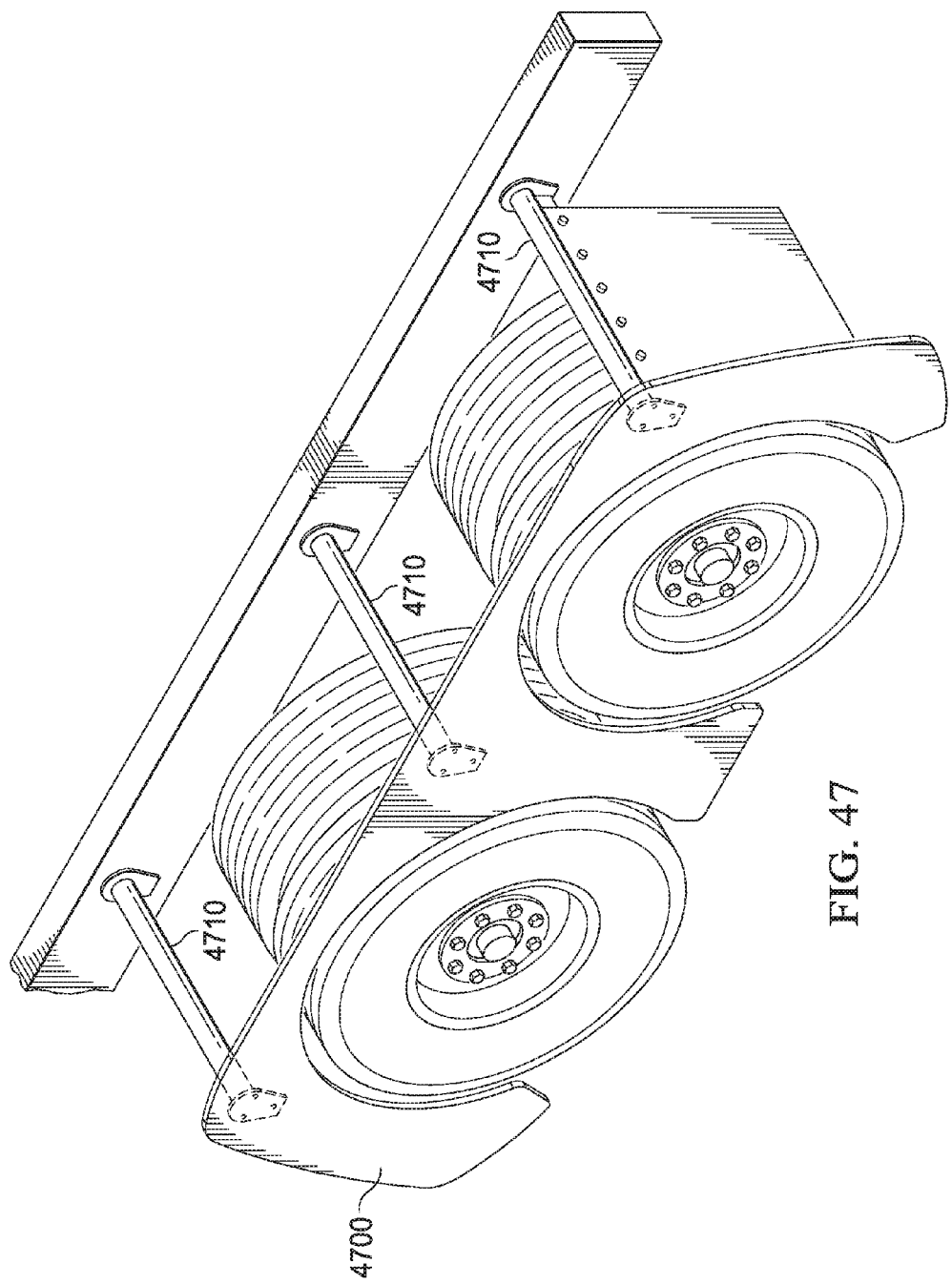
FIG. 47 depicts a view of another embodiment of an aerodynamic system.

FIG. 47 illustrates another embodiment in which front fairing, middle fairing and rear mud flap fairing are integrated into a single large fairing 4700 that spans the tandem and is supported by arms 4710. According to one embodiment, one or more of the arms may be configured to allow the arm to deflect relative to the frame rail and the respective fairing to deflect relative to the arm. In other embodiments, one or more of the arms may allow deflection at only one end or be non-deflectable. One or more of the arms may have a fixed length or adjustable length. According to one embodiment, at least one of the arms may also provide a mud flap mount. The above described configurations and other configurations are not limited to tandem axle tractor applications. Any tractor, truck, or trailer with any number of axles may benefit by a different combination. For example, a single axle tractor might not benefit by a middle fairing but may benefit by any combination of a mud flap fairing, wheel cover, and aerodynamic quarter fender fairing.

Although the invention has been described with respect to specific embodiments thereof, these embodiments are merely illustrative, and not restrictive of the invention. The description herein of illustrated embodiments is not intended to be exhaustive or to limit the invention to the precise forms disclosed herein (and in particular, the inclusion of any particular embodiment, dimensions, feature or function is not intended to limit the scope to such embodiment, feature or function). Rather, the description is intended to describe illustrative embodiments, features and functions in order to provide a person of ordinary skill in the art context without limiting the invention to any particularly described embodiment, feature or function. While specific embodiments and examples are described herein for illustrative purposes only, various equivalent modifications are possible within the spirit and scope of this disclosure, as those skilled in the relevant art will recognize and appreciate. As indicated, these modifications may be made in light of the foregoing description of illustrated embodiments and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment," or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Furthermore, the characterization of any feature as "optional" herein is provided by example and is not intended to and should not be read to imply that other features not characterized as optional are not also optional in various embodiments.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A fairing assembly adapted to couple to a vehicle, the assembly comprising:
   an arm comprising one or more mud flap mounts to mount a mud flap; and
   a fairing configured to be coupled to the arm, wherein when coupled to the arm the fairing is positioned on an outboard side of the mud flap, the fairing having an inboard surface and an outboard surface, the fairing outboard surface comprising an aerodynamic surface to direct longitudinal air flow in a rearward angle.

2. The fairing assembly of claim 1, further comprising an adapter configured to be coupled to the fairing and to the arm at a distal end of the arm.

3. The fairing assembly of claim 2, wherein the adapter is configured such that the fairing is mountable in one or more mounting positions.

4. The fairing assembly of claim 3, wherein the adapter comprises an adapter plate that defines a set of adapter mounting holes and a set of fairing mounting holes.

5. The fairing assembly of claim 4, wherein the set of adapter mounting holes are configured to align with a set of end holes at the end of the arm in a plurality of positions and the fairing mounting holes align with a set of fairing holes defined in the fairing.

6. The fairing assembly of claim 4, wherein:
   the fairing assembly further comprises a second plate adapted to couple to the arm;
   the set of adapter mounting holes align with a set of holes in the second plate in a plurality of positions; and
   the fairing mounting holes align with a set of fairing holes defined in the fairing.

7. The fairing assembly of claim 1, wherein
   the arm comprises a first anchor member;
   the arm comprises a second anchor member; and
   a spring adapted to couple to the first anchor member and the second anchor member.

8. The fairing assembly of claim 7, wherein the spring is configured to bias the arm to a base such that the arm is deflectable relative to the base.

9. The fairing assembly of claim 7, further comprising an adapter plate adapted to couple to the fairing, wherein the spring biases the adapter plate to the arm such that the fairing is deflectable relative to the arm.

10. The fairing assembly of claim 1, wherein the rearward angle comprises a rearward and outward angle.

11. The fairing assembly of claim 1, wherein the rearward angle comprises a rearward and inward angle.

12. The fairing assembly of claim 1, wherein the arm comprises an adjustable length sleeve.

13. The fairing assembly of claim 12, wherein the adjustable length sleeve further comprises:
   a main body defining an inner portion receiving channel and a first set of positioning holes; and
   an inner portion at least partially received in the inner portion receiving channel, the inner portion defining a second set of positioning holes.

14. The fairing assembly of claim 13, wherein the arm further comprises an anchor member extending across and out of the inner portion and the main body defines a slot to accommodate the anchor member.

15. The fairing assembly of claim 13, wherein the mud flap and fairing are adapted to mount to the main body.

16. An aerodynamic system for a vehicle comprising:
   a first fairing assembly comprising:
      a first arm adapted to be coupled to the vehicle; and
      a fairing adapted to be coupled to an outboard end of the first arm, the fairing having an outer surface to direct airflow leaving a wheel in a first rearward angle; and
   one or more aerodynamic components configured to act in conjunction with the first fairing assembly to reduce aerodynamic drag of the vehicle.

17. The aerodynamic system of claim 16, wherein the first fairing assembly comprises a mud flap fairing assembly and the one more aerodynamic components comprise at least one of an aerodynamic quarter fender, an aerodynamic wheel cover or a middle fairing.

18. The aerodynamic system of claim 16, wherein the first fairing assembly comprises a mud flap fairing assembly for mounting to a rear set of wheels of a tandem set of wheels and the one or more additional aerodynamic components comprises a middle fairing assembly, further comprising:
   a second arm adapted to couple to the vehicle between a forward set of wheels and the rear set of wheels of the tandem set of wheels; and
   a middle fairing adapted to couple to the second arm, the middle fairing having an outboard surface to direct airflow in a second rearward angle.

19. The aerodynamic system of claim 18, further comprising aerodynamic wheel covers for coupling to the rear set of wheels and the forward set of wheels.

20. The aerodynamic system of claim 18, wherein the fairing comprises a curved leading edge and the middle fairing comprises a curved middle fairing leading edge and curved middle fairing trailing edge.

* * * * *